(12) United States Patent
Suzuki et al.

(10) Patent No.: US 7,702,904 B2
(45) Date of Patent: Apr. 20, 2010

(54) KEY MANAGEMENT SYSTEM AND MULTICAST DELIVERY SYSTEM USING THE SAME

(75) Inventors: Kazuya Suzuki, Tokyo (JP); Masahiro Jibiki, Tokyo (JP); Hideyuki Magoshi, Tokyo (JP)

(73) Assignee: NEC Corporation, Tokyo (JP)

(*) Notice: Subject to any disclaimer, the term of this patent is extended or adjusted under 35 U.S.C. 154(b) by 1366 days.

(21) Appl. No.: 10/713,455

(22) Filed: Nov. 17, 2003

(65) Prior Publication Data

US 2004/0105549 A1   Jun. 3, 2004

(30) Foreign Application Priority Data

Nov. 15, 2002 (JP) .............................. 2002-332404
Nov. 15, 2002 (JP) .............................. 2002-332405
Nov. 19, 2002 (JP) .............................. 2002-335401

(51) Int. Cl.
    *H04L 9/08* (2006.01)
(52) U.S. Cl. .................. 713/163; 380/278; 380/279
(58) Field of Classification Search ................ 380/277, 380/278, 279; 713/163, 171
    See application file for complete search history.

(56) References Cited

U.S. PATENT DOCUMENTS

| | | | |
|---|---|---|---|
| 5,659,615 A * | 8/1997 | Dillon ......................... | 713/162 |
| 6,049,878 A * | 4/2000 | Caronni et al. ................. | 726/3 |
| 7,068,791 B1 * | 6/2006 | Larsen et al. ................ | 380/279 |
| 2003/0044017 A1 * | 3/2003 | Briscoe ....................... | 380/277 |
| 2003/0169885 A1 * | 9/2003 | Rinaldi ....................... | 380/278 |

FOREIGN PATENT DOCUMENTS

| | | |
|---|---|---|
| JP | 61-108272 | 5/1986 |
| JP | 61-108277 | 5/1986 |
| JP | 62-189 | 1/1987 |
| JP | 1-122227 | 5/1989 |
| JP | 2-112343 | 4/1990 |
| JP | 4-72840 | 3/1992 |
| JP | 7-072841 | 3/1992 |
| JP | 4-165785 | 6/1992 |

(Continued)

OTHER PUBLICATIONS

Scalable Multicast Key Distribution, A. Ballardie, Request for Comments: 1949, May 1996 (retrieved on Apr. 12, 2005 from Internet, pp. 1-18.

(Continued)

*Primary Examiner*—Kimyen Vu
*Assistant Examiner*—Edward Zee
(74) *Attorney, Agent, or Firm*—Young & Thompson

(57) ABSTRACT

In a multicast delivery system, A delivery server enciphers delivery data by using a current use cipher key to generate enciphered data and transmits a multicast packet containing the enciphered data and a current use key identifier indicative of a pair of the current use cipher key and a current use decipher key as current use keys. A key management server holds as a current use key data, a set of the current use decipher key and the current use key identifier, and transmits a set of the current use decipher key and the current use key identifier as a current use decipherment key data in response to a current use key data request.

19 Claims, 32 Drawing Sheets

FOREIGN PATENT DOCUMENTS

| | | |
|---|---|---|
| JP | 4-291589 | 10/1992 |
| JP | 5-327695 | 12/1993 |
| JP | 7-134547 | 5/1995 |
| JP | 8-288939 | 11/1996 |
| JP | 9-307872 | 11/1997 |
| JP | 10-84339 | 3/1998 |
| JP | 10-145351 | 5/1998 |
| JP | 11-27252 | 1/1999 |
| JP | 11-175475 | 7/1999 |
| JP | 2000-196616 | 7/2000 |
| JP | 2000-224155 | 8/2000 |
| JP | 2000-278260 | 10/2000 |
| JP | 2000-312711 | 11/2000 |
| JP | 2001-285273 | 10/2001 |
| JP | 2002-23622 | 1/2002 |
| JP | 2002-111649 | 4/2002 |
| JP | 2002-124940 | 4/2002 |
| JP | 2002-190797 | 7/2002 |
| JP | 2002-217973 | 8/2002 |
| JP | 2002-252607 | 9/2002 |
| WO | WO 00/59151 | 10/2000 |

OTHER PUBLICATIONS

Japanese Patent Office issued a Japanese Office Action dated Jan. 5, 2008, Application No. 2002-335401.

* cited by examiner (BIT NO.)

ORIGINAL STREAM MEDIA DATA

25

KEY BIT PATTERN

SCRAMBLED STREAM DATA (BIT NO.)

ORIGINAL STREAM MEDIA DATA

25

KEY BIT PATTERN

SCRAMBLED STREAM DATA

26

(BIT NO.)

SCRAMBLED STREAM MEDIA DATA

KEY BIT PATTERN

ORIGINAL STREAM DATA

SCRAMBLED STREAM MEDIA DATA

KEY BIT PATTERN

ORIGINAL STREAM

ORIGINAL STREAM MEDIA DATA

KEY BIT PATTERN

KEY BIT PATTERN

SCRAMBLED STREAM DATA

KEY BIT PATTERN

KEY BIT PATTERN

ORIGINAL STREAM DATA

KEY MANAGEMENT SYSTEM AND MULTICAST DELIVERY SYSTEM USING THE SAME

BACKGROUND OF THE INVENTION

1. Field of the Invention

The present invention is relates to a key management system, and a multicast delivery system using the same.

2. Description of the Related Art

Generally, multicast packets are received by unspecified multitude of receivers. In order to permit only a specific client to listen or view, it is necessary that data delivered by packets is enciphered using a cipher key and a decipher key is delivered to only the specific client.

Conventionally, in a multicast delivery system in which delivery data is enciphered, the encipherment is carried out by using a different key for every predetermined time to prevent a tapping. For this purpose, as disclosed in Japanese Laid Open Patent Application (JP-P2001-285273A: a first conventional example), the change of a cipher key and a decipher key is carried out. In this way, by changing the key periodically, it is possible to manage the clients and to improve the secrecy of the cipher.

Such a conventional multicast delivery system contains a content server, clients and a key management server. The content server transmits packets with a key request data for every predetermined time, and the client receives it and requests a key to the key management server. In this way, the key is updated for every predetermined time, and it is possible to prevent the enciphered data from being leaked even when the key passes to a third party. However, there are the following problems in the key management system of the above-mentioned conventional multicast delivery system.

First, a time lag is present in the reception of the key request data. When receiving the key request data, the client requests the key to the key management server and starts a deciphering operation after receiving the key as a response to the request. Therefore, the client cannot start the deciphering operation of the enciphered data until the response returns from the key management server.

Second, the user cannot listen and view the broadcast data immediately when participating the multicast broadcasting on the way. Because the packet with the key request data is transmitted for every predetermined time interval, the client cannot acquire a decipher key until the following key request data is sent, and cannot carry out the deciphering operation, even if the client participates to the multicast broadcasting.

Third, there is a possibility that a period during which the key cannot be acquired when the key request data multicast-delivered disappears on the route becomes long. Because response confirmation is not carried out in the multicast delivery, it cannot be confirmed that the packet disappeared on the route. Therefore, when the packet with the key request data disappears, it is not possible to acquire a new key until the following key request data is sent. In this way, until the new key can be acquired, the deciphering operation of the enciphered data is not carried out.

As a protocol for the communication of enciphered data in unicast communication, IPsec and so on are known. These cannot be applied to the multicast delivery just as they are. Because the unicast communication is carried out in a one-to-one manner, it is enough to share the key between two ends. However, because the multicast communication is carried out in a one-to-multi manner, it is not possible to share the key in the same method unlike the unicast communication. For this reason, in the enciphering and deciphering operation in the multicast communication, a new system different from the conventional unicast communication is necessary.

Generally, when a plurality of multicast deliveries are carried out, each delivery is identified based on a combination of a transmission source address, a multicast address and a transmission and reception port number. Therefore, in a conventionally technique, when a plurality of content server deliver multicast packets containing the enciphered data by using different keys, it is necessary that the multicast packet can be identified based on the combination of the transmission source address, the multicast address and transmission and reception port number on the client side in order to acquire a decipher key corresponding to each multicast packet. Also, when the keys are changed (the cipher key and decipher keys) in the multicast delivery of the enciphered data, it is necessary to establish synchronization of the cipher key and the decipher key between the content server and the client, by using any methods.

A system for establishing synchronization using a key management server that carries out the following process is disclosed in Japanese Laid Open Patent Application (JP-P2002-111649A: a second conventional example). That is, the key management server receives a new key when the content server starts transmission or the key is changed and notifies the key change to the client. In this way, a key for the delivery data is delivered to the client. However, in the key management system of the multicast delivery system of the second conventional example, when the key is changed, the key management server needs to deliver the new key to the client. In order to realize such a key management, the key management server must grasp the clients at a present during the multicast packet reception previously. As the result, the management of the key became complex.

In the stream media data broadcasting such as delivery broadcasting, satellite broadcasting, and cable television of the stream media data using an Internet and so on, the scramble broadcasting is required to protect contents from reasons on the business. As a conventional scrambling method of the stream media data, the encryption algorithm of DES and AES, RSA are mainly used. A lot of processes are necessary to carry out the enciphering/deciphering process in software, while these algorithms are powerful. Especially, when the enciphering/deciphering processes in real time are necessary like the broadcasting data, hardware of exclusive use is necessary. Such hardware is expense and the cost prevents the scrambling apparatus for the broadcasting service from spreading in each home widely.

A third conventional example of a scramble broadcasting method of stream media data is disclosed in the Japanese Laid Open Patent Application (JP-A-Heisei 8-288939). In this third conventional example, a broadcasting cell is enciphered by a cipher key generated by a cipher key generating section of a line termination unit, and the broadcasting cell is descrambled using a cipher key previously given to a subscriber terminal. Because a special encryption algorithm is used in the conventional scramble broadcasting method of the stream media data, the hardware of exclusive use needs to descramble of the scrambled stream media data. This problem is the same as in the third conventional example.

In a conjunction with the above description, a charged broadcasting method is disclosed in Japanese Laid Open Patent Applications 61-108272 and 62-000189. In these conventional examples, a program classification data generating section generates program classification data corresponding to a charged radio program in a broadcasting station. A contract program classification data generating section shows that a subscriber contracts the charged program broadcasting.

A key data generating section generates key data to scramble a charged program broadcasting signal. A transmitting section transmits the key data, the program classification data, and the contract program classification data. In a receiving end, an extracting section extracts the key data, the program classification data, and the contract program classification data. A key data extracting section extracts the key data. A comparing section compares the program classification data and the contract program classification data. A display section shows that the contract of the charged program is not accomplished when the program classification data and the contract program classification data do not correspond.

Also, a charged broadcasting method is disclosed in Japanese Laid Open Patent Application (JP-A-Showa 61-108277). In this conventional example, a random number generating section generates a random number using a predetermined non-opened key data. A memory stores the non-opened key data for every subscriber. A contract determining section determines the existence or non-existence of the subscriber contract based on the non-opened key data. A scramble section scrambles broadcasting data using the random number. On the side of the subscriber, an extracting section extracts the non-opened key data, determines whether or not the extracted key data is coincident with the key data peculiar to the subscriber, and a key deciphering section generates a descramble control signal. A subscriber identifying section determines the matching of a subscriber identifying code specified by the subscriber and the non-opened data peculiar to a subscriber equipment, and the random number generating section generates a random number based on the determination result of the matching. A descramble section descrambles the broadcasting data using the random number.

Also, a satellite broadcasting receiving apparatus is disclosed in Japanese Laid Open Patent Application (JP-A-Heisei 2-112343). In this conventional example, a broadcasting signal is generated by calculating an exclusive OR of a source signal and a pseudo-random data series and by carrying out frequency spreading scrambling to the calculating result. The broadcasting signal is added with a period signal and a control signal and is transmitted periodically. The satellite broadcasting receiving apparatus receives the broadcasting signal transmitted from the satellite, and carries out frequency spreading descrambling to the received signal to replay it. The satellite broadcasting receiving apparatus has a prohibiting section which prohibits the detection of the sync signal during a predetermined period containing a control signal at least, after detecting a sync signal.

Also, a charged broadcasting receiver is disclosed in Japanese Laid Open Patent Application (JP-A-Heisei 4-165785). In this conventional example, a data is enciphered through an exclusive OR operation with pseudo-random numbers which are generated based on a predetermined initial value. Also, an identifier number, an individual contract data showing an address of a receiver, a data containing an initial value are enciphered, and are superimposed on scrambled sound data to generate a broadcasting data. The receiver descrambles the broadcasting data to replay it. The receiver is composed of a memory which stores the identifier number and the individual contract data. A plurality of extracting section compare the identifier number of the received broadcasting data and a stored-identifier number and take out only the data of a contracted program. A deciphering section deciphers extracted data. A generating section generates pseudo-random numbers based on the initial value contained in the enciphered broadcasting data. The sound data is replayed based on the plurality of received data and the pseudo-random numbers.

Also, a coder in charged broadcasting is disclosed in Japanese Laid Open Patent Application (JP-A-Heisei 4-291589). In this conventional example, a descrambling unit inputs a scrambled digital multiple sampling coded signal, a 25-frame deinterleave, and a sound data bit stream after BCH (82,74) error correction, and outputs a descrambled digital multiple sampling coding signal after a descrambling process of a video signal portion of the scramble digital multiple sampling coding signal and a pseudo-random signal for the descrambling process of the sound data bit stream. An exclusive OR calculating unit carries out addition of the pseudo-random signal and the scrambled sound data bit stream outputted from the descrambling unit and outputs a sound data bit stream. A bit deleting unit inputs the descrambled sound data bit stream and deletes multiplexed scramble relating bits. A sound multiple re-encoding unit has a bit interleaving unit, a BCH (82,74) error correction adding unit, a 25-frame interleaving unit, a time-axis compressing unit, a binary/ternary inverter, a resampling waveform shaping filter unit of 12.15 MHz/16.2 MHz. The sound data bit stream in which the scramble relating bits have deleted again multiplies into a multiple sampling re-encoded audio signal. A delay section delays the multiple sampling re-encoded audio signal outputted from the sound multiple re-encoding unit. A signal switching unit multiplexes the delayed audio signal into a sound independence data area outputted from the descrambling unit. A control system controls the timing of the signal switching unit.

Also, a scrambling method is disclosed in Japanese Laid Open Patent Application (JP-A-Heisei 5-327695). In the scrambling method of this conventional example, an initial value is set to a first register having a plurality of cells. The contents of the first register are transferred to a second register R2 having the same number of cells as the first register, while holding the contents of the first register R1. Moreover, a third register R3 having a plurality of cells is cleared. The least significant bit of the second register R2 is added to the third register R3, and the contents of the second register R2 is shifted into a direction of the lower bit by a predetermined bit number $(f(k+1)-fk)$. The final output is added to the third register. This calculation is repeated from K=1 to i (a preset number). The least significant bit of the first register is stored in a memory in order and then the contents of the first register R1 are shifted to the lower bit direction by one bit. Moreover, the least significant bit of the third register is transferred to the most significant bit of the first register. The above step is repeated by a predetermined number of times, and then the exclusive OR of one bit of a signal to be transmitted and one of the bits stored in the memory corresponding to the one bit is calculated and outputted.

Also, a key management system is disclosed in Japanese Laid Open Patent Application (JP-A-Heisei 11-27252) and Japanese Laid Open Patent Application (JP-P2002-190797A). The key management system of this conventional example is composed of a data encrypting apparatus which enciphers data using a cipher key, a data decrypting apparatus which deciphers the enciphered data using a decipher key, and a key management apparatus which manages the cipher key and the decipher key to be used in the data encrypting apparatus and the data decrypting apparatus. The data encrypting apparatus and the key management apparatus are connected by a communication the network. The key management apparatus is composed of a key storage section which stores at least one set of the cipher keys and the decipher keys, and a management table storage section which stores a management table showing a correspondence relation between the decipher key stored in the storage section and a publication day and time of the decipher key. Also, the key management apparatus is further composed of a key search section which refers to the management table stored in the management table storage section to search the cipher key paired with the decipher key corresponding to the date and the day time required by the data encrypting apparatus. A cipher key transmitting section transmits the searched cipher key to the data encrypting apparatus through the communication network. A decipher key publishing section publishes or opens the decipher key corresponding a current day and time in accordance with the management table stored in the management table storage section. The data encrypting apparatus is composed of a date and time data transmitting section which transmits a data about the date and time when the secrecy of the data is released, to the key management apparatus through the communication network, and a cipher key receiving section which receives the cipher key corresponding to the date and time data and sent from the key management apparatus through the communication network. Also, the data encrypting apparatus is composed of an enciphering section which enciphers the data by using the cipher key received by the cipher key receiving section, and an enciphered data generating section which add a date and time data to the enciphered data by the enciphering section and generates an enciphered information to be distributed to the data decrypting apparatus. The data decrypting apparatus is composed of an enciphered data acquiring section which acquires the enciphered data generated by the data encrypting apparatus, and a decipher key acquiring section which acquires the decipher key published or opened by the key management apparatus on a date and time specified by the date and time data given to the enciphered information which is acquired by the enciphered data acquiring section. Also, the data decrypting apparatus is further composed of a decipher section which deciphers the enciphered information acquired by the enciphered data acquiring section by using the decipher key acquired by the decipher key acquiring section.

Also, a network system is disclosed in Japanese Laid Open Patent Application (JP-P2000-224155A). The network system of this conventional example is composed of a key server and a plurality of clients. The key server transmits a new common key to each of the clients after change every time the clients are changed. Each of the clients enciphers data by using the delivered common key, adds a relation data showing a relation between the key server and each client to the enciphered data and carries out transmission and reception. In each of the above clients, a calculation section calculates a guaranteed delay time until the above common key is transmitted to each of the above clients from the key server, after inquiring the key server. A delay section applies a delay process of the time equivalent to the delay time calculated by the above calculation section to the enciphered data. When a new key is distributed from the above key server during the delay process of the above delay section, a transmitting section re-enciphers the data with the new key to supply the enciphered data to the above delay section. When the new key is not distributed from the above key server during the delay process of the above delay section, the transmitting section transmits the enciphered data outputted from the above delay section to another client and the above the key server.

Also, a multicast communication method is disclosed in Japanese Laid Open Patent Application (JP-P2002-124940A). In the multicast communication method of this conventional example, a transmitting section sends out secret data about the cipher to the key management server and communicates data about the cipher to routers. First, a key request data is enciphered and is sent out. Each of the routers adds a value peculiar to it and transmits to a plurality of receiving sections. The receiving section hands over the key request data to a key management server and receives a decipher key different every route. The delivered data is subject to a power calculation in a transmitting section by using a specific value and in the route by using the peculiar value. Then, a surplus of a value is calculated, and is sent in order as a cipher. Thus, the encipherment different every route is carried out. A receiving section deciphers the enciphered data by each router by using an acquired decipher key once and a plaintext is obtained.

Also, a multicast communication system is disclosed in Japanese Laid Open Patent Application (JP-P2002-217973A). In the multicast communications system of this conventional example, when a client apparatus requests the reception of multicast data, a client apparatus transmits a reception request of the multicast data to a reception management server apparatus. In case of stopping the reception of the multicast data, the client apparatus transmits a reception stop notice to the reception management server apparatus. The reception management server manages a reception situation every client based on the data transmitted from these client apparatuses. At this time, the reception management server apparatus determines whether or not to the reception of the multicast data is permitted to the client apparatus which transmitted the reception request. In case of permission, the reception management server notifies the fact to the routing control server apparatus. A routing control server apparatus controls the routing apparatus to transmit the multicast data to the client apparatus in response to the reception of this notice.

Also, an encrypting apparatus is disclosed in Japanese Laid Open Patent Application (JP-P2002-23622A). The encrypting apparatus of this conventional example is a common key cryptography type of encrypting apparatus which uses a plurality of extended keys in opposite orders in a data stirring process for encipherment and a data stirring process for decipherment. In a round process section, in the initial stage of a round function of a plurality of stages, a common key is inputted, and a predetermined round function is applied to generate an intermediate state. In the second stage and the subsequent stages, the intermediate state generated in the previous stage is inputted, and the predetermined round function is applied and a new intermediate state is generated. Each of the intermediate states generated in a part or whole of stages of the round processes is subjected to a predetermined conversion process without any change and then outputted as the extended key.

Also, a data delivery method is disclosed in Japanese Laid Open Patent Application (JP-P2002-252607A). In the data delivery method of this conventional example, keys used to encipher and decipher contents are generated in a key provision terminal. The generated key is delivered to a data service terminal and each of data use terminals in unicast communication. The delivered key is acquired by the data service terminal and is stored. The delivered key is acquired by the data use terminals and is stored. The contents are enciphered by using the key stored in the data service terminal and the enciphered contents are delivered to each of the data use terminals in a multicast communication. The delivered enciphered contents are acquired by the data use terminals, are deciphered by using the key stored in the data use terminal and is replayed.

SUMMARY OF THE INVENTION

Therefore, an object of the present invention is to provide a key management system, in which data can be deciphered without confirmation delay in case of key change when the encipherment is carried out by using a key different for every predetermined time in a multicast delivery.

Also, another object of the present invention is to provide a key management system in which key management can be carried out easily.

Also, another object of the present invention is to provide a key management system in which a key identifier is allocated every key to uniquely identify the key among a plurality of keys.

Also, another object of the present invention is to provide a key management system in which a key identifier corresponding to a cipher key used to encipher delivery data is contained a multicast packet to be transmitted in case of multicast delivery.

Also, another object of the present invention is to provide a key management system in which the high-speed encipherment and decipherment can be carried out to a stream media data as delivery data without exclusive use hardware.

Also, another object of the present invention is to provide a key management system in which the high-speed encipherment and decipherment can be carried out through software processes.

Also, another object of the present invention is to provide a key management system in which the secrecy of data can be increased to a practical level while the high-speed encipherment and decipherment can be carried out through software processes.

Also, another object of the present invention is to provide a multicast delivery system that uses the above the key management system.

In an aspect of the present invention, a multicast delivery system includes a delivery server, a key management server and a client server which are connected by a network. The delivery server enciphers delivery data by using a current use cipher key to generate enciphered data and transmits a multicast packet containing the enciphered data and a current use key identifier indicative of a pair of the current use cipher key and a current use decipher key as current use keys. The key management server holds as a current use key data, a set of the current use decipher key and the current use key identifier, and transmits a set of the current use decipher key and the current use key identifier as a current use decipherment key data in response to a current use key data request. The client terminal receives the multicast packet from the deliver server, issues the current use key data request to the key management server to receive the current use decipherment key data from the key management server, holds the set of the current use decipher key and the current use key identifier, and deciphers the enciphered data contained in the multicast packet by using the current use decipher key when the current use key identifier contained in the multicast packet is coincident with the current use key identifier held in the client terminal.

Here, the delivery server generates and holds as a current use encipherment key data, a set of the current use cipher key, the current use decipher key and the current use key identifier, and transmits a set of the current use decipher key and the current use key identifier as the current use decipherment key data to the key management server. The key management server holds the current use decipher key and the current use key identifier as the current use decipherment key data.

In this case, the delivery server sets a current use key remaining effective time data to the current use key data, and transmits a set of the current use decipher key, the current use key identifier, and the current use key remaining effective time data as the current use decipherment key data to the key management server. The key management server holds the current use decipherment key data. The delivery server, the key management server and the client terminal decrease the current use key remaining effective time data as time elapses.

In this case, the delivery server generates as a next use key data, a set of a next use cipher key, a next use decipher key, a next use key identifier indicative of a pair of the next use cipher key and a next use key remaining effective time data, when the current use key remaining effective time data becomes a first present value, and transmits a set of the next use decipher key, the next use key identifier, and the next use key remaining effective time data to the key management server as a next use decipherment key data. The key management server holds the next use decipher key data.

In this case, the client terminal issues a next use key request to the key management server when the current use key remaining effective time data becomes a second present value smaller than the first preset value, and receives and holds the next use decipherment key data from the key management server.

In this case, the delivery server enciphers the delivery data by using the next use cipher key as the current use cipher key after the current use key remaining effective time data becomes 0.

Also, the delivery server issues a current use key data generating request to the key management server. The key management server generates and holds as a current use key data, a set of the current use cipher key, the current use decipher key and the current use key identifier in response to the current use key data generating request, and transmits a set of the current use cipher key and the current use key identifier as a current use encipherment key data to the delivery server. The delivery server holds the current use encipherment key data.

In this case, the key management server sets a current use key remaining effective time data to the current use key data, and transmits a set of the current use decipher key, the current use key identifier, and the current use key remaining effective time data as the current use encipherment key data to the delivery server. The delivery server holds the current use encipherment key data. The delivery server, the key management server and the client terminal decrease the current use key remaining effective time data as time elapses.

In this case, the delivery server issues a next use key data generating request to the key management server, when the current use key remaining effective time data becomes a first present value. The key management server generates and holds as a next use key data, a set of a next use cipher key, a next use decipher key, a next use key identifier indicative of a pair of the next use cipher key and a next use key remaining effective time data in response to the next use key data generating request, and transmits a set of the next use encipher key, the next use key identifier, and the next use key remaining effective time data to the delivery server as a next use encipherment key data. The delivery server holds the next use encipherment key data.

In this case, the client terminal issues a next use key request to the key management server when the current use key remaining effective time data becomes a second present value smaller than the first preset value, and receives and holds the next use decipherment key data of the next use decipher key, the next use key identifier, and the next use key remaining effective time data from the key management server.

In this case, the delivery server enciphers the delivery data by using the next use cipher key as the current use cipher key after the current use key remaining effective time data becomes 0.

Also, the multicast delivery system may further include a plurality of delivery servers and a plurality of client terminals. Each of the plurality of delivery servers issues a next use key data generating request to the key management server while using the current use cipher key. The key management server generates and holds as a next use key data, a set of a next use cipher key, a next use decipher key and a current use key identifier indicative of a pair of the next use cipher key and the next use decipher key in response to the next use key data generating request, and transmits a set of the next use cipher key and the next use key identifier as a next use encipherment key data to the delivery server. The delivery server holds the next use encipherment key data.

In this case, each of the plurality of client terminals issues a next use decipher key request to the key management server when the client terminal does not hold the current use key identifier contained in the multicast packet. The key management server transmits a set of the next use decipher key and the next use key identifier to the client terminal as a next use decipherment key data. The client terminal holds the next use decipherment key data.

Also, each of the plurality of delivery servers issues a key data change previous notice to the plurality of clients, and each of the plurality of client terminals issues a next use decipher key request to the key management server in response to the key data change previous notice. The key management server transmits a set of the next use decipher key and the next use key identifier to the client terminal as a next use decipherment key data. The client terminal holds the next use decipherment key data.

Also, the multicast delivery system may further include a plurality of the delivery servers; and a plurality of the client terminals, and the key management server may include a master server; and a plurality of slave servers. Each of the plurality of delivery servers issues a next use key data generating request to the master server while using the current use cipher key. The master server generates and holds as a next use key data, a set of a next use cipher key, a next use decipher key and a current use key identifier indicative of a pair of the next use cipher key and the next use decipher key in response to the next use key data generating request, transmits a set of the next use cipher key and the next use key identifier as a next use encipherment key data to the delivery server, and transmits a set of the next use decipher key and the next use key identifier as a next use decipherment key data to the plurality of slave servers. Each of the plurality of slave servers holds the next use decipherment key data. The delivery server holds the next use encipherment key data.

In this case, each of the plurality of client terminals issues a next use decipher key request to any of the plurality of slave servers when the client terminal does not hold the current use key identifier contained in the multicast packet. The slave server transmits the next use decipherment key data to the client terminal, and the client terminal holds the next use decipherment key data.

Also, each of the plurality of delivery servers issues a key data change previous notice to the plurality of clients. Each of the plurality of client terminals issues a next use decipher key request to any of the plurality of slave servers in response to the key data change previous notice. The slave server transmits the next use decipherment key data to the client terminal, and the client terminal holds the next use decipherment key data.

Also, the key management server may detect a data amount of the multicast packets and charge a fee to the client terminal based on the detected data amount. Or, when the client terminal issues the key data request to the key management server, the key management server may detect the number of the key data requests and charge a fee to the client terminal based on the detected number of key data requests.

In another aspect of the present invention, a delivery server in a multicast delivery system includes a key data management table and an enciphering section. The key data management table holds a current use cipher key and a current use key identifier for the current use cipher key. The enciphering section refers to the key data management table to acquires the current use cipher key, enciphers delivery data by using the current use cipher key to generate enciphered data and transmits a multicast packet containing the enciphered data and the current use key identifier indicative of a pair of the current use cipher key and a current use decipher key as current use keys.

Here, the delivery server may further include a key managing section which generates as a current use encipherment key data, a set of the current use cipher key, the current use decipher key and the current use key identifier, stores the current use cipher key and the current use key identifier in the key data management table, and transmits a set of the current use decipher key and the current use key identifier as a current use decipherment key data to a key management server.

Also, the delivery server may further include a key managing section which generates as a current use encipherment key data, a set of the current use cipher key, the current use decipher key, the current use key identifier and a current use key remaining effective time data, stores the current use cipher key, the current use key identifier and the current use key remaining effective time data in the key data management table, and transmits a set of the current use decipher key, the current use key identifier and the current use key remaining effective time data as a current use decipherment key data to a key management server.

Also, the delivery server may further include a key managing section which issues a next use key data generating request, and receives and stores a next use cipher key and a next use key identifier in the key data management table.

Also, the key data management table stores a current use key remaining effective time data in addition to the current use cipher key and the current use key identifier. The delivery server may further include a key managing section which decrease the current use key remaining effective time data as time elapses, issues a next use key data generating request, when the current use key remaining effective time data becomes a first preset value, and receives and stores a next use cipher key and a next use key identifier in the key data management table.

Also, the delivery server may further include a key managing section which issues a use key data change previous notice to client terminals, while using the current use cipher key.

In another aspect of the present invention, a key management server in a multicast delivery system, includes a key data management table which holds a current use decipher key and a current use key identifier for the current use decipher key; and a key managing section which reads out the current use decipher key and the current use key identifier in response to a key data request to transmit to a request issuing client.

Here, the key managing section generates as a current use key data, a set of a current use cipher key, the current use decipher key and the current use key identifier in response to a key data generating request, stores the current use key data in the key data management table, and transmits a set of the current use cipher key and the current use key identifier as a current use encipherment key data to a request generating deliver server.

In this case, the key managing section generates as a next use key data, a set of a next use cipher key, a next use decipher key and a next use key identifier in response to a next key data generating request, stores the next use key data in the key data management table, and transmits a set of the next use cipher key and the next use key identifier as a next use encipherment key data to a request generating deliver server.

Also, the key managing section receives the current use decipher key and the current use key identifier from a deliver server, and stores in the key data management table, and receives a next use decipher key and a next use key identifier from the deliver server, and stores in the key data management table.

Also, the key data management table may hold a current use key remaining effective time data in addition to the current use decipher key and the current use key identifier. The key managing section may decrease the current use key remaining effective time data as time elapses, may read out the current use decipher key, the current use key identifier and the current use key remaining effective time data in response to a key data request to transmit to a request issuing client.

In this case, the key managing section may generate as a current use key data, a set of a current use cipher key, the current use decipher key, the current use key identifier and the current use key remaining effective time data in response to a key data generating request, may store the current use key data in the key data management table, and may transmit a set of the current use cipher key and the current use key identifier as a current use encipherment key data to a request generating deliver server.

Also, the key managing section may generate as a next use key data, a set of a next use cipher key, a next use decipher key, a next use key identifier and a next use key remaining effective time data in response to a next use key data generating request, may store the next use key data in the key data management table, and may transmit a set of the next use cipher key and the next use key identifier as a current use encipherment key data to a request generating deliver server.

Also, the key managing section may read out the next use decipher key, the next use key identifier and the next use key remaining effective time data in response to a next use key data request to transmit to a request issuing client.

Also, the key managing section may receive the current use decipher key, the current use key identifier and a current use key remaining effective time data from a deliver server, may store in the key data management table, may receive a next use decipher key, a next use key identifier and a next use key remaining effective time data from the deliver server, and may store in the key data management table.

In this case, the key managing section may transmit a set of the next use cipher key, the next use key identifier and the next use key remaining effective time data as a next use encipherment key data to a request generating deliver server.

The key management server may further include a key managing section detects a data amount of the multicast packets and charges a fee to the client terminal based on the detected data amount. Instead, The key management server may further include a key managing section detects the number of the key data requests and charges a fee to the client terminal based on the detected number of key data requests.

In another aspect of the present invention, a client terminal in a multicast delivery system includes a key data management table and a key managing section. The key data management table holds a current use decipher key and a current use key identifier for the current use decipher key. The key managing section issues a current use key data request to acquire a current use key data of the current use decipher key and the current use key identifier, stores the current use key data in the key data management table, determines whether a transmission key identifier contained in a multicast packet with an enciphered data is present in the key data management table, deciphers the enciphered data by using the decipher key stored in the key data management, when it is determined that the transmission key identifier is present, issues a next use key data request to acquire a next use key data of a next use decipher key and a next use key identifier, when it is determined that the transmission key identifier is not present, and stores the next use key data in the key data management table.

Here, the key data management table may hold a current use key remaining effective time data in addition to the current use decipher key and the current use key identifier. The key managing section may decrease the current use key remaining effective time data as time elapses, may issue the next use key data request when the current use key remaining effective time data becomes a predetermined value, may acquire the next use key data of the next use decipher key and the next use key identifier, and may store the next use key data in the key data management table.

Also, in another aspect of the present invention, a software product executable by a computer and storing a program realizing functions of: referring to a key data management table to acquire a current use cipher key;

enciphering delivery data by using the current use cipher key to generate enciphered data; and transmitting a multicast packet containing the enciphered data and the current use key identifier indicative of a pair of the current use cipher key and a current use decipher key as current use keys.

Here, in the software product, the program further executes the function: generating a current use encipherment key data of the current use cipher key, the current use decipher key and the current use key identifier;

storing the current use cipher key and the current use key identifier in the key data management table; and transmitting a set of the current use decipher key and the current use key identifier as a current use decipherment key data to a key management server.

Also, the program may further executes the functions of:

generating a current use encipherment key data of the current use cipher key, the current use decipher key, the current use key identifier and a current use key remaining effective time data;

storing the current use cipher key, the current use key identifier and the current use key remaining effective time data in the key data management table, and transmits a set of the current use decipher key, the current use key identifier and the current use key remaining effective time data as a current use decipherment key data to a key management server.

Also, the program may further executes the function of:

issuing a next use key data generating request, and receives and stores a next use cipher key and a next use key identifier in the key data management table.

Also, the program may further executes the functions of:

storing a current use key remaining effective time data in addition to the current use cipher key and the current use key identifier in the key data management table;

decreasing the current use key remaining effective time data as time elapses;

issuing a next use key data generating request, when the current use key remaining effective time data becomes a first preset value; and receiving and storing a next use cipher key and a next use key identifier in the key data management table.

Also, the program may further executes the functions of:

issuing a use key data change previous notice to client terminals, while using the current use cipher key.

In another aspect of the present invention, a software product is executable by a computer and stores a program executing functions of:

storing a current use decipher key and a current use key identifier for the current use decipher key in a key data management table; and reading out the current use decipher key and the current use key identifier in response to a key data request to transmit to a request issuing client.

Here, the program may further executes the functions of:

generating as a current use key data, a set of a current use cipher key, the current use decipher key and the current use key identifier in response to a key data generating request; and storing the current use key data in the key data management table, and transmits a set of the current use cipher key and the current use key identifier as a current use encipherment key data to a request generating deliver server.

In this case, the program may further executes the functions of:

generating as a next use key data, a set of a next use cipher key, a next use decipher key and a next use key identifier in response to a next key data generating request;

storing the next use key data in the key data management table; and transmitting a set of the next use cipher key and the next use key identifier as a next use encipherment key data to a request generating deliver server.

Also, the program may further executes the functions of:

receiving the current use decipher key and the current use key identifier from a deliver server;

storing in the key data management table;

receiving a next use decipher key and a next use key identifier from the deliver server; and storing in the key data management table.

Also, the program may further executes the functions of:

storing a current use key remaining effective time data in addition to the current use decipher key and the current use key identifier in the key data management table; and decreasing the current use key remaining effective time data as time elapses; and reading out the current use decipher key, the current use key identifier and the current use key remaining effective time data in response to a key data request to transmit to a request issuing client.

In this case, the program may further executes the functions of:

generating as a current use key data, a set of a current use cipher key, the current use decipher key, the current use key identifier and the current use key remaining effective time data in response to a key data generating request;

storing the current use key data in the key data management table; and transmitting a set of the current use cipher key and the current use key identifier as a current use encipherment key data to a request generating deliver server.

In this case, the program may further executes the functions of:

generating a next use key data of a next use cipher key, a next use decipher key, a next use key identifier and a next use key remaining effective time data in response to a next use key data generating request;

storing the next use key data in the key data management table; and transmitting a set of the next use cipher key and the next use key identifier as a current use encipherment key data to a request generating deliver server.

In this case, the program may further executes the functions of:

reading out the next use decipher key, the next use key identifier and the next use key remaining effective time data in response to a next use key data request to transmit to a request issuing client.

Also, the program may further executes the functions of:

receiving the current use decipher key, the current use key identifier and a current use key remaining effective time data from a deliver server;

storing in the key data management table;

receiving a next use decipher key, a next use key identifier and a next use key remaining effective time data from the deliver server; and storing in the key data management table.

Also, the program may further executes the functions of:

transmitting a set of the next use cipher key, the next use key identifier and the next use key remaining effective time data as a next use encipherment key data to a request generating deliver server.

Also, the program may further executes the functions of:

detecting a data amount of the multicast packets and charging a fee to the client terminal based on the detected data amount.

Also, the program may further executes the functions of:

detecting the number of the key data requests and charging a fee to the client terminal based on the detected number of key data requests.

In another aspect of the present invention, a software product is executable by a computer and stores a program executing the functions of:

storing a current use decipher key and a current use key identifier for the current use decipher key in a key data management table; and issuing a current use key data request to acquire a current use key data of the current use decipher key and the current use key identifier, stores the current use key data in the key data management table;

determining whether a transmission key identifier contained in a multicast packet with an enciphered data is present in the key data management table;

deciphering the enciphered data by using the decipher key stored in the key data management, when it is determined that the transmission key identifier is present;

issuing a next use key data request to acquire a next use key data of a next use decipher key and a next use key identifier, when it is determined that the transmission key identifier is not present; and storing the next use key data in the key data management table.

Here, the program may further executes the functions of:

storing a current use key remaining effective time data in addition to the current use decipher key and the current use key identifier in the key data management table;

decreasing the current use key remaining effective time data as time elapses;

issuing the next use key data request when the current use key remaining effective time data becomes a predetermined value;

acquiring the next use key data of the next use decipher key and the next use key identifier; and storing the next use key data in the key data management table.

DESCRIPTION OF THE PREFERRED EMBODIMENTS

Hereinafter, a key management system of a multicast delivery system according to the present invention will be described in detail with reference to the attached drawings.

First Embodiment

Figure 1:
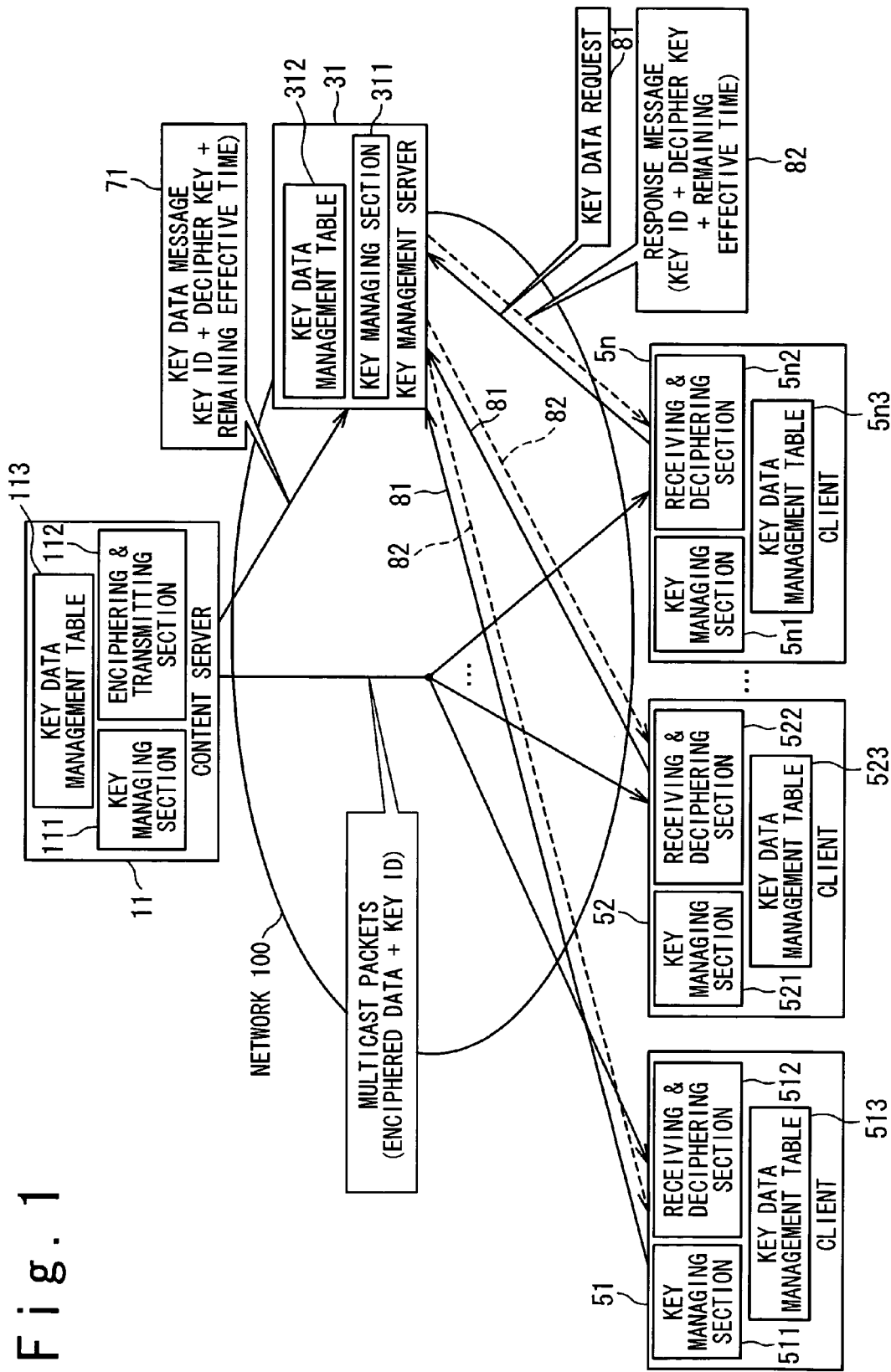
FIG. 1 is a block diagram showing the configuration of a key management system of a multicast delivery system according to a first embodiment of the present invention.

FIG. 1 is a block diagram showing the structure of the key management system of the multicast delivery system according to the first embodiment of the present invention. Referring to FIG. 1, the key management system of the multicast delivery system according to this embodiment is composed of a content server 11, a key management server 31 and clients 51 to 5n (n is a positive integer more than 1). The content server 11, the clients 5i and the key management server 31 are connected by a network 100. The content server 11 holds as a key data, a set of keys (a cipher key and a decipher key), a key identifier for the keys, and a remaining effective time of the keys about each of current use keys and next use keys, and transmits the key data to the key management server 31 as a key data message 71. Also, the content server 11 enciphers delivery data by using the current use cipher key and transmits multicast packets containing the enciphered data to the clients 5i (i is a positive integer between 1 and n). The client 5i receives the multicast packets transmitted from the content server 11 and deciphers the enciphered data containing the multicast packets. Also, the client 5i issues a key data request to the key management server 31. The key management server 31 receives the key data message 71 from the content server 11 and holds it therein. Also, the key management server 31 transmits a key data response message 82 to the client 5i in response to the key data request 81 from the client 5i.

The content server 11 is composed of a key managing section 111, an enciphering & transmitting section 112 and a key data management table 113. The key managing section 111 generates as a key data, a set of keys (a cipher key and a decipher key), a key identifier for the keys, and a remaining effective time of the keys. The key data is for current use keys and next use keys. The key data management table 113 stores and holds the key data about the current use keys and the next use keys. In this way, the key data management table 113 may hold a plurality of key data. The current use cipher key is used to encipher delivery data, and the key identifier is used to identify the current use keys. The remaining effective time shows a remaining time period during which the current use keys are effective.

The key management server 31 is composed of a key managing section 311 and a key data management table 312. The key data management table 312 holds as a key data, a set of a decipher key, a key identifier to identify the decipher key and the remaining effective time of the decipher key. The key data management table 312 holds the key data about each of the current use decipher key and the next use cipher key. It should be noted that the key data management table 312 does not have data in an initial state. It should be noted that the cipher key and the decipher key which are used in enciphering and deciphering processes may be same or different depending on a cipher system. In either case, these keys are identified based on the same key identifier.

The client 5i contains a key managing section 5i1 (i is an integer between 1 and n), a receiving & deciphering section 5i2 and a key data management table 5i3. The key data management table 5i3 holds as a key data, a set of a decipher key, a key identifier to identify the decipher key used to decipher the multicast packets delivered from the content server 11 and a remaining effective time of the decipher key. Also, the key data management table 5i3 holds the key data about the next use decipher key in addition to the key data about the current use decipher key. It should be noted that the key data management table 5i3 does not have data in an initial state.

The content server 11, the key management server 31 and the client 5i update the remaining effective times of the key data in the key data management table 113, the key data management table 312 and the key data management table 5i3 for every predetermined time, respectively. That is, they update them based on a self-clock signal.

Figure 2:
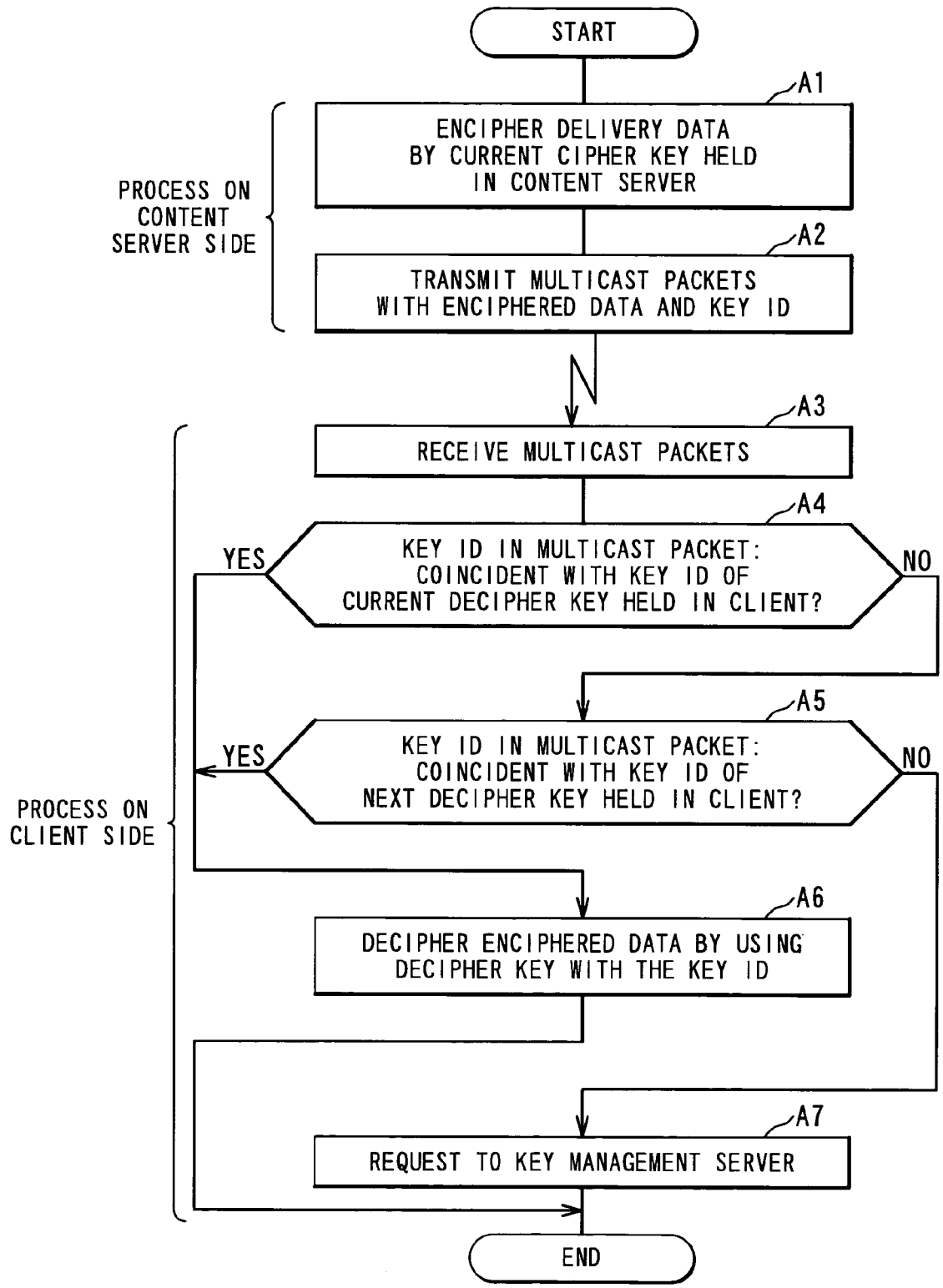
FIG. 2 is a flow chart showing a multicast packet transmitting and receiving process in the key management system of the multicast delivery system according to the first embodiment.
Figure 3:
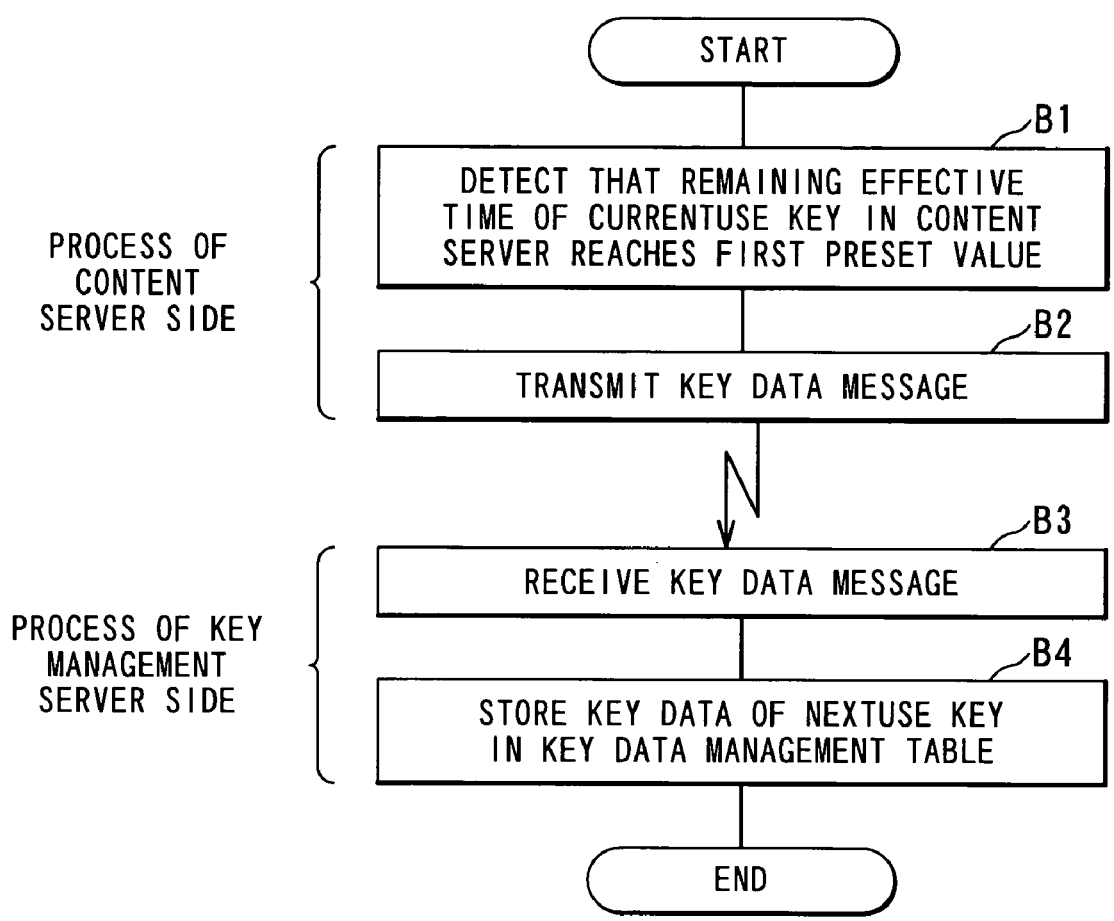
FIG. 3 is a flow chart showing a key management process in the key management system of the multicast delivery system according to the first embodiment.
Figure 4:
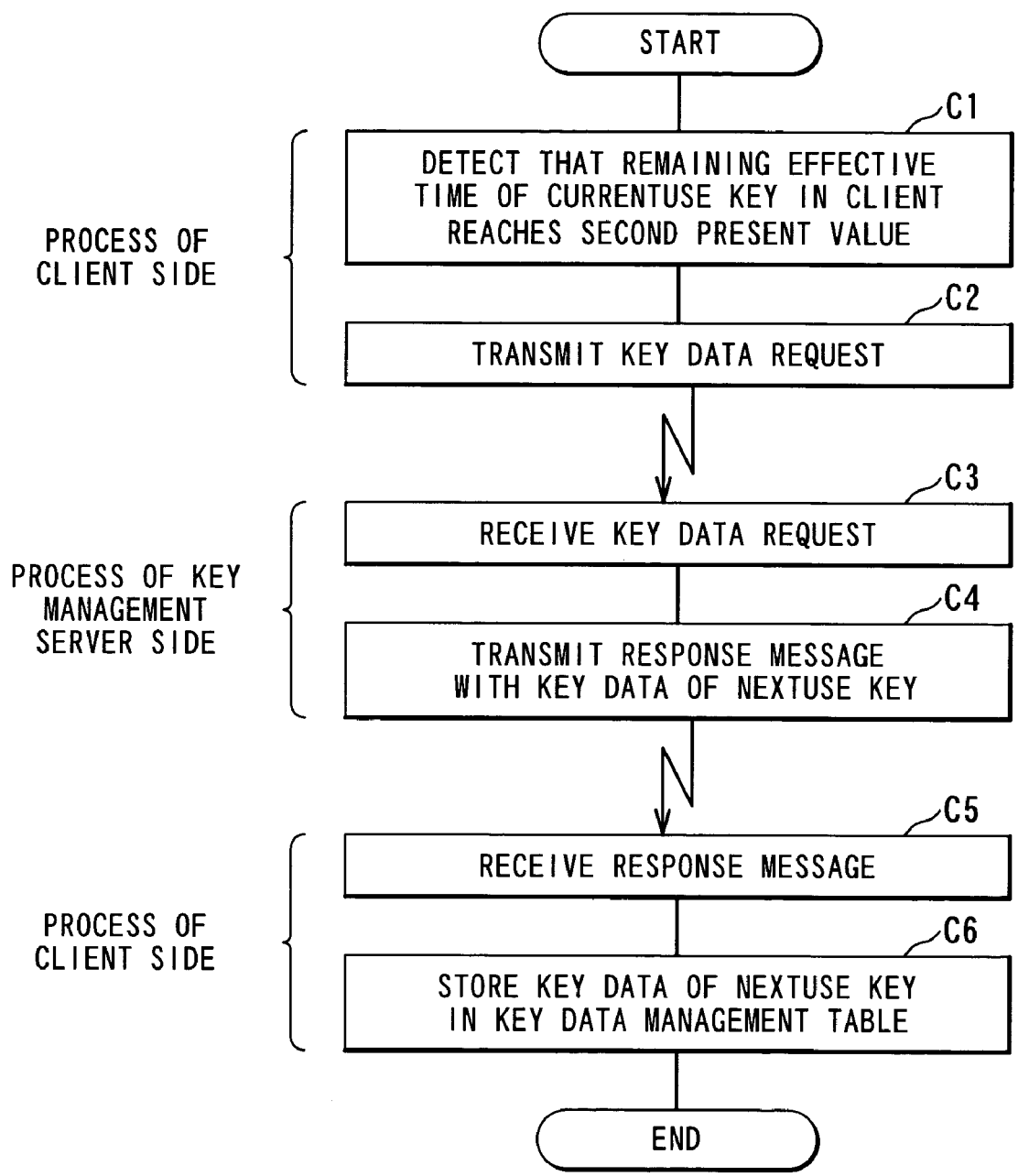
FIG. 4 is a flow chart showing a key management process in the key management system of the multicast delivery system according to the first embodiment.
Figure 5:
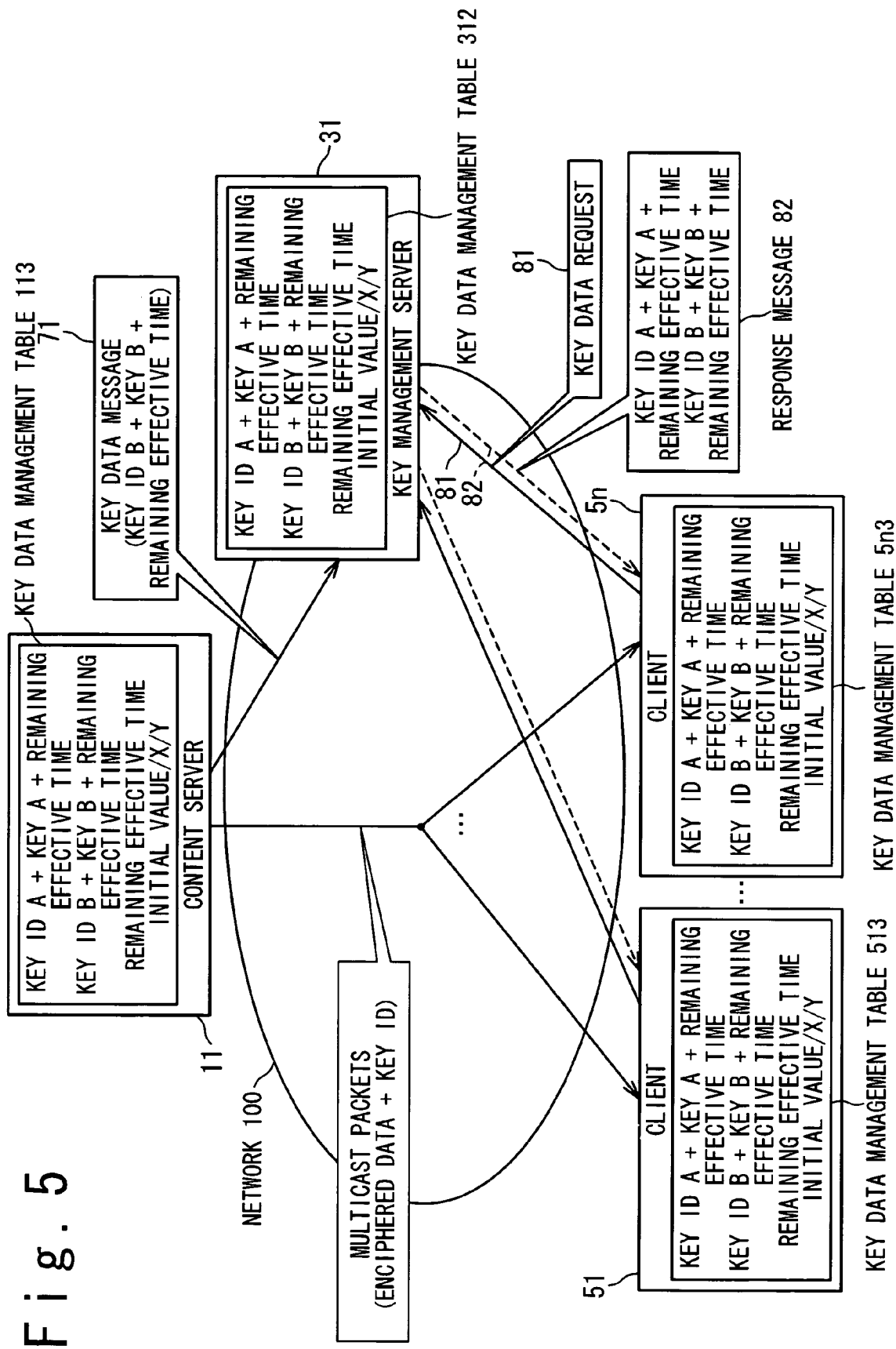
FIG. 5 is a block diagram showing a specific operation of the key management system of the multicast delivery system according to the first embodiment.
Figure 6:
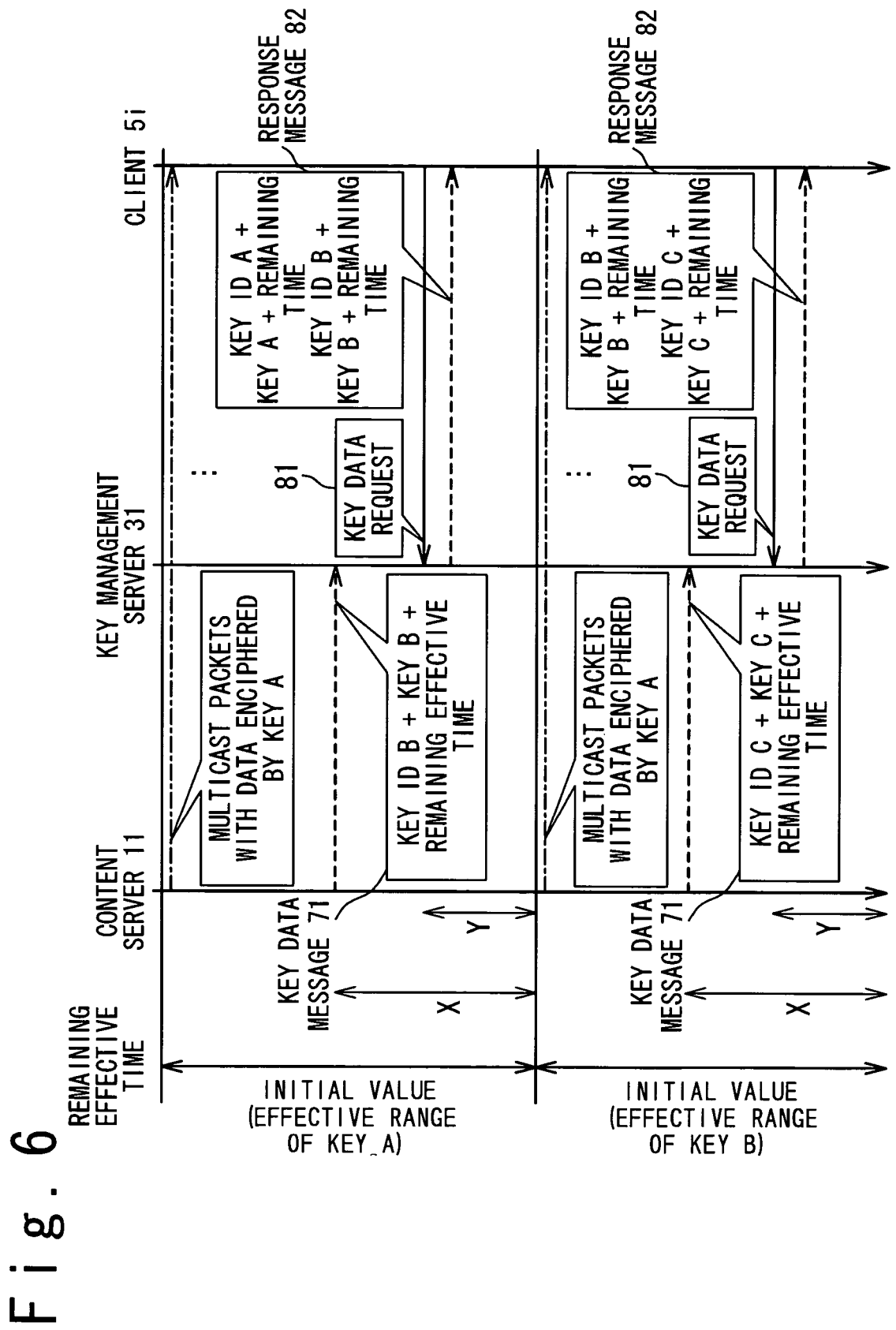
FIG. 6 is a sequence diagram showing the specific operation of the key management system of the multicast delivery system according to the first embodiment.

FIG. 2 is a flow chart showing a multicast packet transmitting and receiving process in the key management system of the multicast delivery system according to this embodiment. This process is composed of a delivery data ciphering step A1, a multicast packet transmission step A2, a multicast packet reception step A3, a current use key identifier coincidence determination step A4, a next use key identifier coincidence determination step A5, an enciphered data decipher step A6, and a key management server request step A7. FIG. 3 is a flow chart showing a process in the key management system of the multicast delivery system according to this embodiment when a value of the remaining effective time of the current use key becomes a first preset value. This process is composed of a first preset value recognition step B1, a key data request transmission step B2, a key data message reception step B3 and a next use key data storage step B4. FIG. 4 is a flow chart showing a process in the key management system of the multicast delivery system according to this embodiment when the value of the remaining effective time of the current use key becomes a second preset value. This process is composed of a second preset value recognition step C1, a key data request transmission step C2, a key data request reception step C3, a response message transmission step C4, a response message reception step C5, and a next use key data storage step C6. FIG. 5 is a block diagram showing a specific operation in the key management system of the multicast delivery system according to this embodiment. FIG. 6 is a sequence diagram showing a specific operation in the key management system of the multicast delivery system according to this embodiment.

Next, the operation of the whole key management system of the multicast delivery system according to this embodiment will be described in detail with reference to FIGS. 1 to 6.

First, the operation of the multicast packet transmitting and receiving process which is carried out through the network 100 from the content server 11 to the client 5i will be described (see FIG. 2).

The enciphering & transmitting section 112 of the content server 11 acquires a current use cipher key from a key data about the current use keys by referring to the key data management table 113 in case of the multicast delivery, and enciphers the delivery data by using the current use cipher key (Step A1). After that, the enciphering & transmitting section 112 transmits multicast packets containing the enciphered delivery data and the key identifier of the current use keys onto the network 100 (Step A2).

The receiving & deciphering section 5i2 of the client 5i that participates in a multicast delivery receives the multicast packets transmitted from the content server 11 (step A3) and carries out a deciphering process of the enciphered data contained in the received multicast packets. In the deciphering process, the receiving & deciphering section 5i2 first refers to the key data management table 5i3 and acquires a key identifier of the current use key of the key data. Then, the receiving & deciphering section 5i2 compares the key identifier set in the received multicast packet and the acquired key identifier and determines whether both of the key identifiers are coincident with each other (Step A4). When both of the key identifiers are determined to be coincident with each other at the step A4, the receiving & deciphering section 5i2 deciphers the enciphered data contained in the multicast packets by using the current use decipher key corresponding to the key identifier (Step A6). On the other hand, when both of the key identifiers are determined not to be coincident with each other at the step A4, the receiving & deciphering section 5i2 refers to the key data management table 5i3 and acquires a key identifier contained in the key data about a key to be used next as a next use key. The receiving & deciphering section 5i2 compares the key identifier contained in the multicast packet and the stored key identifier of the next use key and determines whether both of the key identifiers are coincident with each other (Step A5). When both of the key identifiers are determined to be coincident with each other at the step A5, the receiving & deciphering section 5i2 carries out the decipherment of the enciphered data contained in the multicast packet by using the decipher key corresponding to the key identifier (Step A6). When both the key identifiers are determined not to be coincident with each other at the step A5, including a case where the key data about the next use key does not exist in the key data management table 5i3, that is, when neither of the key identifiers of the current use key and the next use key is coincident with the key identifier contained in the multicast packet, it means that an acquiring process of the key data is not carried out yet. Therefore, the receiving & deciphering section 5i2 issues a key data request to the key management server 31 (Step A7).

Next, an operation during a period during which the value of the remaining effective time of the current use key varies from an initial value to the first preset value smaller than the initial value will be described. In this period, the key data management table 113 of the content server 11 holds as the key data, a set of the keys (a cipher key and a decipher key), the key identifier for the keys and the remaining effective time of the keys, for each of the current use keys and the next use keys. These key data are generated by the key managing section 111. Also, in this period, the key data management table 312 of the key management server 31 stores and holds as a key data, a set of the decipher key, the key identifier for the decipher key and the remaining effective time of the decipher key, for the current use decipher key. Moreover, in this period, the key data management table 5i3 of the client 5i holds the key data about the current use decipher key. That is, the key data management table 5i3 of the client 5i holds the key data about the current use decipher key. It should be noted that when the client 5i participates in the multicast delivery newly in this period, the key managing section 5i1 of the client 5i transmits a key data request 81 to the key management server 31. The key managing section 311 of the key management server 31 transmits the key data response message 82 containing the key data about the current use decipher key to the client 5i.

Next, an operation of the key management system when the value of the remaining effective time of the current use key becomes a first preset value will be described with reference to FIG. 3. When recognizing that the value of the remaining effective time of the current use key managed by the key data management table 113 became the first preset value, i.e. when the value of the remaining effective time decreases and reaches the first preset value (Step B1), the key managing section 111 of the content server 11 transmits a key data message 71 containing a key data (a set of a next use decipher key, a key identifier for the next use decipher key, and the remaining effective time) about the next use decipher key to the key management server 31 (Step B2). The key managing section 311 of the key management server 31 receives the key data message 71 from the content server 11 (step B3), and stores and holds the key data about the next use decipher key of the key data message 71 in the key data management table 312 (Step B4). By this, the key data management table 312 of the key management server 31 holds the key data about the current use decipher key and the key data about the next use decipher key. It should be noted that when the client 5i newly participates in the multicast delivery in the period from the current time to the time when the value of the remaining effective time of the current use key becomes the second preset value to be described later, the key managing section 5i1 of the client 5i transmits the key data request 81 to the key management server 31. At this time, the key managing section 311 of the key management server 31 transmits the response message 82 containing the key data about the current use decipher key and the key data about the next use decipher key to the client 5i.

Next, an operation of the key management system when the value of the remaining effective time of the current use key becomes the second preset value smaller than the first preset value and larger than 0 will be described with reference to FIG. 4. The key managing section 5i1 of the client 5i recognizes that the value of the remaining effective time decreases and reaches the second preset value when the value of the remaining effective time of the current use key in the key data management table 5i3 became the second preset value (Step C1). At this time, the key managing section 5i1 transmits the key data request 81 to the key management server 31 in order to get the key data about the next use decipher key (Step C2). It should be noted that the address of the key management server 31 as a transmission destination of the key data request 81 is previously set by the client 5i. The key managing section 311 of the key management server 31 receives the key data request 81 from the client 5i (step C3), and transmits the key data response message 82 containing the key data about the current use decipher key and the key data about the next use decipher key to the client 5i in response to the request (Step C4). When the client 5i receives this response message 82 (step C5), the client 5i stores the key data about the next use decipher key of the response message 82 in the key data management table 5i3 (Step C6).

Next, an operation of the key management system when the value of the remaining effective time of the current use key becomes 0 will be described. When the remaining effective time of the current use keys held in the key data management table 113 becomes 0, the key managing section 111 of the content server 11 discards the key data about the current use keys, and sets the key data about the next use keys held in the key data management table 113 to the key data about the new current use keys. Thus, the enciphering & transmitting section 112 carries out an encrypting process hereinafter using the new current use cipher key. AT this time, the key managing section 111 generates new next use keys (a cipher key and a decipher key) and stores the key data about the new next use keys in the key data management table 113. Also, the enciphering & transmitting section 112 changes the key identifier set in the multicast packet containing enciphered data into a key identifier to the new current use keys and shows to the client 5i that the current use keys are changed. When confirming that the key identifier contained in the multicast packet sent from the content server 11, i.e., the multicast packet received by the receiving & deciphering section 5i2 is changed, the key managing section 5i1 of the client 5i stores the next use decipher key having the key identifier in the key data management table 5i3 as the new current use decipher key. At this time, because the client 5i does not get the new next use key yet, the client 5i becomes the state in which the client 5i does not have the key data about the next use key in the key data management table 5i3. On the other hand, when the remaining effective time of the key data about the current use key held by the key data management table 312 becomes 0, the key managing section 311 of the key management server 31 discards the key data about the current use key, and stores the key data held as the key data about the next use key in the key data management table 312 as the key data about the new current use key. At this time, the key management server 31 becomes the state in which the key management server 31 does not have the key data about the next use key in the key data management table 312, because the key management server 31 does not get the new next use key yet. It should be noted that as the method of setting initial values, i.e., the first preset value X and the second preset value Y of the remaining effective time, the following methods shown by (ia) or (ib) could be considered.

(ia) The preset values are set manually as common preset values in the whole multicast delivery system.

(ib) The initial value is transmitted to the respective apparatuses (the key management server and the clients) together with the remaining effective time of the key, and the preset values are determined as X and Y from the initial values in accordance with a rate predetermined by the respective apparatuses. In this case, the predetermined rate is set in common to the whole multicast delivery system. More specifically, when the initial value of the remaining effective time of the key is 1 hour, X is set to 30 minutes if X is set to 50% of the initial value of the remaining effective time of the key, and Y is set to 15 minutes if Y is set to 25% of the initial value of the remaining effective time of the key.

Next, a specific operation of the key management system of the multicast delivery system according to this embodiment will be described with reference to FIGS. 5 and 6. FIG. 5 is a diagram showing data stored in each key data management table and the contents of each packet/request/message. It should be noted that in FIG. 5, the current use key is shown by the key A, the next use key is shown by the key B and these key identifiers are written as a key identifier A and a key identifier B. Also, in this example, the cipher key and the decipher key are the same (for example, the key A is the cipher key and the decipher key). Moreover, the first preset value is shown by X and the second preset value is shown by Y. FIG. 6 is a diagram showing the operation sequence when the data of the contents as shown in FIG. 5 is handled. In this operation sequence, in the initial state, i.e., in the state that the value of the remaining effective time of the key A is the initial value, the content server 11 has the key data about the key A of the current use key and the key data about the key B of the next use key. Also, the key management server 31 and the client 5*i* have only the key data about the key A. It is supposed that the initial value and the values of X and Y of the remaining effective time are previously set in the content server 11, the key management server 31 and the clients 5*i*.

When the value of the remaining effective time of the key A becomes the first preset value X, the content server 11 transmits the key data message 71 containing the key data about the key B as the next use key to the key management server 31. Thus, the key management server 31 has the key data about the key A and key B, as shown in FIG. 5.

When the value of the remaining effective time of the key A becomes the second preset value Y, the client 51 transmits the key data request 81 to the key management server 31 to request the key data about the next use key. In response to the reception of the key data request 81, the key management server 31 transmits the key data response message 82 containing the key data about the key A as the current use key and the key data about the key B as the next use key. Thus, the client 51 has the key data about the key A and key B, as shown in FIG. 5.

When the value of the remaining effective time of the key A becomes 0, the content server 11 discards the key data about the key A as the current use key, and sets the stored key B as the next use key, to the new current use key and enciphers delivery data using the key B. Also, at this time, the content server 11 generates the key C as the new next use key and stores the key data about the key C in the key data management table 113. The key data about the key C is transmitted from the content server 11 to the key management server 31 by the key data message 71 when the remaining effective time of the key B becomes X.

When the value of the remaining effective time of the key A becomes 0, the key management server 31 discards the key data about the key A and sets the key B stored as the next use key to the current use key. Moreover, when receiving the key data about the key C by the key data message 71 from the content server 11, the key management server 31 stores the key data about the key C in the key data management table 312 as the key data about the next use key. Thus, in the key data management table 312, the key data about the key A shown in FIG. 5 is replaced by the key data about the key B and the key data about the key B shown in FIG. 5 is replaced by the key data about the key C.

When receiving the multicast packet containing the key identifier of the key B from the content server 11, the client 51 discards the key data about the key A and sets the key B stored as the next use key to the current use key. Moreover, when receiving the key data about the key C as a key used next to the key B by the key data response message 82 from the key management server 31, the client 5*i* stores the key data about the key C in the key data management table 5*i*3. Thus, the key data held by the key data management table 5*i*3 are changed into the state that the key data about the key A in FIG. 5 is replaced by the key data about the key B and the key data about the key B in FIG. 5 is replaced by the key data about the key C.

By repeating the above-mentioned operation, the client 5*i* becomes possible to acquire the key data about the next use key before the change of the key is carried out. It should be noted that in this embodiment, communication delays due to the communication among the content server 11, the key management server 31 and the client 5*i* are not considered. Therefore, it could be considered that a small difference is caused in the value of the remaining effective time of the key data with the same key identifier in each of the key data management tables 113, 41 and 5*i*3 due to the communication delays. There is little possibility that such a difference becomes a problem actually. However, if such a difference is considered, the appropriate approaches as shown by the following (iia) and (iib) becomes possible.

(iia) Even if the enciphered data by using the next use key (the multicast packet containing the enciphered data and the key identifier of the next use key) is received before the remaining effective time of the current use key becomes 0, the client 5*i* specifies the decipher key and can decipher the enciphered data by using the decipher key because it holds the key data about the next use key.

(iib) Even if the enciphered data by using an old current use key is received after the remaining effective time becomes 0, the client 5*i* can decipher the enciphered data by using the old current use encipher key, until the client 5*i* receives the multicast packet containing the key identifier of the new current use key, because the client 5*i* holds the key data about the old current use decipher key.

The following modifications as to the above first embodiment will be possible about the data contained in the multicast packet that is delivered from the content server 11 to the client 5*i* (a modification in which the following modifications (Ex. A) and (Ex. B) are combined is also possible).

Ex. a: In the above-mentioned first embodiment, the multicast packet had the enciphered data and the key identifier. However, the address of the key management server 31 (containing data of a destination to be referred to) may be added. In this way, by transmitting a multicast packet in which the key management server address is added, it is made unnecessary that the client 5*i* sets a destination of the inquiry and request of the key data (a transmission destination of the key data request 81).

Ex. b: Also, the remaining effective time of the key identified by the key identifier of the multicast packet may be added to the multicast packet.

Second Embodiment

Figure 7:
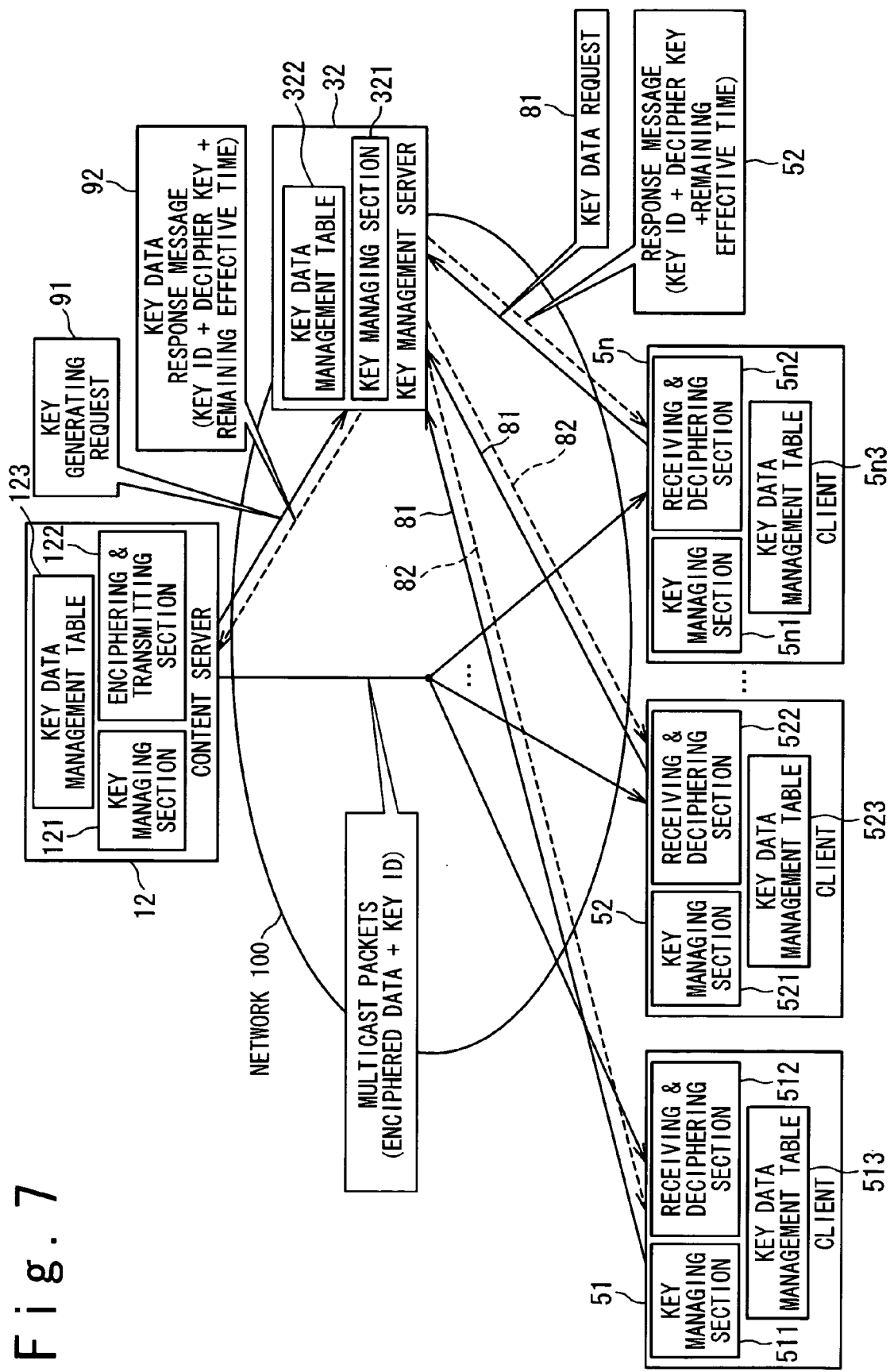
FIG. 7 is a block diagram showing the configuration of the key management system of the multicast delivery system according to a second embodiment of the present invention.

FIG. 7 is a block diagram showing the structure of the key management system of the multicast delivery system according to the second embodiment of the present invention. Referring to FIG. 7, the key management system of the multicast delivery system according to this embodiment is composed of a content server 12 that transmits the multicast packets, the clients 5*i* that receive the multicast packets sent from the content server 12, and a key management server 32. The key management server 32 generates and holds (stores) the keys (the cipher key and the decipher key) in accordance with a key generating request 91 sent from the content server 12, and sends back to the content server 12 a key data response message 92 containing as the key data, a set of the cipher key, and the key identifier to identify the cipher key and the remaining effective time, and transmits the response message 82 in response to the key data request 81 from the client 5*i* (i is the positive integer between 1 to n). The content server 12, the clients 5*i* and the key management server 32 are connected by the network 100.

The content server 12 contains a key managing section 121, an enciphering & transmitting section 122, and a key data management table 123. The key data management table 123 holds as the key data, a set of the cipher key, the key identifier to identify the key used to encipher the data to be delivered by the multicast packets and the remaining effective time of the cipher key (the key data management table can hold a plurality of key data). Also, the key data management table 123 holds the key data about the current use key and the key data about the next use key.

The key management server 32 contains a key managing section 321, and a key data management table 322. The key data management table 322 holds as the key data, a set of the keys (the cipher key and decipher key), the key identifier to identify the keys and the remaining effective time of the keys. It should be noted that the key data management table 322 of the key management server 32 holds the key data of the cipher key and the decipher key, because the keys are generated by the key management server 32 in this embodiment. Also, the key data management table 322 holds the key data about the current use key and the key data about the next use key.

The client 5*i* contains the key managing section 5*i*1, the receiving & deciphering section 5*i*2, and the key data management table 5*i*3. The key data management table 5*i*3 holds as the key data, a set of the decipher key used for the decipherment of the data delivered by the multicast packet, the key identifier to identify the decipher key and the remaining effective time of the decipher key. Also, the key data management table 5*i*3 holds the key data about the current use key and the key data about the next use key. It should be noted that in the initial state, the key data management table 5*i*3 does not have data. Also, the content server 12, the key management server 32 and the client 5*i* updates the remaining effective time of the key data in the key data management table 123 322 and 5*i*3 for every predetermined times, respectively (they carry out the updating based on clock signals in them).

The key management system of the multicast delivery system according to this embodiment is different from the first embodiment in the following point. That is, the content server 12 transmits the key generating request 91 to the key management server 32. The key management server 32 generates the keys (the cipher key and decipher key) in response to the request 91 and sends back to the content server 12, the key data response message 92 containing the key data about the generated cipher key.

Figure 8:
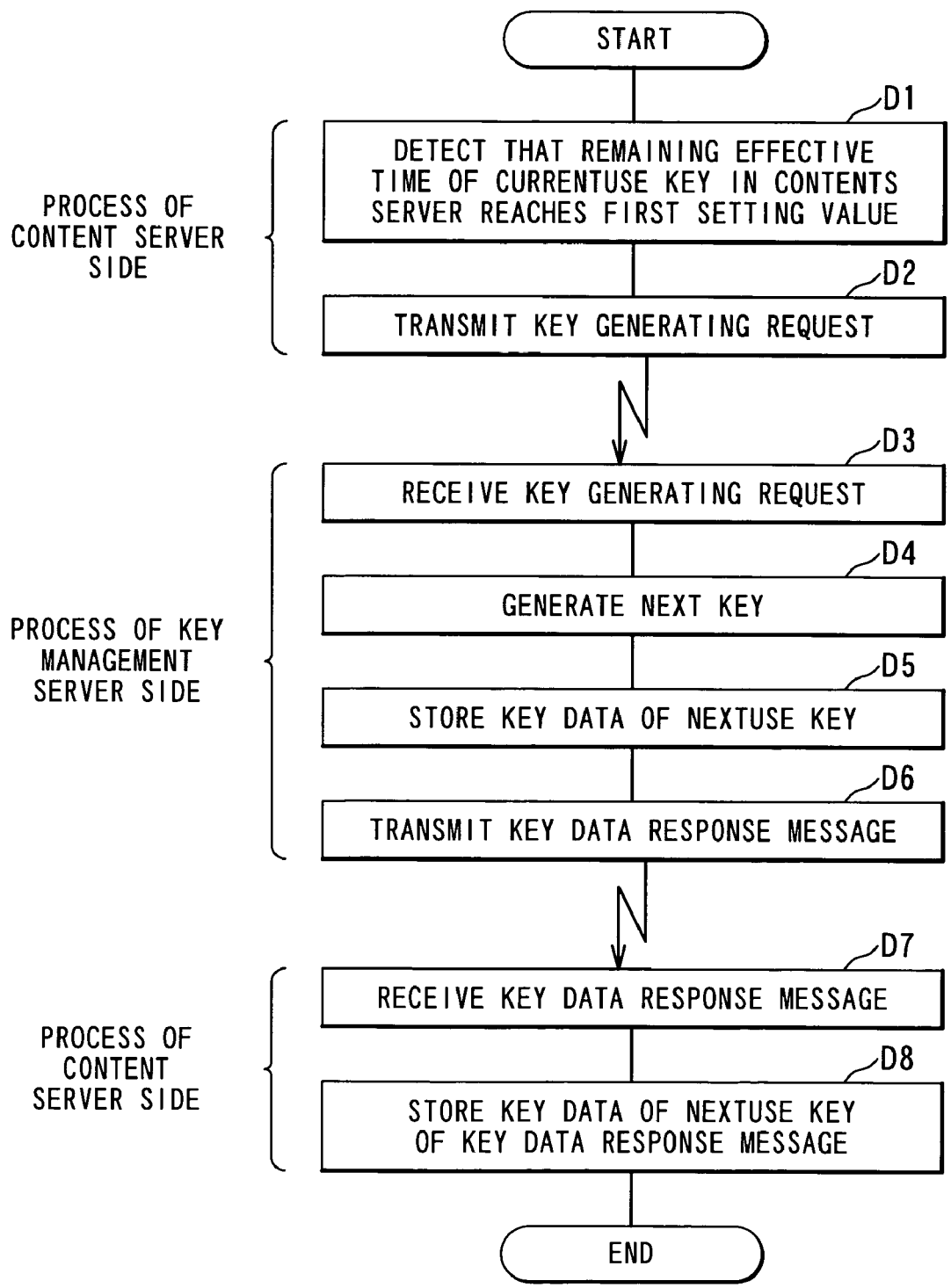
FIG. 8 is a flow chart showing a key management process in the key management system of the multicast delivery system according to the second embodiment.

FIG. 8 is a flow chart showing the operation of the key management system of the multicast delivery system according to this embodiment when the value of the remaining effective time of the current use key becomes the first preset value. This process is composed of a first preset value recognition step D1, a key generating request transmission step D2, a key generating request reception step D3, a next use key generating step D4, the next use key data store step D5, a key data response message transmission step D6, a key data response message reception step D7, and a next use key data store step D8.

First, the operation in the multicast packet transmitting and receiving process carried out through the network 100 between the content server 12 and the client 5*i* will be described. This operation is the same as the operation of the first embodiment, i.e., the operation of the multicast packet transmitting and receiving process carried out through the network 100 between the client 5*i* and the content server 11 in FIG. 1.

Next, an operation of the key management system during a period in which the value of the remaining effective time of the current use key is from the initial value to the first preset value smaller than the initial value will be described. During this period, the key data management table 123 of the content server 12 holds the key data (the set of the key, the key identifier and the remaining effective time) of the current use cipher key. These keys and the key identifier are generated by the key managing section 321 of the key management server 32. Also, during this period, the key data management table 322 of the key management server 32 holds the key data (the set of the keys, the key identifier and the remaining effective time) of the current use keys (the cipher key and decipher key). These keys and the key identifier are generated by the key managing section 321 of the key management server 32. It should be noted that the operation other than the above operation is the same as that of the first embodiment.

Next, the operation of the key management system when the value of the remaining effective time of the current use key becomes the first preset value will be described with reference to FIG. 8. In the first embodiment, when recognizing that the value of the remaining effective time of the current use key became a first preset value, the content server 11 transmits the key data message 71 to the key management server 31. On the other hand, in the second embodiment, when recognizing that the value of the remaining effective time of the current use key stored in the key data management table 123 became or reached the first preset value (Step D1), the key managing section 121 of the content server 12 transmits the key generating request 91 to the key management server 32 (Step D2) in order to get the key data of the next use cipher key. When receiving the key generating request 91 from the content server 12 (step D3), the key managing section 321 of the key management server 32 generates the next use keys (the cipher key and decipher key) in accordance with the key generating request 91 (Step D4), and stores the key data (the set of the keys, the key identifier and the remaining effective time) of the keys in the key data management table 322 (Step D5). By this, the key data management table 322 of the key management server 32 holds the key data about the current use keys and the key data about the next use keys. Moreover, the key managing section 321 sends back to the content server 12, the key data response message 92 containing the key data about the cipher key generated at the step D4 (the set of the cipher key, the key identifier and the remaining effective time) (Step D6). When receiving the key data response message 92 from the key management server 32 (step D7), the key managing section 121 of the content server 12 stores the key data about the next use cipher key contained in the key data response message 92 in the key data management table 123 (Step D8). By this, the key data management table 123 of the content server 12 holds the key data about the current use cipher key and the key data about the next use cipher key. It should be noted that an operation other than the above operation is the same as that of the first embodiment.

Next, the operation of the key management system when the value of the remaining effective time of the current use key becomes the second preset value smaller than a first preset value and larger than 0 will be described. This operation is same as the operation of the first embodiment.

Next, the operation of the key management system when the value of the remaining effective time of the current use key becomes 0 will be described. When the remaining effective time of the current use key held by the key data management table 123 becomes 0, the key managing section 121 of the content server 12 discards the key data about the current use key, and sets the key data, which has been held as the key data about the next use key in the key data management table 123, to the key data about the new current use key. At this time, the content server 12 is set to the state that does not have the key data about the next use key in the key data management table 123, because it does not get the new next use key yet. Thus, the enciphering & transmitting section 122 carries out the subsequent enciphering process using the current use cipher key. It should be noted that the operation other than the above operation is same as the operation of the first embodiment.

In the above-mentioned first embodiment, when a fault has occurred in the communication between the content server 11 and the key management server 31, it sometimes became not possible to deliver the key (the decipher key). On the other hand, in the second embodiment, when the fault has occurred in the communication between the content server 12 and the key management server 32, the communication of the multicast packet containing enciphered data is possible, by continuing to use a previous key. In this way, as shown in the above-mentioned first and second embodiments, the configuration in which the keys are generated by the content server or by the key management server can be realized in the present invention.

The examples (Ex. A) and (Ex. B) in the first embodiment can be applied to the second embodiment.

Modification of the First Embodiment

Figure 9:
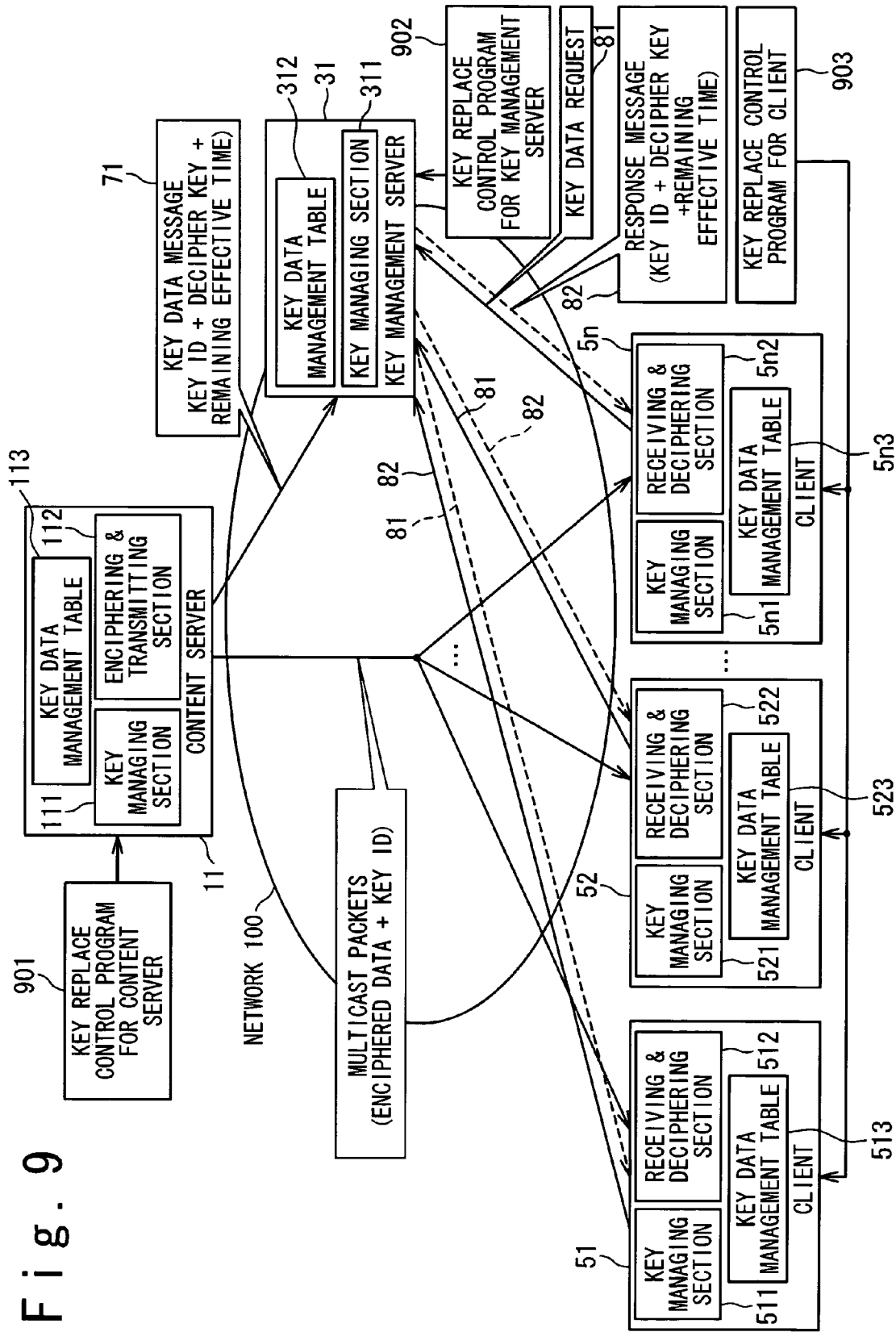
FIG. 9 is a block diagram showing the configuration of a modification of the key management system of the multicast delivery system according to the first embodiment of the present invention.

FIG. 9 is a block diagram showing the configuration of a modification of the key management system of the multicast delivery system according to the first embodiment of the present invention. Referring to FIG. 9, the key management system of the multicast delivery system according to the modification of the first embodiment of the present invention is different from the first embodiment shown in FIG. 1 in a point that a key replace control program 901 for the content server, a key replace control program 902 for the key management server 31 and a key replace control program 903 for the client 5i are provided.

The key replace control program 901 for the content server is read by the content server 11 and controls the operation of the content server 11 as the key data management table 113, the key managing section 111 and the enciphering & transmitting section 112. Because the operations of the content server 11, i.e., the operations in the key data management table 113, the key managing section 111 and the enciphering & transmitting section 112 under the control of the key replace control program 901 for the content server is the same as the operation of the content server 11 in the first embodiment, the detailed description is omitted.

Also, the key replace control program 902 for the key management server is read by the key management server 31 and controls the operation of the key management server 31 as the key data management table 312 and the key managing section 311. The operations of the key management server 31, i.e., the operations of the key data management table 312 and the key managing section 311 under the control of the key replace control program 902 for the key management server is the same as the operation of the key management server 31 in the first embodiment completely, and therefore the detailed description is omitted.

Moreover, the key replace control program 903 for the client is read by the client 5i and controls the operation of the client 5i as the key data management table 5i3, the key managing section 5i1 and the receiving & deciphering section 5i2. The operations of the client 5i, i.e., the operations of the key data management table 5i3, the key managing section 5i1 and the receiving & deciphering section 5i2 under the control of the key replace control program 903 for the client is same as the operation of the client 5i in the first embodiment, and therefore, the detailed description is omitted.

Modification of the Second Embodiment

Figure 10:
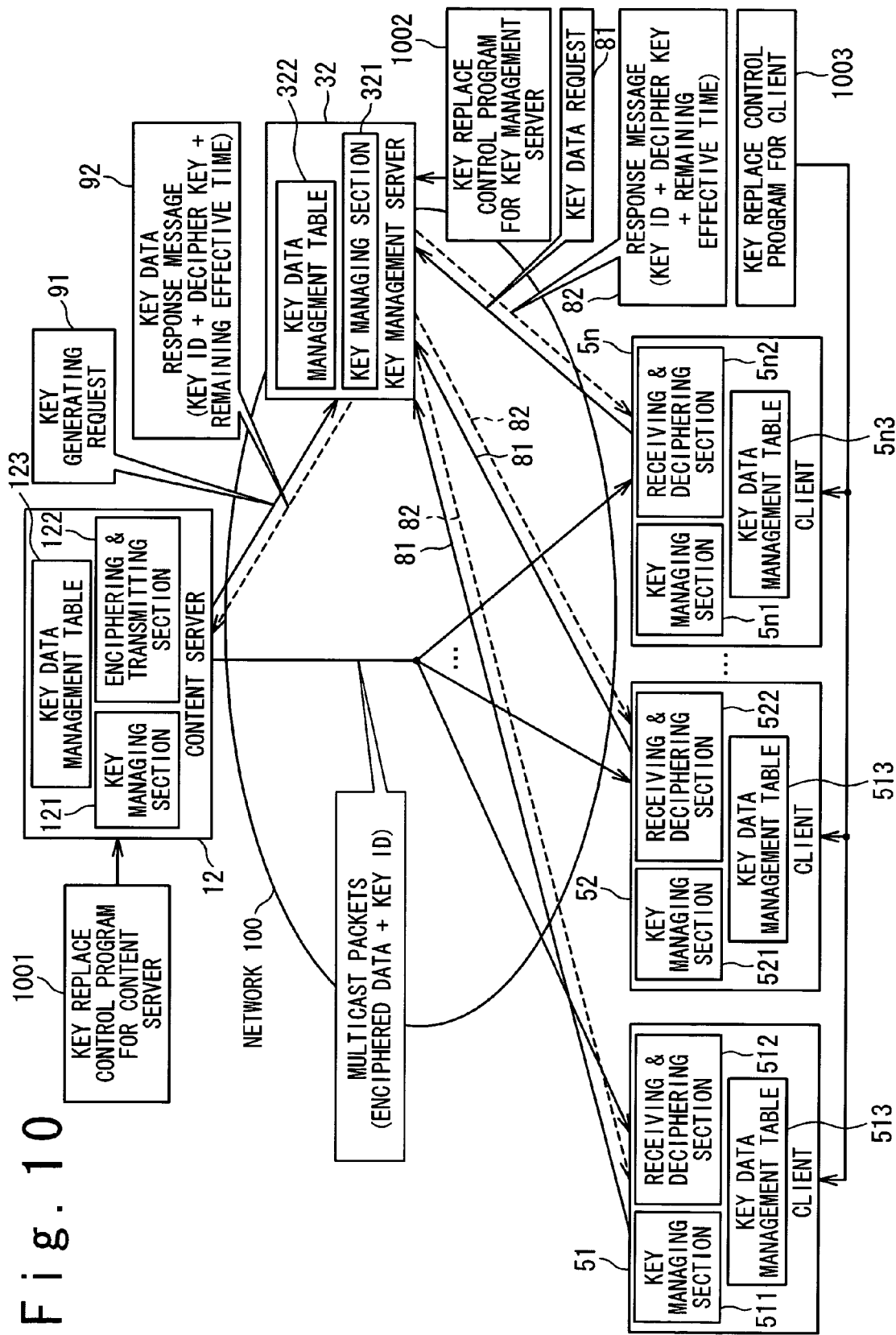
FIG. 10 is a block diagram showing the configuration of a modification of the key management system of the multicast delivery system according to the second embodiment of the present invention.

FIG. 10 is a block diagram showing the configuration of the key management system of the multicast delivery system according to a modification of the fourth embodiment of the present invention. Referring to FIG. 10, the key management system of the multicast delivery system according to the modification of the second embodiment of the present invention is different from the key management system of the multicast delivery system according to the second embodiment shown in FIG. 7 in the point that a key replace control program 1001 for the content server, a key replace control program 1002 for the key management server and a key replace control program 1003 for the client are provided.

The key replace control program 1001 for the content server is read by the content server 12 and controls the operation of the content server 12 as the key data management table 123, the key managing section 121 and the enciphering & transmitting section 122. The operations of the content server 12, i.e., the operations of the key data management table 123, the key managing section 121 and the enciphering & transmitting section 122 under the control of the key replace control program 1001 for the content server is the same as the operation of the content server 12 in the second embodiment, and therefore, the detailed description is omitted.

Also, the key replace control program 1002 for the key management server is read by the key management server 32 and controls the operation of the key management server 32 as the key data management table 322 and the key managing section 321. The operations of the key management server 32, i.e., the operations of the key data management table 322 and the key managing section 321 under the control of the key replace control program 1002 for the key management server is the same as the operation of the key management server 32 in the second embodiment, and therefore, the detailed description is omitted.

Moreover, the key replace control program 1003 for the client is read by the client 5i and controls the operation of the client 5i as the key data management table 5i3, the key managing section 5i1 and the receiving & deciphering section 5i2. The operations of the client 5i, i.e., the operations of the key data management table 5i3, the key managing section 5i1 and the receiving & deciphering section 5i2 under the control of the key replace control program 1003 for the client is the same as the operation of the client 5i in the second embodiment, and therefore the detailed description is omitted.

As described above, according to the present invention, a delay for the acquisition of the new key is not caused in change of the key. That is, the change of the key is possible at the time of the multicast delivery without the key exchange delay. The key data containing the key identifier and the remaining effective time of the key with the key itself is managed and the client can acquire the next use key previously in the term of availability of the current use key. In this way, the decipherment can be immediately carried out using the new key when the key is changed.

Also, it is not necessary to set an address of the key management server as a key requesting destination in the client when the client participates to any multicast delivery. The address of the key management server can be included in the multicast packet transmitted from the content server. Therefore, the client can require the key to the key management server.

Also, the data of the client can be correctly acquired in real time. The delay in the key change can be removed by using the present invention and shorten the change cycle without increase in not to the communication delay.

Also, it is possible to shorten a cycle to collect the data of the clients by the key management server when the client requests the key to the key management server for the decipherment every predetermined time, and the correct data of the clients can be acquired.

Also, the advantage of the cipher system that the clients are restricted through the encipherment to prevent non-permitted clients to acquire the data can be more surely realized.

As mentioned above, it is possible to efficiently realize key change for every predetermined time in the present invention. Therefore, even if the key is leaked out, it is possible to prevent the state that unjust person acquires the data continuously, through the key change.

Also, the clients whom the decipher key is given can be specified by setting clients to be permitted to acquire the data to the key management server.

Figure 11:
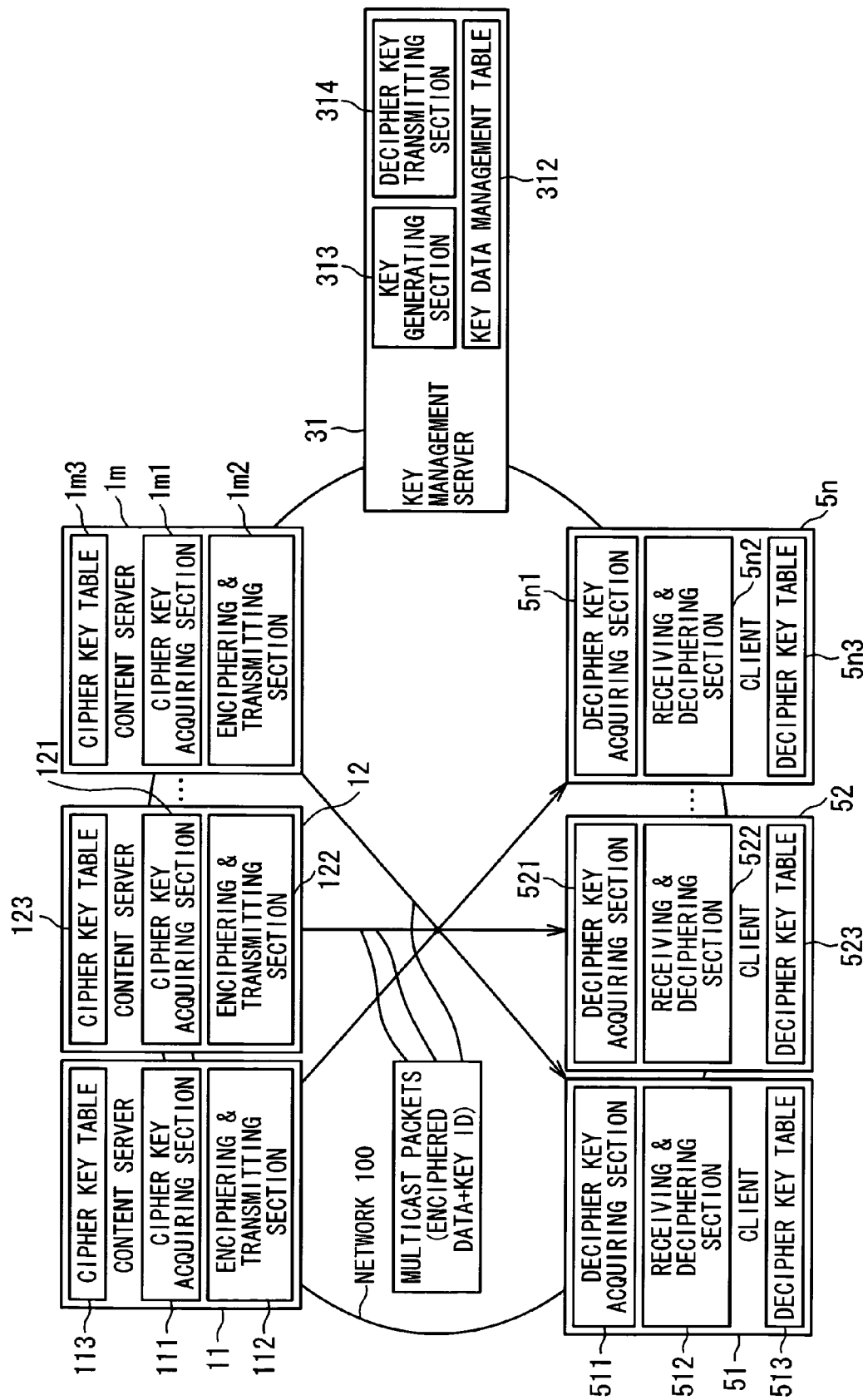
FIG. 11 is a block diagram showing the configuration of the key management system of the multicast delivery system according to a third embodiment of the present invention.

Next, the key management system of the multicast delivery system by the third embodiment of the present invention will be described. FIG. 11 is a block diagram showing the configuration of the key management system for the multicast delivery according to the third embodiment of the present invention. Referring to FIG. 11, the key management system for the multicast delivery according to this embodiment is composed of the content servers $1j$ (j is a positive integer between 1 and m, and m is a positive integer more than 1), the clients $5i$ and the key management server 31. The content servers $1j$, the clients $5i$ and the key management server 31 are connected by the network 100. Each of the content servers $1j$ in the third embodiments corresponds to the content server 11 or 12 in the first or second embodiment and transmits multicast packets. The clients $5i$ in the third embodiment correspond to the clients in the first or second embodiment and receive the multicast packets. The key management server 31 corresponds to the key management server 31 or 32 in the first or second embodiment and manages the keys (the cipher key and the decipher key).

Each the content servers $1j$ contains a cipher key acquiring section $1j1$ as the key managing section, the enciphering & transmitting section $1j2$ and a cipher key table $1j3$ as the key data management table. The cipher key table $1i3$ stores the set of the cipher key used to encipher the data to be delivered as the multicast packets and the key identifier to identify the key.

The client $5i$ contains a decipher key acquiring section $5i1$ as the key managing section, the receiving & deciphering section $5i2$ and a decipher key table $5i3$ as the key data management table. The decipher key table $5i3$ stores the set of the decipher key used decipher the enciphered data delivered by the multicast packets and the key identifier to identify the key.

The key management server 31 contains a key generating section 313, a key data management table 312 and a decipher key transmitting section 314. The key generating section 311 and the decipher key transmitting section equivalent to the key managing section. The key management table 312 manages the set of the keys (the cipher key and decipher key) and the key identifier to identifier the key. It should be noted that the cipher key and the decipher key may be same or different, depending on the cipher system. In any case, the cipher key and the decipher key are identified by the same key identifier.

Figure 12:
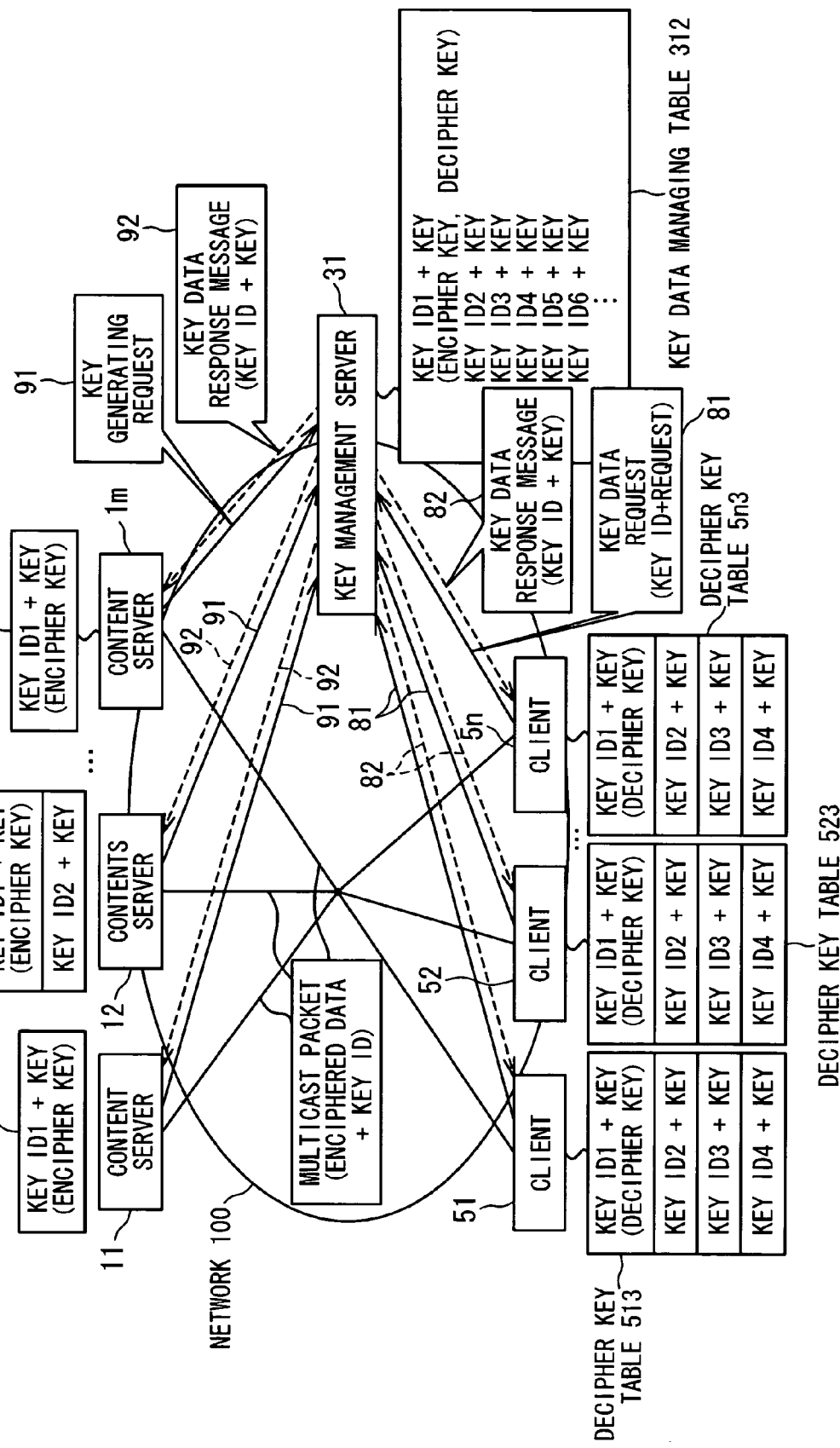
FIG. 12 is a block diagram showing an operation of the key management system of the multicast delivery system according to the third embodiment.

FIG. 12 is a block diagram showing the operation of the key management system of the multicast delivery system according to this embodiment. As shown in FIG. 12, the key generating request 91 is transmitted from the content server $1j$ to the key management server 31 and the key data response message 92 is transmitted from the key management server 31 to the content server $1j$ in response to the key generating request 91. Also, the key data request 81 is transmitted from the client $5i$ to the key management server 31 and the key data response message 82 is transmitted from the key management server 31 to the client $5i$ in response to the key data request 81.

Figure 13:
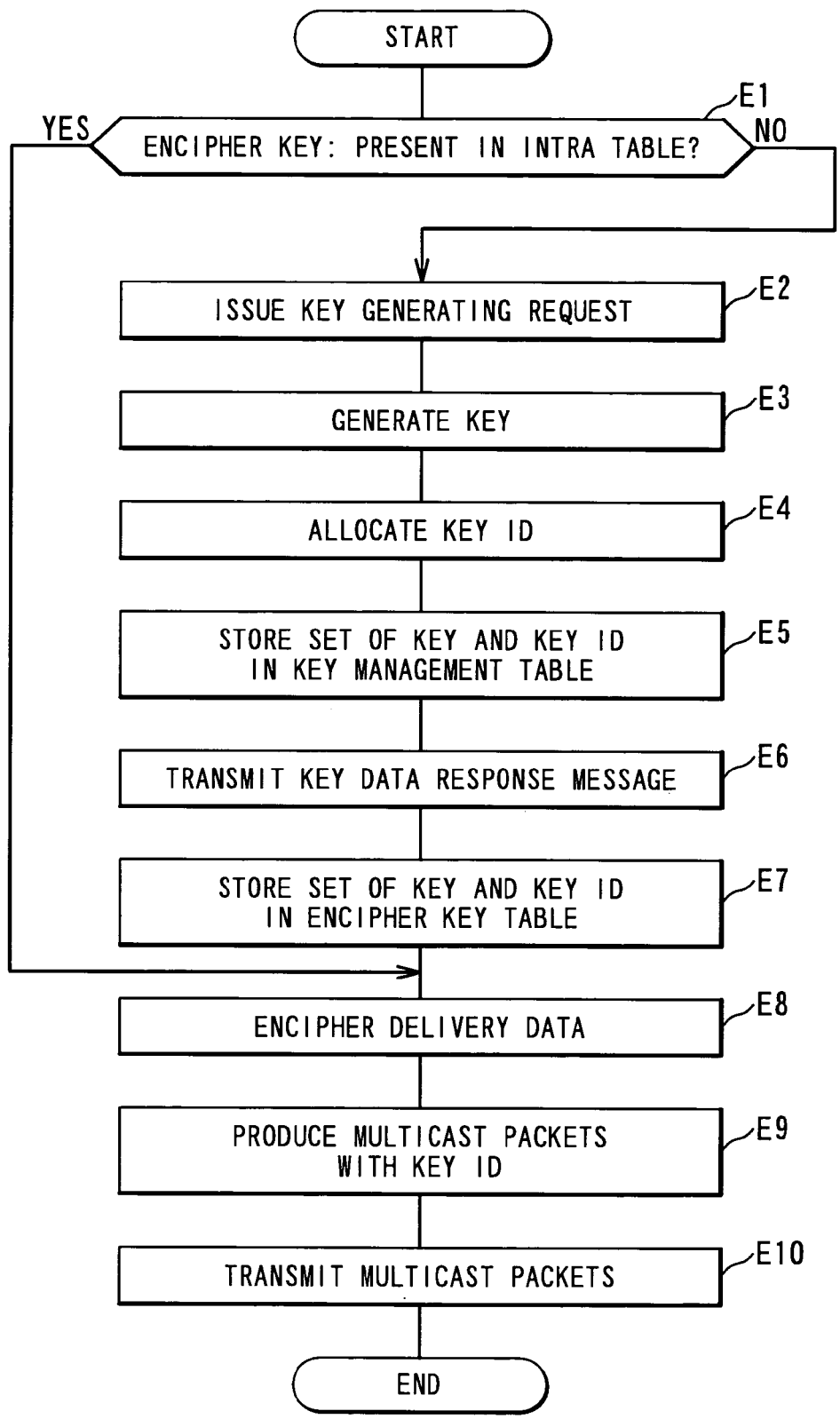
FIG. 13 is a flow chart showing an enciphering and transmitting process in the key management system of the multicast delivery system according to the third embodiment.
Figure 14:
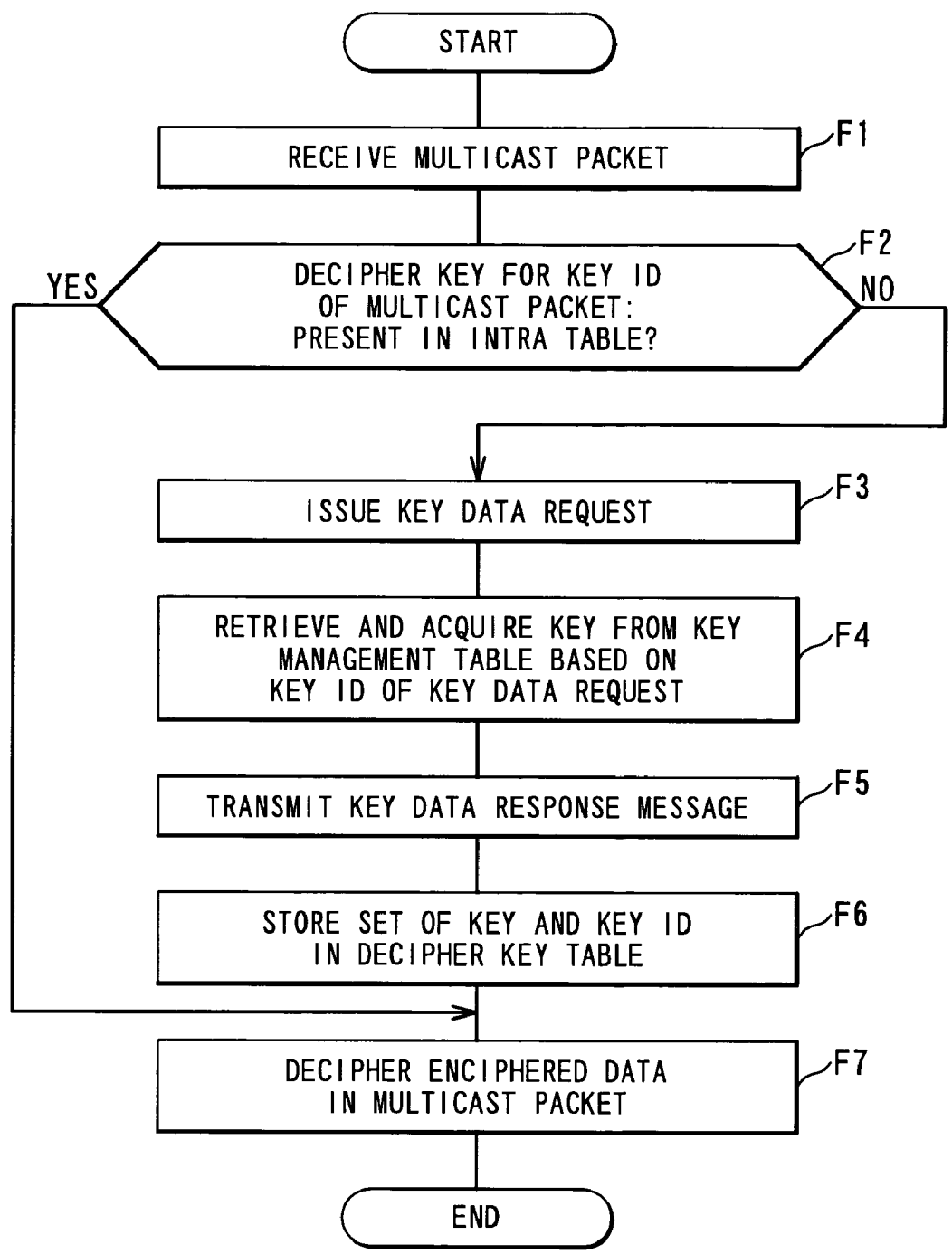
FIG. 14 is a flow chart showing a receiving and deciphering process in the key management system of the multicast delivery system according to the third embodiment.

FIG. 13 is a flow chart showing the enciphering and transmitting process in the key management system of the multicast delivery according to this embodiment. This process is composed of a cipher key existence or non-existence determination step E1, a key generating request publication step E2, a key generation step E3, a key identifier allocation step E4, a key data key management table store step E5, a key data response message transmission step E6, a key data cipher key table store step E7, a data cipher step E8, a key identifier possession multicast packet formation step E9, and a multicast packet transmission step E10. FIG. 14 is a flow chart showing the receiving and deciphering process of the key management system of the multicast delivery system according to this embodiment. This process is composed of a multicast packet reception step F1, a decipher key existence or non-existence determination step F2, a key data request publication step F3, a key management table search step F4, a key data message transmission step F5, a key data decipher key table store step F6, and an enciphered data decipher step F7.

Next, the operation of the whole key management system of the multicast delivery system according to this embodiment will be described in detail with reference to FIGS. 11 to 14.

First, with reference to FIG. 13, the operation in the enciphering and transmitting process of the content server will be described. When delivery data should be enciphered and the multicast packets containing the enciphered data should be transmitted, the enciphering and transmitting section $1j2$ of the content server $1j$ determines whether or not the cipher key for the encipherment is held by the cipher key table $1i3$ of the content server $1j$ (Step E1). When the cipher key is determined to be held by its own table at the step E1, the enciphering & transmitting section $1j2$ enciphers the delivery data by using the cipher key (Step E8) to generate the multicast packets containing the enciphered data and the key identifier corresponding to the cipher key (step E9) and transmits or multicast the multicast packets onto the network 100 (Step E10).

On the other hand, when the cipher key is determined not to be held by the its own table at the step E1, the enciphering & transmitting section $1j2$ hands over the control to the cipher key acquiring section $1j1$. The cipher key acquiring section $1j1$ issues the key generating request 91 to the key management server 31, as shown in FIG. 12 (Step E2).

The key generating section 313 of the key management server 31 receives the key generating request 91 and generates the keys (the cipher key and decipher key) (step E3) and allocates a key identifier to uniquely manage the key in the key management table 312 (Step E4). Also, the key generating section 313 stores the set of the key generated at the step E3 and the key identifier allocated at the step E4 in the key data management table 312 (Step E5). Then, the key generating section 313 transmits the key data response message 92 containing the set of the cipher key and the key identifier to the content server 1*j* as the request issuing source, as shown in FIG. 12 (Step E6).

The cipher key acquiring section 1*j*1 of the content server 1*j* receives the key data response message 92, stores the received set of the key and the key identifier in the cipher key table 1*j*3 (Step E7). Also, the enciphering and transmitting section 1*j*2 of the content server 1*j* enciphers the delivery data by using the cipher key received from the key management server 31 (Step E8), and generates the multicast packets containing the enciphered data and the key identifier corresponding to the cipher key (step E9) and transmits or multicast the multicast packets onto the network 100 (Step E10).

It should be noted that when a plurality of keys are held in the cipher key table 1*j*3 like the content server 1*j* shown in FIG. 12, the plurality of keys can be used depending on the contents and delivery time of the delivery data. That is, in the present invention, the content server holds a plurality of sets of the cipher key and the key identifier previously and the used cipher key may be timely changed in the multicast delivery.

Next, the operation in the receiving and deciphering process of the client will be described with reference to FIG. 14. When receiving the multicast packets delivered from the content server 1*j* (step F1), the receiving & deciphering section 5*i*2 of the client 5*i* refers to the key identifier contained in the multicast packet and determines whether or not the decipher key corresponding to the key identifier is in its own decipher key table 5*i*3 (Step F2). When the decipher key corresponding to the key identifier is determined to be present in the table at the step F2, the receiving & deciphering section 5*i*2 carries out the decipherment of the enciphered data contained in the multicast packet by using the decipher key (Step F7). On the other hand, when the decipher key corresponding to the key identifier is determined not to be present in the table at the step F2, the receiving & deciphering section 5*i*2 hands over the control to the decipher key acquiring section 5*i*1.

The decipher key acquiring section 5*i*1 generates and issues the key data request 81 to the key management server 31 by using the key identifier contained in the multicast packet, as shown in FIG. 12 (Step F3). That is, the decipher key acquiring section 5*i*1 requests the key data (the set of the decipher key and the key identifier) to the key management server 31. The decipher key transmitting section 314 of the key management server 31 receives the key data request 81, search the key data management table 312 by using the key identifier contained in the key data request 81 and acquires the key corresponding to the key identifier (Step F4). The decipher key transmitting section 312 acquires the key data from the key data management table 312 and generates the key data response message 82 containing the set of the decipher key and the key identifier. Then, the decipher key transmitting section 314 transmits the key data response message 82 to the client 5*i* as a request issuing client as the answer to the key data request 81 (Step F5).

When receiving the key data response message 82 from the key management server 31, the decipher key acquiring section 5*i*1 of the client 5*i* stores the set of the decipher key and the key identifier of the key data response message 82 in the decipher key table 5*i*3, which is used in the deciphering process to the subsequent multicast packets (Step F6). Also, the receiving & deciphering section 5*i*2 of the client 5*i* carries out the decipherment of the enciphered data contained in the multicast packets received at the step F1 by using the decipher key (Step F7).

It should be noted that the decipher key table 5*i*3 of the client 5*i* does not have any key data (the set of the key and the key identifier) in the initial state. Also, the set of the key and the key identifier in the decipher key table 5*i*3 is deleted from the decipher key table 5*i*3 when it is not used in the predetermined time.

Fourth Embodiment

Figure 15:
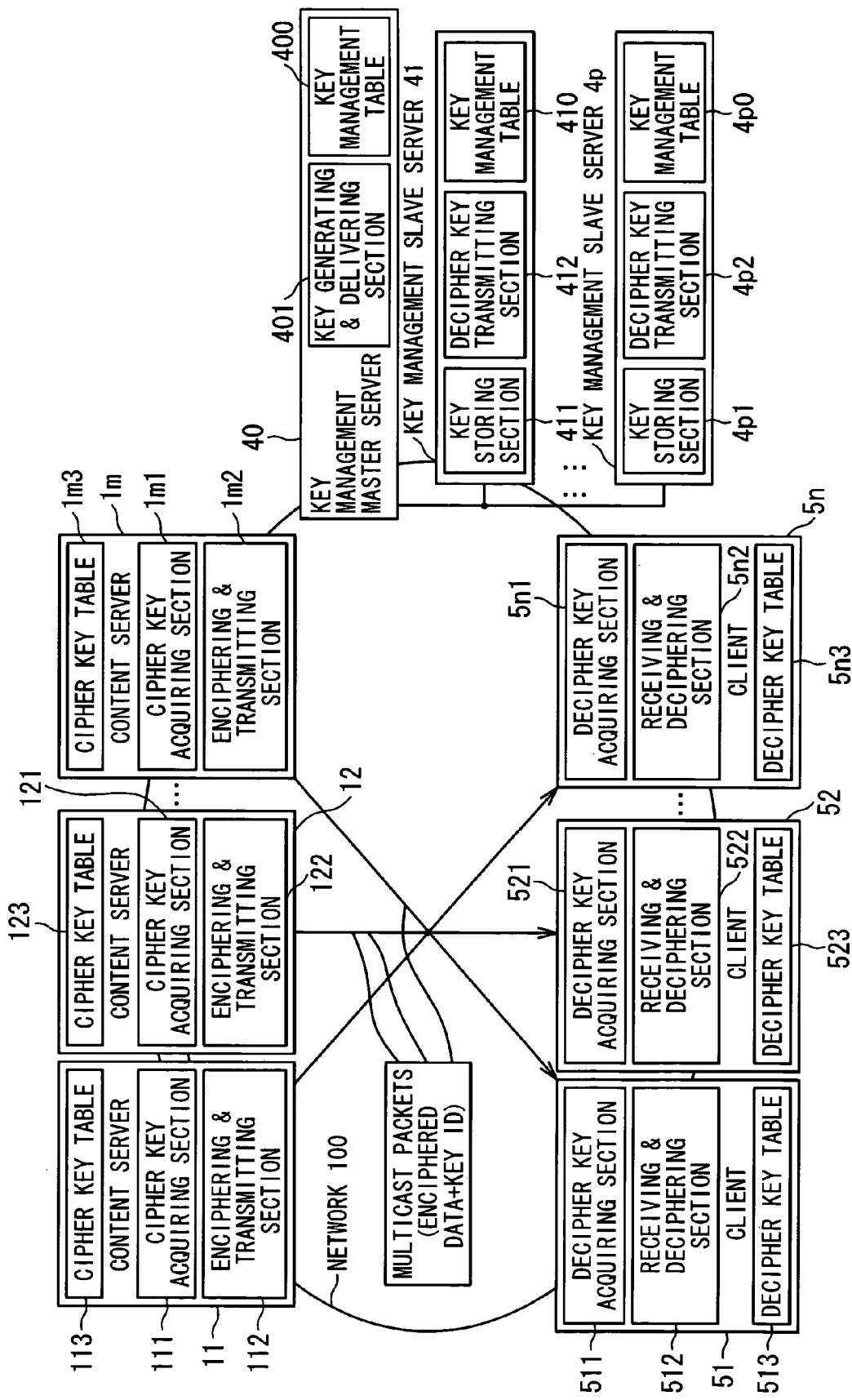
FIG. 15 is a block diagram showing the configuration of the key management system of the multicast delivery system according to a fourth embodiment of the present invention.

FIG. 15 is a block diagram showing the configuration of the key management system of the multicast delivery system according to the fourth embodiment of the present invention. Referring to FIG. 15, the key management system for the multicast delivery according to this embodiment is composed of the content servers 1*j*, the clients 5*i* and a key management master server 40 which manages the keys (the cipher key and decipher key) and the key management slave servers 4*k* (k is a positive integer between 1 and p, and p is an integer more than 1). The content servers 1*j*, the clients 5*i*, the key management master server 40 and the key management slave servers 4*k* are connected by the network 100.

The key management master server 40 contains a key management table 400 and a key generating and delivering section 401 as a key managing section. Also, each of the key management slave servers 4*k* contains a key storing section 4*k*1, a key management table 4*k*2, and a decipher key transmitting section 4*k*3. A set of the key storing section 4*k*1 and the decipher key transmitting section 4*k*3 is equivalent to the key managing section in the above embodiments.

Comparing the fourth embodiment and the third embodiment, the key management master server 40 and the plurality of key management slave servers 4*k* are used in place of the key management server 31 in the third embodiment. That is, in the configuration of the fourth embodiment shown in FIG. 15, by separating the key management server into the key management master server 40 and the plurality of key management slave servers 4*k*, the load of the key management server is distributed.

Figure 16:
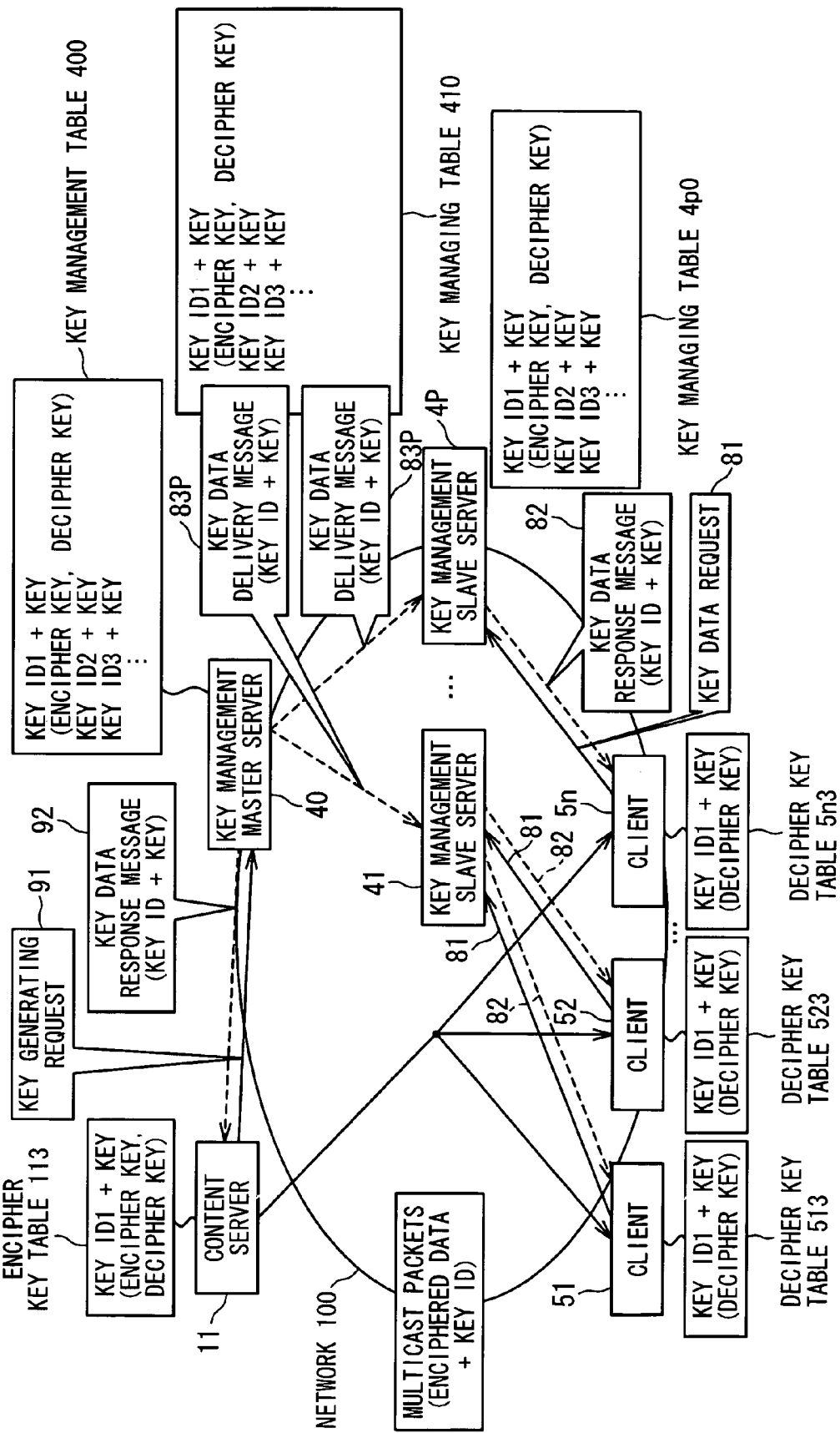
FIG. 16 is a block diagram showing an operation of the key management system of the multicast delivery system according to the fourth embodiment.

FIG. 16 is a block diagram showing the operation of the key management system of the multicast delivery according to the fourth embodiment. As shown in FIG. 16, the key generating request 91 is transmitted from the content server 1*j* to the key management master server 40. In response to the request 91, the key data response message 92 is transmitted from the key management master server 40 to the content server 1*j*. At this time, key data delivery messages 831 to 83*p* are transmitted from the key management master server 40 to the key management slave servers 4*k*. Also, the key data request 81 is transmitted from the client 5*i* to any of the key management slave servers 4*k* and the key data response message 82 is transmitted from the corresponding key management slave server 4*k* to the client 5*i* in response to the request 81.

Next, the operation of the key management system of the multicast delivery according to the fourth embodiment will be described with reference to FIGS. 11 to 16, mainly with respect to the different points between the third embodiment and the fourth embodiment.

First, the operation of the ciphering and transmitting process will be described. In the third embodiment, the content server 1*j* issues the key generating request 91 to the key management server 31 at the step E2 when the cipher key is determined not to be present in its own table at the step E1. On the other hand, in the fourth embodiment, the cipher key acquiring section 1*j*1 of the content server i1 issues the key generating request 91 to the key management master server 40, as shown in FIG. 16.

The key generating and delivering section 401 of the key management master server 40 receives the key generating request 91 and generates the keys (the cipher key and decipher key) and allocates the key identifier to uniquely manage the keys in the key management table 400. Also, the key generating and delivering section 401 stores the set of the generated keys and the key identifier allocated to the keys in the key management table 400, and transmits the key data response message 92 containing the set of the cipher key and the key identifier to the content server 1*j* in response to the key generating request 91, as shown in FIG. 16. Also, the key generating and delivering section 401 of the key management master server 40 sends the key data delivery messages 831 to 83*p* containing the set of the decipher key and the key identifier to all the key management slave servers 4*k*, as shown in FIG. 16. The key storing section 4*k*1 of each key management slave server 4*k* stores the set of the decipher key and the key identifier in the key management table 4*k*0.

Next, the operation of the receiving and deciphering process will be described. In the third embodiment, when the decipher key corresponding to the key identifier contained in the multicast packet is determined not to be present in the its own table by the client 5*i* at the step F2 of FIG. 14, the client 5*i* issues the key data request 81 to the key management server 31 by using the key identifier contained in the multicast packet received from the content server 1*j* at the step F3. On the other hand, in the fourth embodiment, the client 5*i* generates and issues the key data request 81 to any of the plurality of key management slave servers 4*k*, as shown in FIG. 16. At this time, there are the following two methods (iiia) and (iiib) as how to determine the key management slave server for the request 81 to be sent.

(iiia) A method in which the key management slave server 4*k* for the key data request 81 to be sent is previously determined every the client 5*i*.

(iiib) A method in which the key management slave server is changed every transmission of the key data request 81 from the client 5*i* (round robin method).

The decipher key transmitting section 4*k*2 of the key management slave server 4*k* carries out the search of the key management table 4*k*0 by using the key identifier of the key data request 81 in response to the key data request 81 and acquires the key corresponding to the key identifier. Then, the decipher key transmitting section 4*k*2 of the key management slave server 4*k* transmits the key data response message 82 containing the set of the acquired decipher key and the acquired key identifier to the client 5*i* as the request issuing client as the answer to the key data request 81, as shown in FIG. 16. It should be noted that the operation of the key management system of the multicast delivery system according to this embodiment other than the above operation operates is the same as that the third embodiment.

In this way, in the fourth embodiment, the plurality of key management slave servers 4*k* are provided to receive the key data requests 81 from the clients 5*i*, and the load of the key management server can be distributed, compared with the above-mentioned third embodiment.

Fifth Embodiment

Figure 17:
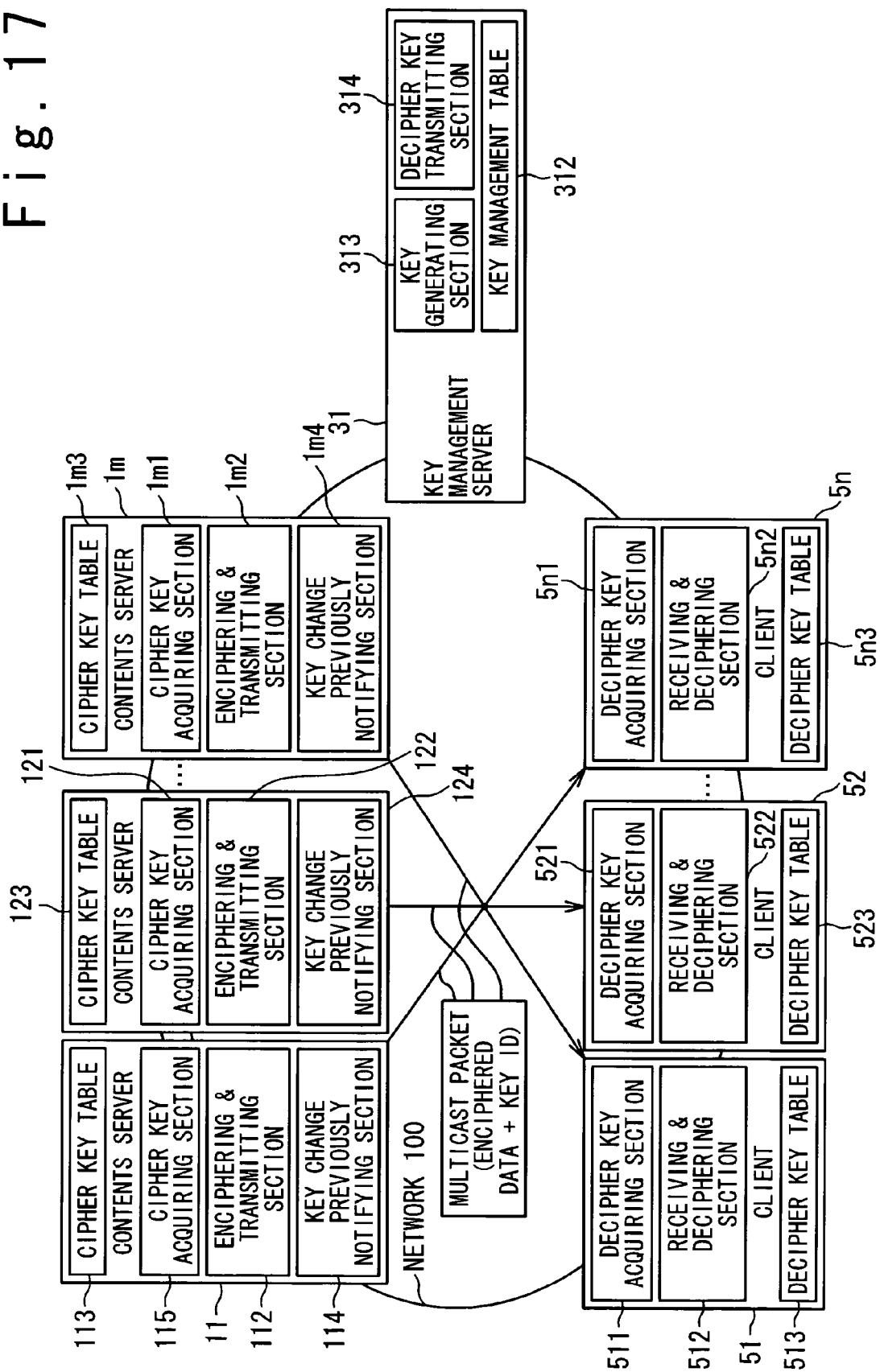
FIG. 17 is a block diagram showing the configuration of the key management system of the multicast delivery system according to a fifth embodiment of the present invention.

FIG. 17 is a block diagram showing the configuration of the key management system of the multicast delivery system according to the fifth embodiment of the present invention.

Referring to FIG. 17, the key management system of the multicast delivery system according to this embodiment is composed of the content servers 1*j* which transmit the multicast packets, the clients 5*i* which receive the multicast packets and the key management server 31 which manages the key (the cipher key and decipher key), like the third embodiment shown in FIG. 11. The content servers 1*j*, the clients 5*i* and the key management server 31 are connected by the network 100. It should be noted that each of the content servers 1*j* in the fifth embodiment has a key change previously notifying section 1*j*4 as a component specific to the fifth embodiment.

The basic structure of the fifth embodiment is the same as that of the third embodiment. However, the fifth embodiment is different from the third embodiment in the point that the key identifier of the key to be used next is previously notified to the clients 5*i* by a key change previous notice before the content server 1*j* changes the cipher key to be used, and the clients 5*i* acquire new key data (the set of the decipher key and the key identifier) previously from the key management server 31. When the content server 1*j* changes the cipher key, the decipherment of the enciphered data can be carried out by the clients 5*i* without possible delays after the key change, by adopting such a configuration and operation.

Figure 18:
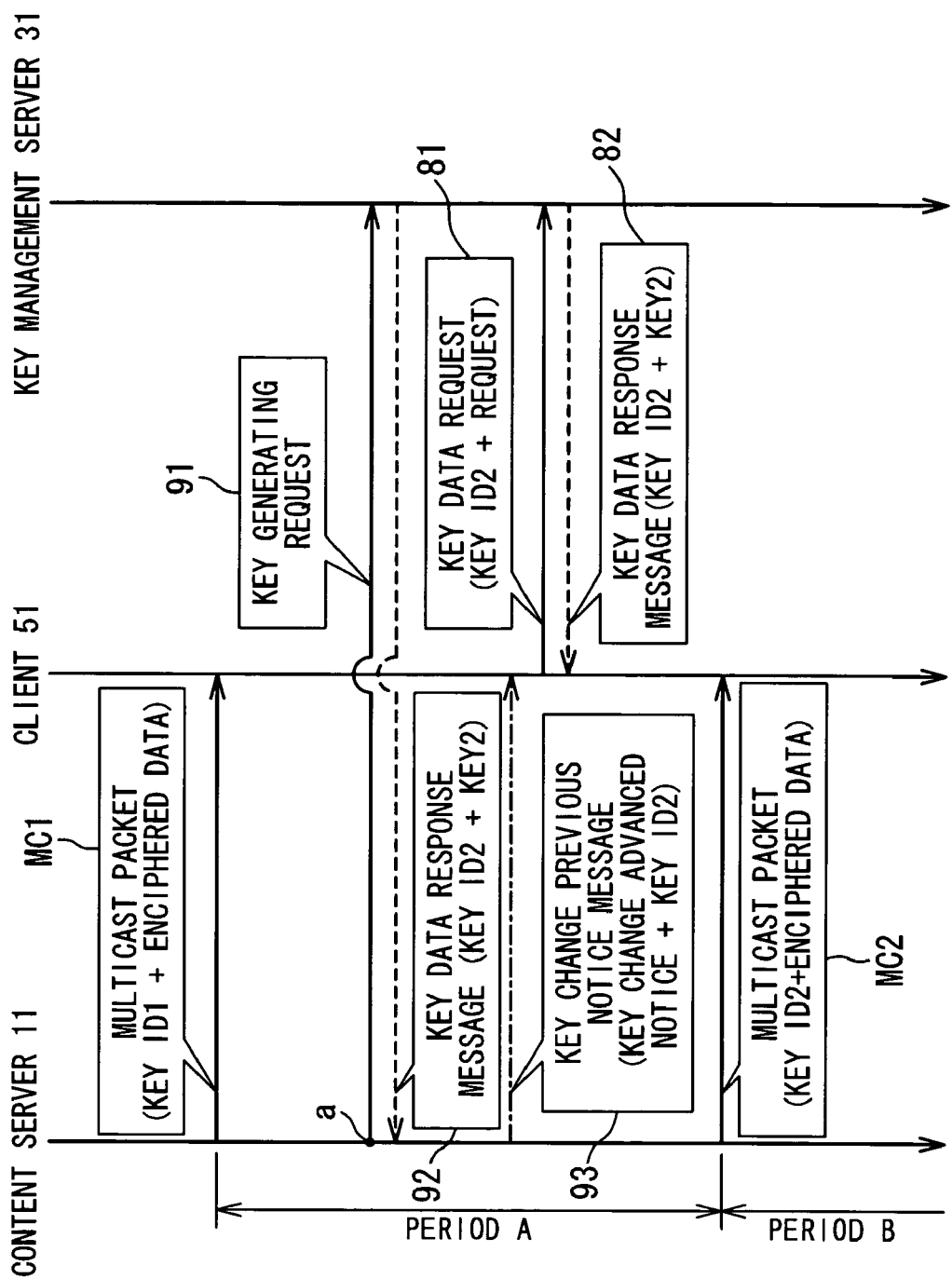
FIG. 18 is a sequence diagram showing a specific operation of the key management system of the multicast delivery system according to the fifth embodiment.
Figure 19:
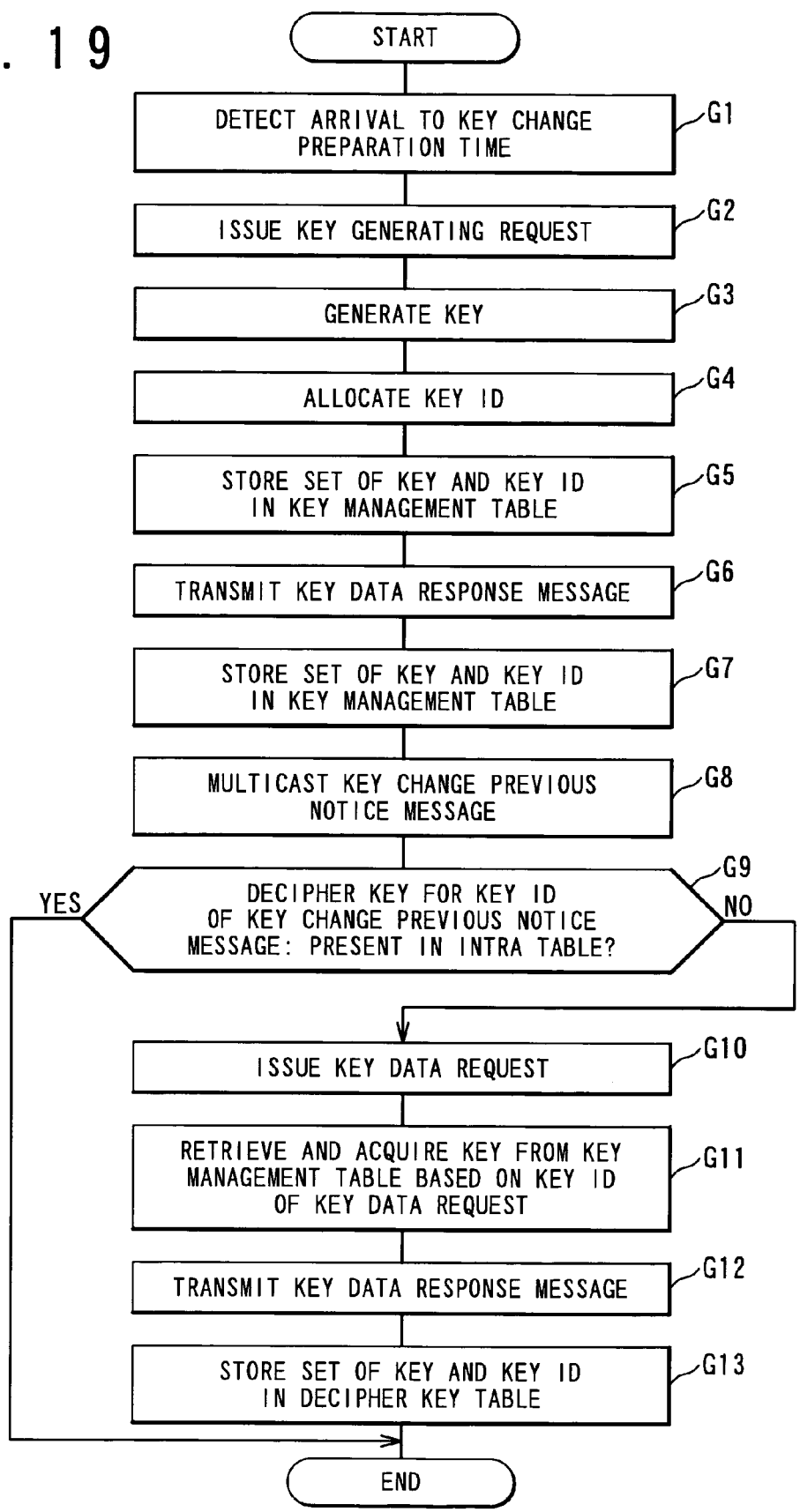
FIG. 19 is a flow chart showing a key change previous notice process of the key management system of the multicast delivery system according to the fifth embodiment.

FIG. 18 is a sequence diagram showing a specific operation of the key management system of the multicast delivery system according to the fifth embodiment. FIG. 19 is a flow chart showing the key change previous notice relating process in the key management system of the multicast delivery system according to the fifth embodiment. This process is composed of a key change preparation time recognition step G1, a key generating request issuance step G2, a key generation step G3, a key identifier allocation step G4, a key data the key management table step G5, a key data response message transmission step G6, a key data cipher key table step G7, a key change previous notice message multicast delivery step G8, a decipher key existence or non-existence determination step G9, a key data request issuance step G10, a key management table acquisition step G1, a key data message transmission step G12, and a key data decipher key table step G13.

Next, the operation of the key management system of the multicast delivery system according to this embodiment will be described with reference to FIGS. 11 to 14 and FIGS. 17 to 19, mainly with respect to the different point from the third embodiment. As shown in FIG. 18, the client 5*i* receives the multicast packet MC1 containing the key identifier and enciphered data from the content server 1*j* and carries out the decipherment of the enciphered data by using the decipher key corresponding to the key identifier. Such an operation is same as the operation of the above-mentioned third embodiment. In the operation sequence shown in FIG. 18, the following matters are supposed. That is, during a period A, the multicast packet MC1 containing the enciphered data together with the cipher key identified with the key identifier 1 and the key identifier 1 is sent and received. During a period B, the multicast packet MC2 containing the enciphered data with the cipher key identified with the key identifier 2 and the key identifier 2 is sent and received.

Presupposing that the delivery of the multicast packets is carried out as described above, the following key change previous notice relating process is carried out in this embodiment, as shown in FIG. 19. When recognizing that time becomes a predetermined time before a key change preparation time from which a new the key is used (Step G1), the cipher key acquiring section 1*j*1 of the content server 1*j* sends the key generating request 91 to the key management server 31 in order to get a new key (Step G2). In an example of FIG. 18, the content server 11 transmits the key generating request 91 to the key management server 31 at the key change preparation time a. The key generating section 311 of the key management server 31 generates the key (the cipher key and the decipher key) requested by the key generating request 91 (step G3), allocates the key identifier to the key (step G4) and stores the set of the key identifier and the key as a key data in the key data management table 312 (Step G5). Then, the key generating section 311 of the key management server 31 transmits the key data response message 92 containing the set of the cipher key and the key identifier to the content server 1$j$ as a request issuing content server (Step G6). In the example of FIG. 18, the key management server 31 generates the key 2, allocates the key identifier 2 for the key 2 and transmits the key data response message 92 containing the set of the key 2 and the key identifier 2 to the content server 1$j$. The cipher key acquiring section 1$j$1 in the content server 1$j$ stores the received key data (the set of the key and the key identifier) of the next use cipher key in the cipher key table 1$j$3 in response to the reception of the key data response message 92 (Step G7). The key change previously notifying section 1$j$4 of the content server 1$j$ carries out the multicast delivery of the key change previous notice message 93 containing the key identifier and the key change previous notice at the time of acquisition of the set of the new cipher key and the new key identifier (Step G8). In the example of FIG. 18, the content server 11 carries out the multicast delivery of the key change previous notice message 21 containing the key change previous notice and the key identifier 2.

The decipher key acquiring section 5$i$1 of the client 5$i$ receives the key change previous notice message 21, carries out the search of the decipher key table 5$i$3 based on the key identifier contained in the key change previous notice message 21 and determines whether or not the decipher key corresponding to the key identifier 2 is present in the decipher key table 5$i$3 (Step G9). When the decipher key corresponding to the key identifier 2 is determined not to be present through the search of step G9, the decipher key acquiring section 5$i$1 issues the key data request 81 to the key management server 31 by using the key identifier 2 contained in the key change previous notice message 21 (Step G10). That is, the decipher key acquiring section 5$i$1 requests the key data about the decipher key corresponding to the key identifier 2 to the key management server 31. It should be noted that when the decipher key corresponding to the key identifier there is determined to be present through the search of step G9, the process is ended because the process of the step G10 and the subsequent steps is unnecessary. In the example of FIG. 18, the client 21 issues the key data request containing the key identifier 2 to the key management server 31 to acquire the decipher key corresponding to the key identifier 2 contained in the key change previous notice message 21. The decipher key transmitting section 4$k$3 in the key management server 31 receives the key data request 81 and carries out the search of the key data management table 312 using the key identifier during the key data request 81 and acquires the key corresponding to the key identifier (Step G11).

The decipher key transmitting section 314 transmits the key data response message 82 containing the set of the decipher key 2 and the key identifier 2 acquired from the key data management table 312 to the client 5$i$ as the request issuing client as the answer to the key data request 81 (Step G12). When receiving the key data response message 82 from the key management server 31, the decipher key acquiring section 5$i$1 of the client 5$i$ stores the set of the decipher key 2 and the key identifier 2 contained in the key data response message 82 in the decipher key table 5$i$3 in order to use in the decipher process in case of the multicast packet reception during the following periods (for example, the period B after the period A in FIG. 18) (Step G13). In the example of FIG. 18, the key management server 31 replies the key data response message 82 containing the set of the key identifier 2 and the decipher key 2 to the client 21 and the client 21 stores the set of the decipher key 2 and the key identifier 2 in the decipher key table 210.

After that, in the period B, the content server 11 uses the cipher key 2 for the encipherment of the delivery data and transmits the multicast packets MC2 containing the enciphered data with the key 2 and the key identifier 2. The client 21 receives the multicast packets MC2 and can carry out the decipherment of the enciphered data immediately by using the decipher key 2 corresponding to the key identifier 2 held in the key management table 210.

It should be noted that the operation of this embodiment other than the above operation is the same as the operation of the third embodiment. In this case, the acquisition of the cipher key and the decipher key is previously carried out at a series of processes shown in FIGS. 13 and 14. Therefore, as far as the above-mentioned change previous notice relating process is normally carried out, the process of steps E2 to E7 of FIG. 13 and the process of steps F3 to F6 in FIG. 4 are never carried out.

In the above-mentioned first embodiment, when receiving the multicast packet and referring to the key identifier contained in the received multicast packet, the client 5$i$ can know for the first time that the key is changed. For this reason, the client 5$i$ requests the delivery of the new decipher key to the key management server 31 and acquires a new decipher key as the response. In such a case, the decipherment of the enciphered data of the multicast packet containing a new key identifier cannot be carried out until the client 5$i$ receives the response. On the other hand, in the fifth embodiment, the content server 1$j$ issues the key change previous notice to the client 5$i$ before changing the key such that the client 5$i$ can acquire the new decipher key previously. Thus, the decipherment of the enciphered data by the new decipher key can be carried out without the delay in the key change.

Modification of the Third Embodiment

Figure 20:
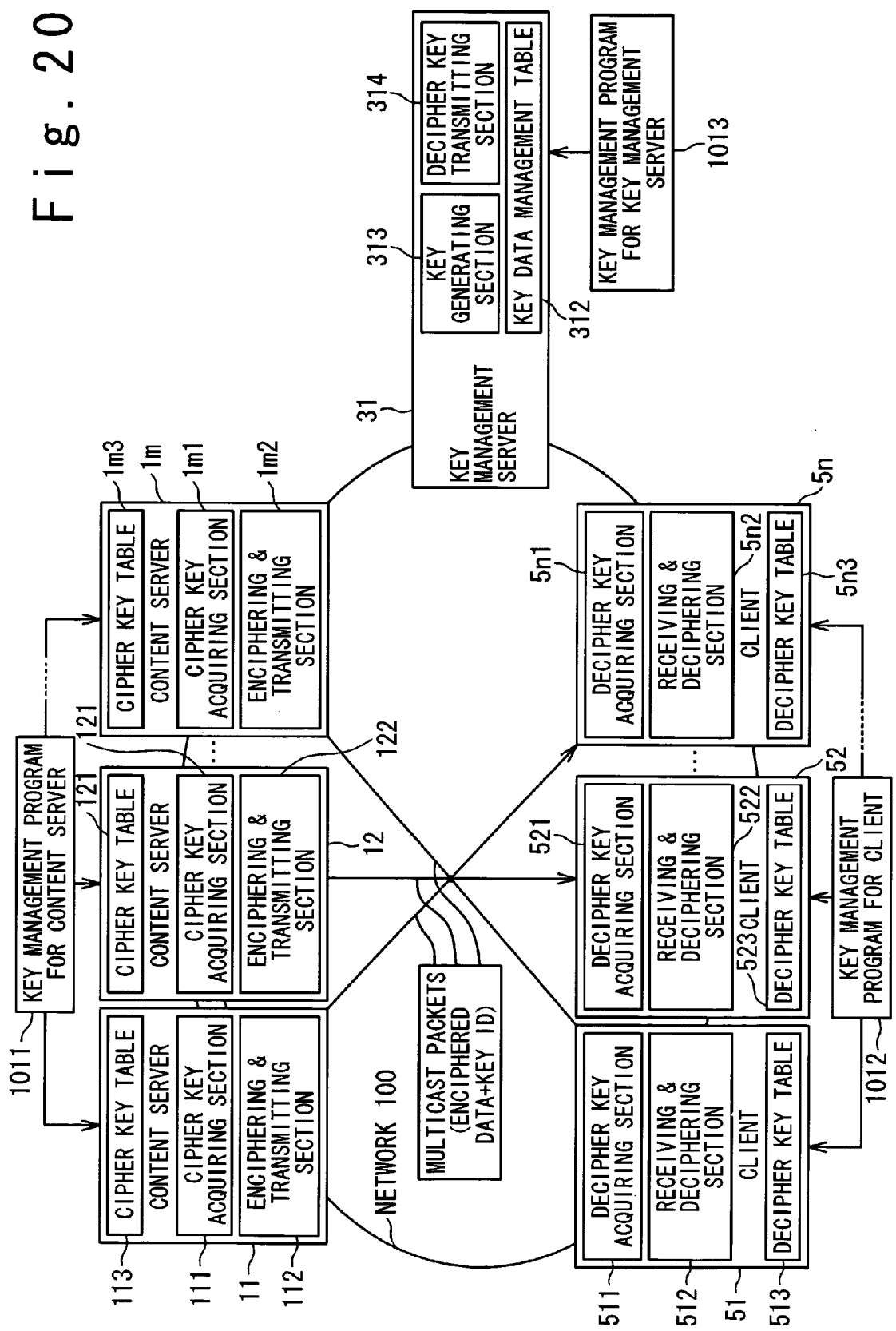
FIG. 20 is a block diagram showing the configuration of a modification of the key management system of the multicast delivery system according to the third embodiment of the present invention.

FIG. 20 is a block diagram showing the configuration of a modification of the key management system for the multicast delivery according to the fourth embodiment of the present invention. Referring to FIG. 20, the modification of the key management system of the multicast delivery system according to the third embodiment of the present invention is different from the key management system of the multicast delivery system according to the third embodiment shown in FIG. 11 in that a key management program 1011 for the content server, a key management program 1012 for the client and a key management program 1013 for the key management server are provided.

The key executive program 1011 for the content server is read by the content server 1$j$ and controls the operation of the content server 1$j$ as the cipher key table 1$j$3, the cipher key acquiring section 1$j$1, and the enciphering & transmitting section 1$j$2. The operations of the content server 1$j$, i.e., the operations of the cipher key table 1$j$3, the cipher key acquiring section 1$j$1, and the enciphering & transmitting section 1$j$2 under the control of the key management program 1011 for the content server is the same as the operations of the content server 1$j$ of the third embodiment, and therefore the detailed description is omitted.

Also, the key management program 1012 for the client is read by the client 5$i$ and controls the operations of the client 5$i$ as the decipher key table 5$i$3, the decipher key acquiring section 5$i$1 and the receiving & deciphering section 5$i$2. The operations of the client 5$i$, i.e., the operations of the decipher key table 5$i$3, the decipher key acquiring section 5$i$1 and the receiving & deciphering section 5$i$2 under the control of the key management program 1002 for the client is the same as the operations of the client 5$i$ of the third embodiment, and therefore the detailed description is omitted.

Moreover, the key management program 1013 for the key management server is read by the key management server 31 and controls the operations of the key management server 31 as the key data management table 312, the key generating section 311 and the decipher key transmitting section 4$k$3. The operations of the key management server 31, i.e., the operations of the key data management table 312, the key generating section 311 and the decipher key transmitting section 4$k$3 312 under the control of the key management program 1003 for the key management server is the same as the operations of the key management server 31 in the third embodiment, and therefore the detailed description is omitted.

Modification of the Fourth Embodiment

Figure 21:
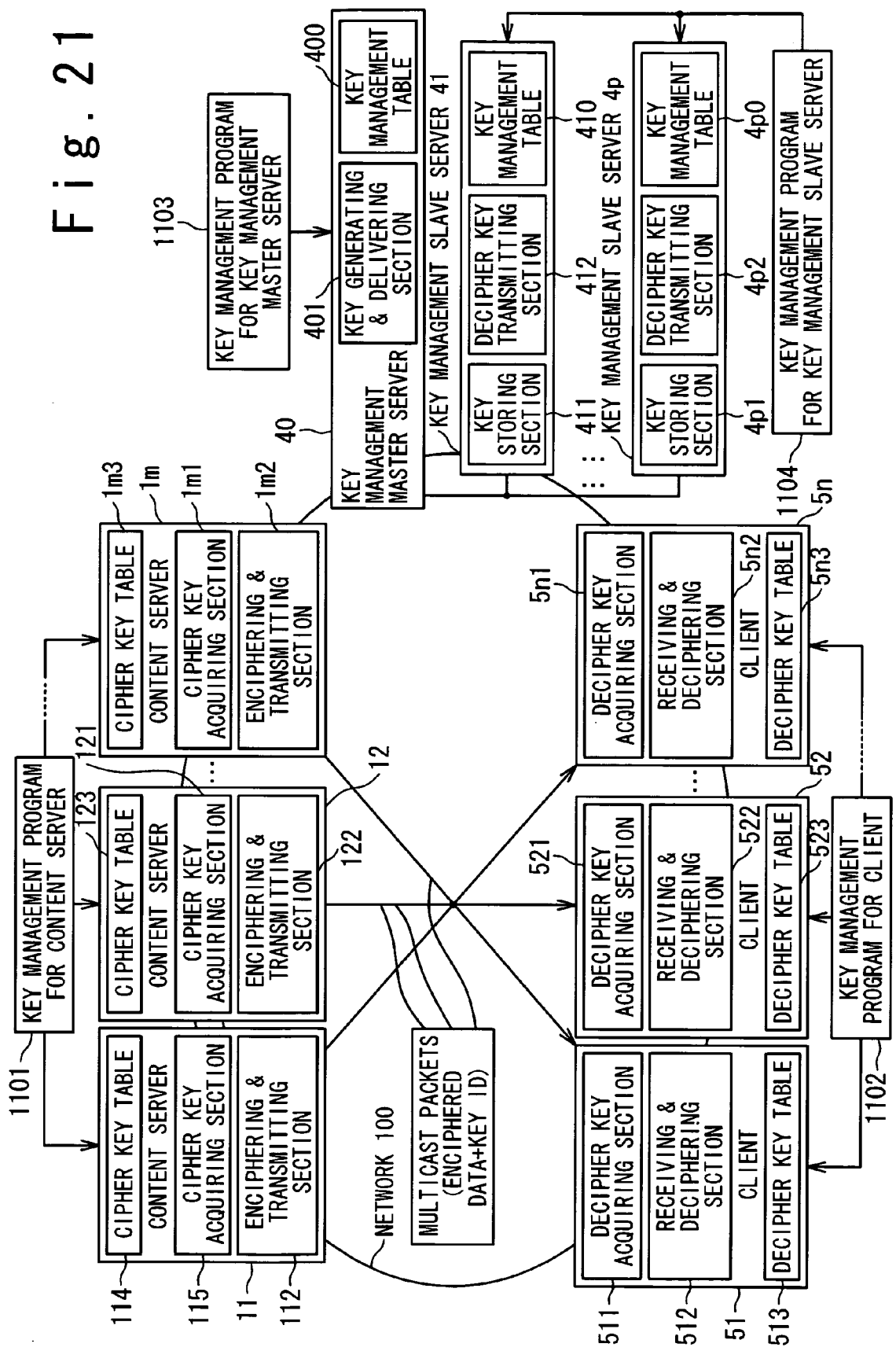
FIG. 21 is a block diagram showing the configuration of a modification of the key management system of the multicast delivery system according to the fourth embodiment of the present invention.

FIG. 21 is a block diagram showing the configuration of the key management system for the multicast delivery system according to the modification of the fourth embodiment of the present invention. Referring to FIG. 21, the key management system of the multicast delivery system according to the modification of the fourth embodiment of the present invention is different from the key management system for the multicast delivery according to the fourth embodiment shown in FIG. 15 is in that a key management program 1101 for the content server, a key management program 1102 for the client, a key management program 1103 for the key management master server and a key management program 1104 for the key management slave server are provided.

The key management program 1101 for the content server is read by the content server 1$j$ and controls the operations of the content server 1$j$ as the cipher key table 1$j$3, the cipher key acquiring section 1$j$1, and the enciphering & transmitting section 1$j$2. The operations of the content server 1$j$, i.e., the operation of the cipher key table 1$j$3, the cipher key acquiring section 1$j$1, and the enciphering & transmitting section 1$j$2 under the control of the key management program 1101 for the content server is the same as the operations of the content server 1$j$ in the fourth embodiment, and therefore the detailed description is omitted.

Also, the key management program 1102 for the client is read by the client 5$i$ and controls the operations of the client 5$i$ as the decipher key table 5$i$3, the decipher key acquiring section 5$i$1 and the receiving & deciphering section 5$i$2. The operations of the client 5$i$, i.e., the operation of the decipher key table 5$i$3, the decipher key acquiring section 5$i$1 and the receiving & deciphering section 5$i$2 under the control of the key management program 1102 for the client is the same as the operations of the client 5$i$ in the fourth embodiment, and therefore the detailed description is omitted.

Also, the key management program 1103 for the key management master server is read by the key management master server 40 and controls the operations of the key management master server 40 as the key management table 400 and the key generating and delivering section 401. Therefore, the operations of the key management master server 40, i.e., the operation of the key management table 400 and the key generating and delivering section 401 under the control of the key management program 1103 for the key management master server is the same as the operations of the fourth embodiment, and therefore the detailed description is omitted.

In addition, the key management program 1104 for the key management slave server is read by the key management slave server 4$k$ and controls the operations of the key management slave server 4$k$ as the key management table 4$k$2, the key storing section 4$k$1 and the decipher key transmitting section 4$k$3 4$k$2. The operations of the key management slave server 4$k$, i.e., the operations of the key management table 4$k$2, the key storing section 4$k$1 and the decipher key transmitting section 4$k$3 4$k$2 under the control of the key management program 1104 for the key management slave server is the same as the operations of the fourth embodiment, and therefore, the detailed description is omitted.

Modification of the Fifth Embodiment

Figure 22:
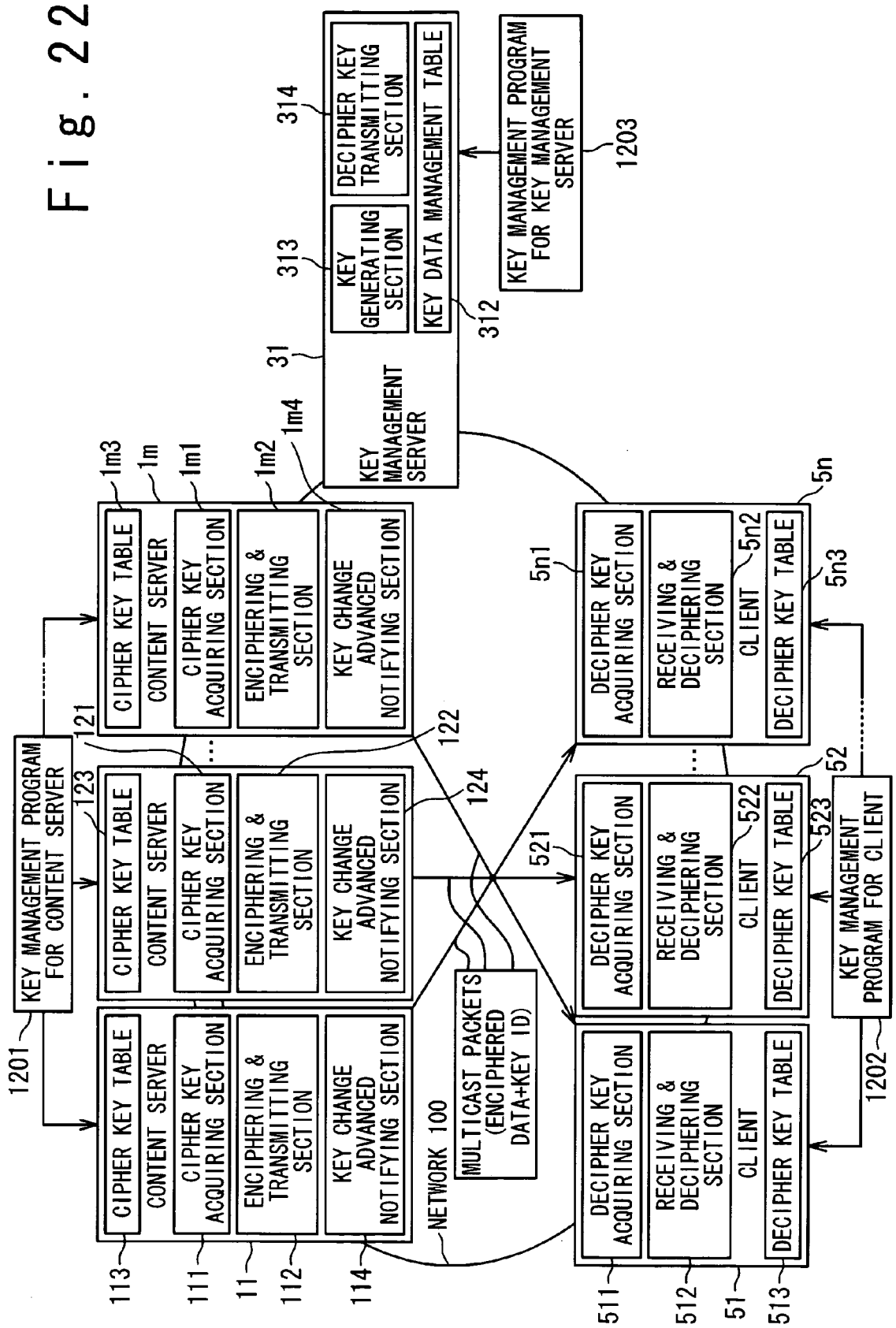
FIG. 22 is a block diagram showing the configuration of a modification of the key management system of the multicast delivery system according to the fifth embodiment of the present invention.

FIG. 22 is a block diagram showing the configuration of the key management system for the multicast delivery according to the modification of the fifth embodiment of the present invention. Referring to FIG. 22, the key management system of the multicast delivery system according to the modification of the fifth embodiment of the present invention is different from the key management system of the multicast delivery system according to the fifth embodiment shown in FIG. 17 in that a key management program 1201 for the content server, a key management program 1202 for the client and a key management program 1203 for the key management server are provided.

The key management program 1201 for the content server is read by the content server 1$j$ and controls the operation of the content server 1$j$ as the cipher key table 1$j$3, the cipher key acquiring section 1$j$1, the enciphering & transmitting section 1$j$2 and the key change previously notifying section 1$j$4. The operations of the content server 1$j$, i.e., the operation of the cipher key table 1$j$3, the cipher key acquiring section 1$j$1, the enciphering & transmitting section 1$j$2 and the key change previously notifying section 1$j$4 under the control of the key management program 1201 for the content server is the same as the operations of the content server 1$j$ in the fifth embodiment, therefore and the detailed description is omitted.

Also, the key management program 1202 for the client is read by the client 5$i$ and controls the operation of the client 5$i$ as the decipher key table 5$i$3, the decipher key acquiring section 5$i$1 and the receiving & deciphering section 5$i$2. The operations of the client 5$i$, i.e., the operation of the decipher key table 5$i$3, the decipher key acquiring section 5$i$1 and the receiving & deciphering section 5$i$2 under the control of the key management program 1202 for the client is the same as the operation of the client 5$i$ in the fifth embodiment, and therefore the detailed description is omitted.

Moreover, the key management program 1203 for the key management server is read by the key management server 31 and controls the operation of the key management server 31 as the key data management table 312, the key generating section 311 and the decipher key transmitting section 4$k$3. The operations of the key management server 31, i.e., the operation of the key data management table 312, the key generating section 311 and the decipher key transmitting section 4$k$3 312 under the control of the key management program 1203 for the key management server is the same as the operations of the key management server 31 in the fifth embodiment, and therefore the detailed description is omitted.

As described above, according to the key management system of the multicast delivery system of the present invention, when delivery data in the plurality of multicast deliveries are enciphered by using the separate keys, the management of the different keys can be easily realized.

Also, the key identifier is contained in the multicast packet containing enciphered data to identify the key used by the content server in the enciphering process and the multicast packet is sent to the client. The client can know based on the key identifier that the key used in the content server is changed. Therefore, when the key used for the cipher is changes, the new decipher key can be requested from the client to the key management server in accordance with the necessity. In this way, data about the client needs not to be managed on the side of the key management server and the content server.

Next, the scramble broadcasting system of the stream media data as an example of the multicast delivery system of the present invention will be described in detail with reference to the attached drawings.

Figure 23:
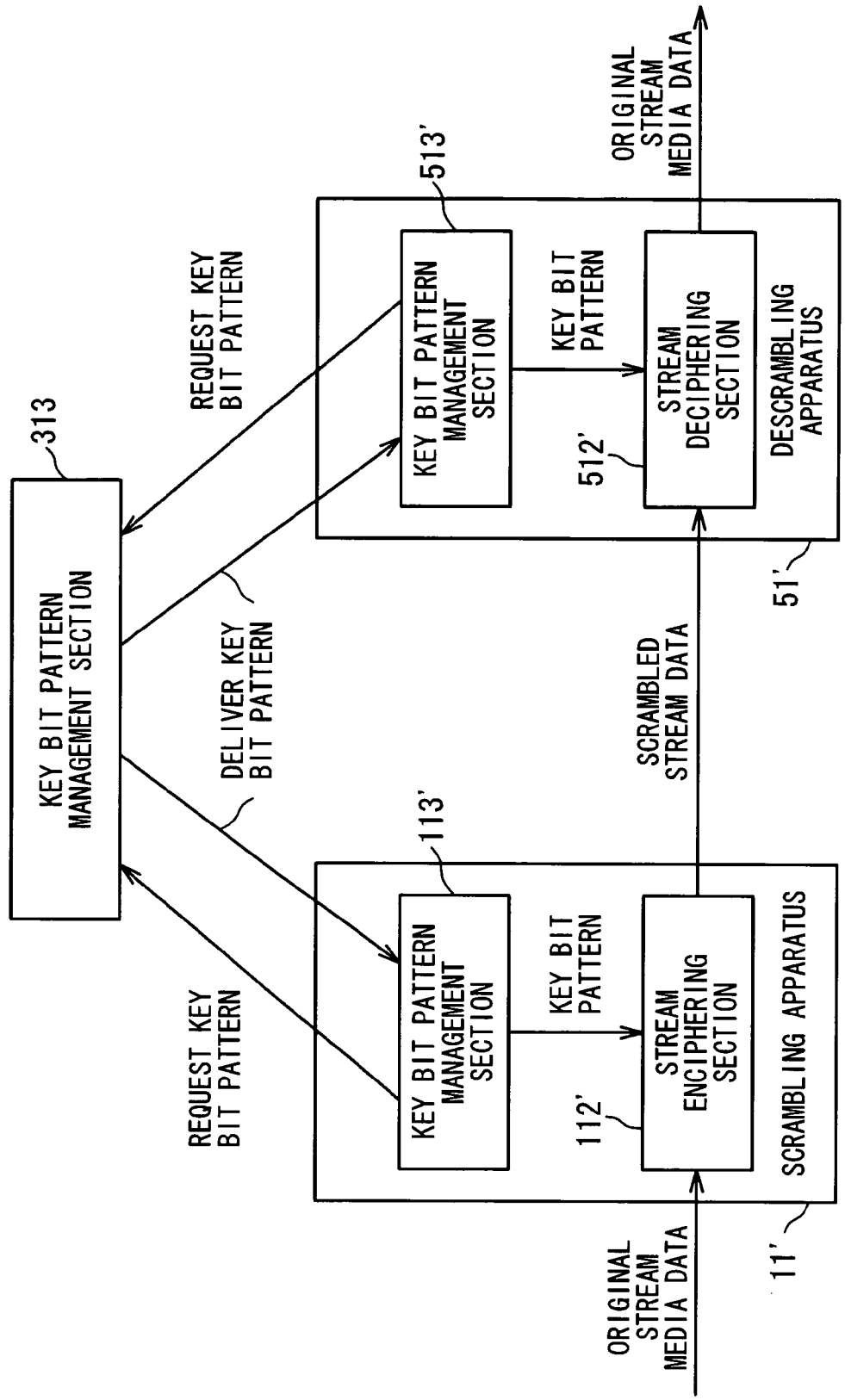
FIG. 23 is a block diagram showing the configuration of a broadcasting system of stream media data as the multicast deliver system according to a sixth embodiment of the present invention.

FIG. 23 is a block diagram showing the configuration of the scramble broadcasting system of the stream media data according to the sixth embodiment of the present invention. The system of the sixth embodiment is composed of a scrambling apparatus 11' as the content server 1$i$ in the first embodiment, a descrambling apparatus 51' as the client 5$i$ in the first embodiment, and a key bit pattern management apparatus 313 as the key management server 31 in the first embodiment. In the sixth embodiment, the scrambling apparatus 11' carries out the scrambling (coding or enciphering) of stream media data, the descrambling apparatus 51' carries out the descrambling (decoding or deciphering) of the scrambled stream media data, and the key bit pattern management apparatus 313 generates a key bit pattern used to take an exclusive OR in the scrambling/descrambling process.

The scrambling apparatus 11' is provided as a function or an option of the content server (not shown) of a service provider which provides delivery service of stream media data as contents onto the communication line of the Internet as shown in FIG. 23. The scrambling apparatus 11' includes a stream enciphering section 112' equivalent to the key managing section and a key bit pattern management section 113' equivalent to the key data management table in the content server in the first embodiment.

It should be noted that as mentioned above, the scrambling apparatus 11' is not limited to the data delivery service server which delivers the stream media data as the contents onto the communication lines of the Internet but contains the delivery server which carries out satellite broadcasting and cable television.

The stream enciphering section 112' carries out the scrambling process to original stream media data based on the exclusive OR calculation, by using a predetermined key bit pattern delivered from the key bit pattern management apparatus 313 and managed by the key bit pattern management section 113'. Also, an identifier to uniquely identify the key bit pattern used for the scrambling is embedded in the scrambled stream media data delivered by the multicast packets. The scrambled stream media data is outputted from the stream scrambling section 112', and is delivered through the packet communication and is supplied to the descrambling apparatus 51' through a network such as the Internet.

Figure 24:
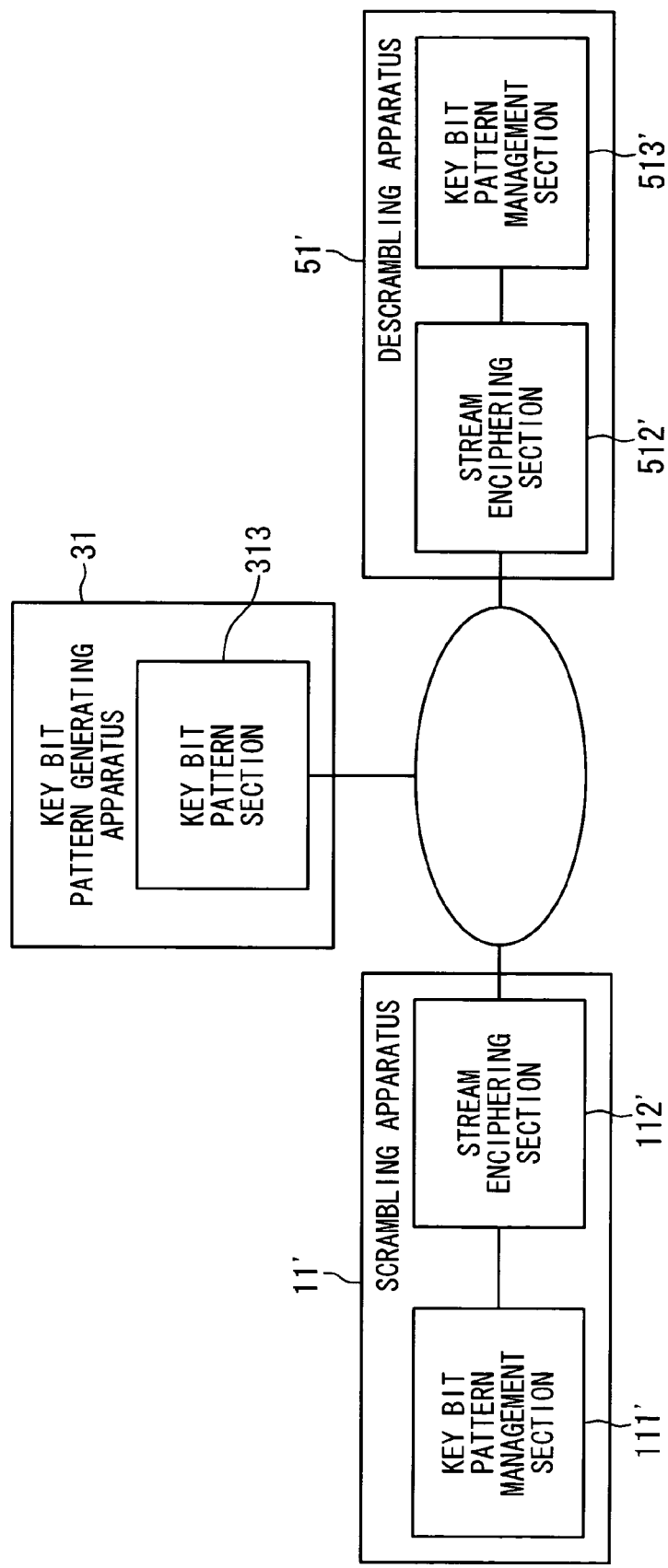
FIG. 24 is a diagram shown the broadcasting system of the stream media data according to the sixth embodiment of the present invention.
Figure 25A:
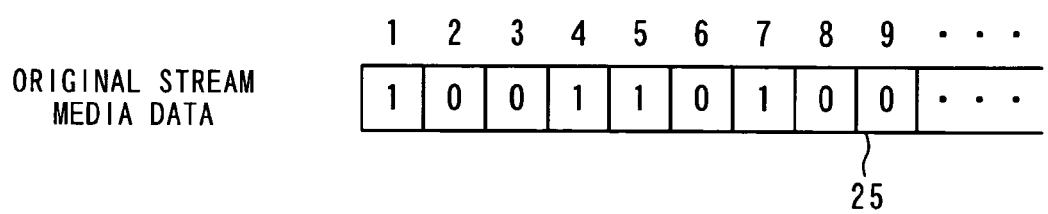
FIGS. 25A to 25C are diagrams showing a scrambling operation when a key bit pattern is used.
Figure 25B:
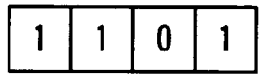
Figure 25C:
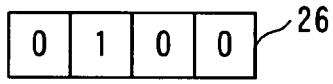
Figure 26A:
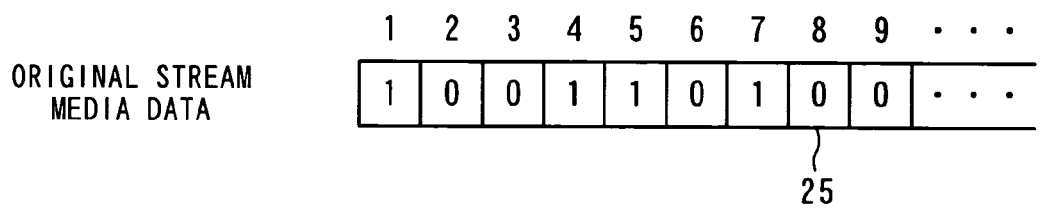
FIGS. 26A to 26c are diagrams showing a scrambling operation when another key bit pattern is used.
Figure 26B:
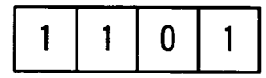
Figure 26C:
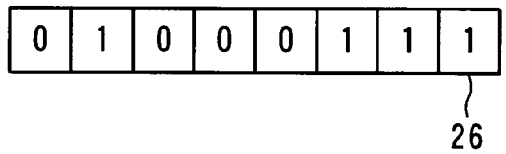
Figure 27A:
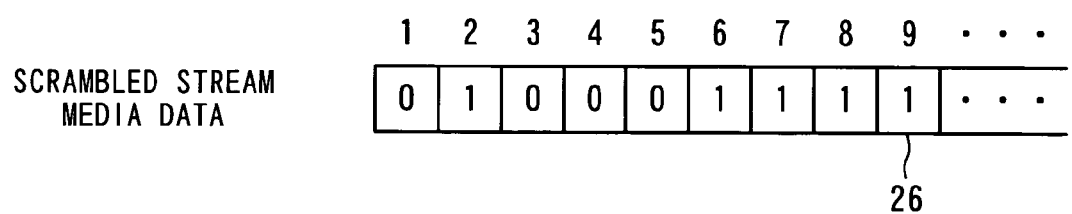
FIGS. 27A to 27C are diagrams showing a descrambling operation when the key bit pattern is used.
Figure 27B:
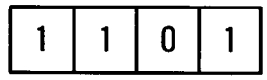
Figure 27C:
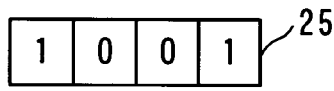
Figure 28A:
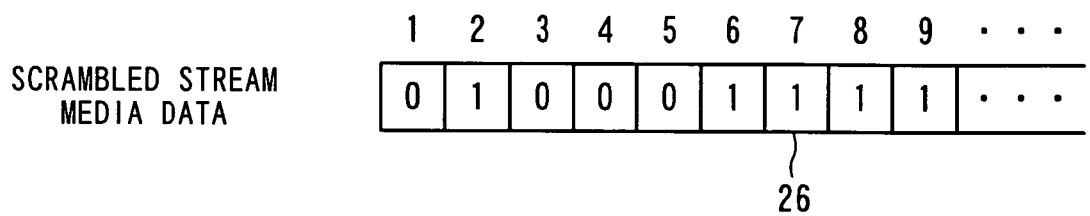
FIGS. 28A to 28C are diagrams showing a descrambling operation when the other key bit pattern is used.
Figure 28B:
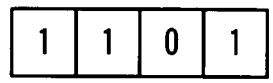
Figure 28C:
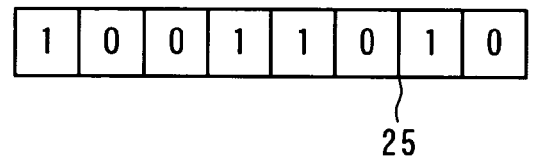

The descrambling apparatus 51' is provided in a client terminal (a receiving apparatus, not shown) of a user which receives the delivery or broadcasting of the stream media data as the contents, as shown in FIGS. 23 and 24. The descrambling apparatus 51' includes a stream deciphering section 512' equivalent to the receiving & deciphering section in the first embodiment and a key bit pattern management section 513' equivalent to the key data management table in the client in the first embodiment. When carrying out the descrambling of the scrambled stream media data, the descrambling apparatus 51' can request a necessary key bit pattern to the key bit pattern management apparatus 313 by using the identifier.

In the descrambling apparatus 51', the stream descrambling section 512' carries out the descrambling process based on the exclusive OR calculation by using the predetermined key bit pattern for the scrambled stream media data delivered from the key bit pattern management apparatus 313 and managed by the key bit pattern management section 513'. The descrambled stream media data is outputted from the stream descrambling section 512', is provided for a client terminal 51 of the user and is displayed on a display unit (not shown).

It should be noted that for example, if the user receives cable television, the above descrambling apparatus 51' is provided as a function or option of a settop box of the CATV.

The key bit pattern management apparatus 313 is connected with a server 11 of the above broadcasting service provider and a client terminal 11 of the user through communication lines of the Internet and generates and delivers the predetermined key bit pattern which is used for the exclusive OR calculation in the scrambling and descrambling process to the stream media data. As shown in FIG. 24, the key bit pattern management apparatus 313 is provided for a server 31 of a service provider for key bit pattern delivery service which independently delivers the predetermined key bit pattern to the user, as a function or option. The key bit pattern management section 111' and the key bit pattern management section 513' request the delivery of the key bit pattern to the key bit pattern management apparatus 313 periodically or every predetermined amount of stream media data.

Also, the server 313 of the key bit pattern delivery service provider may manage or calculate a delivery quantity (the number of times of delivery) of the key bit pattern every user receiving the stream media data, and may carry out the service that the server 313 charges a fee for the contents to the user based on the calculated delivery quantity and pays a fee to the broadcasting service provider. In this way, by collecting the fee in accordance with the delivery quantity of the key bit pattern used to descramble the stream media data, an appropriate fee for the amount of stream media data delivered to the client can be surely charged. Consequently, the load of the fee charging of the broadcasting service provider can be reduced.

Next, the operation of the system will be described in detail with reference to FIGS. 23 to 28C.

Figure 29:
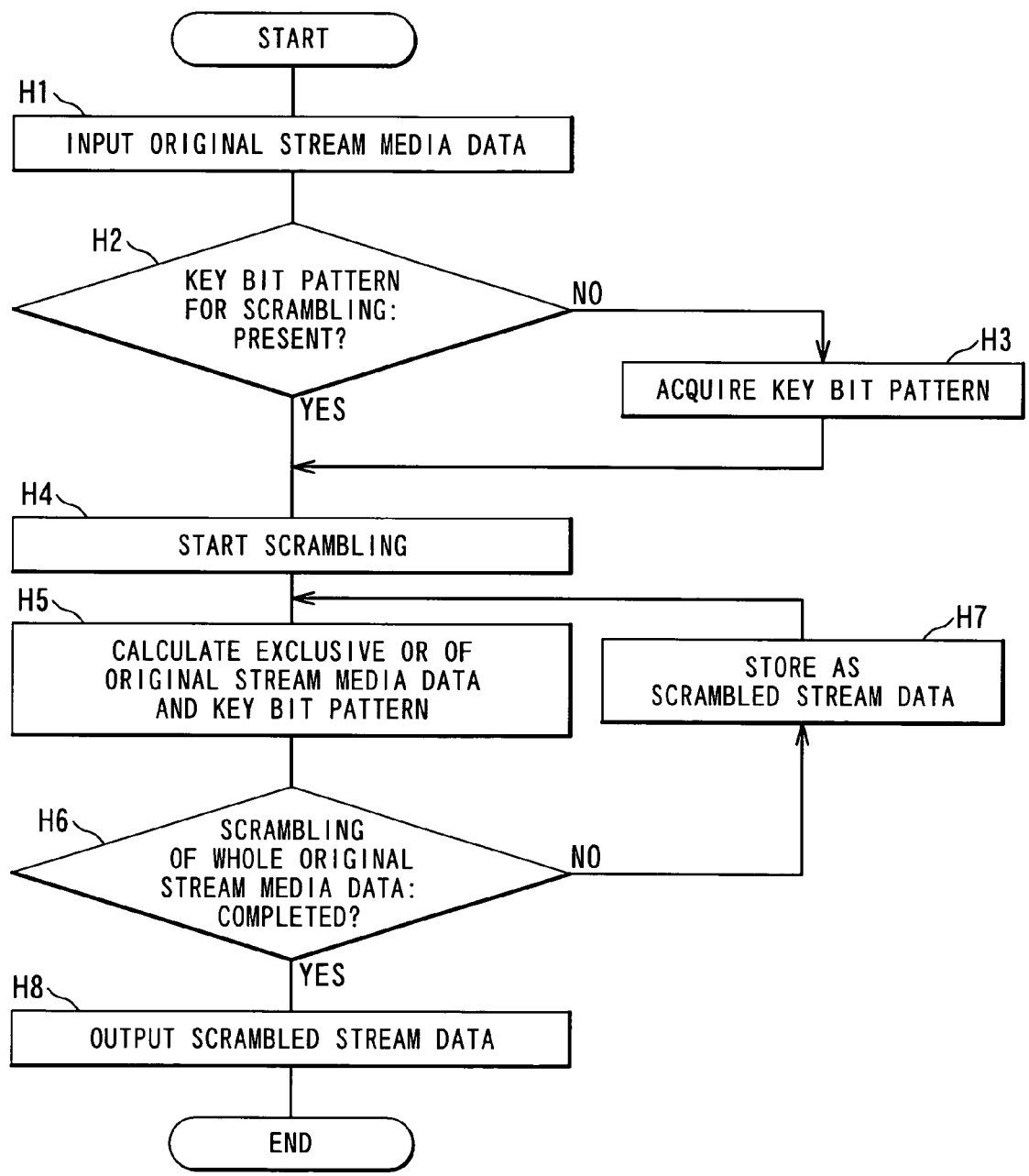
FIG. 29 is a flow chart showing a scrambling operation using the key bit pattern.

First, the operation of the scrambling process (the coding or enciphering process) to original stream media data will be described. The original stream media data supplied to the scrambling apparatus 11' of FIG. 23, and the stream scrambling section 112' scrambles the original stream media data by using predetermined key bit pattern managed by the key bit pattern management section 113'. The operation of the scrambling process will be described in detail with reference to FIGS. 25A to 25C, FIGS. 26A to 26C and a flow chart of FIG. 29.

The original stream media data 25 shown in FIGS. 25A to 25C and FIGS. 26A to 26C is stream media data before the scrambling process which is supplied to the scrambling apparatus 11'. A bit pattern A is generated by the key bit pattern management apparatus 313, is transmitted from key bit pattern management apparatus 313 to the scrambling apparatus 11' and stored in the key bit pattern management section 113'. The bit pattern A is used to carry out an exclusive OR calculation with the original stream media data 25. The number of the bits of the key bit pattern A is optional but a case that the number of the bits is 4 will be described as an example of the scrambling process and the descrambling process shown in FIGS. 25A to 28C. For example, the key bit pattern of 32 bits, 128 bits and 512 bits may be used as an actual key bit pattern. The secrecy of the scrambled stream media data is proportional to the strength of the key of the key bit pattern, and when the secrecy should be increased, the number of bits of the key bit pattern is increased such that the scrambled data cannot be descrambled easily. However, even if the number of bits of the key bit pattern is increased more than necessary, the secrecy is not almost changed and more time is taken only for the scrambling and descrambling process. That is, it is desirable that the number of bits of the key bit pattern can be changed in accordance with the kind of stream media data (movie, news and so on).

When inputting the original stream media data 25 (FIG. 29, step H1), the scrambling apparatus 11' checks whether or not the key bit pattern A used to carry out the scrambling process of this original stream media data 25 is present in the key bit pattern management section 113' (Step H2). That is, the scrambling apparatus 11' checks whether or not the key bit pattern A to be used is present in the key bit pattern management section 113'. The key bit pattern management section 113' holds the key bit pattern A until the key bit pattern used at present is changed. When the key bit pattern A is not present, the scrambling apparatus 11' issues a request to the key bit pattern generating apparatus 313 and receives the key bit pattern from it (Step H3). When the key bit pattern management section 113' holds the key bit pattern A, the scrambling apparatus 11' executes the scrambling process in accordance with the following procedure (Steps H4 to H8).

First, the exclusive OR of the 4 bits of data ("1001" of the first to fourth bits) from the head of original stream media data 25 and the key bit pattern A is calculated (Step H5). Whether or not the scrambling process is ended to the whole original stream media data 25 is determined (step H6), and a bit string of the exclusive OR calculation result "0100" is stored as a part of the scramble stream data 26 (Step H7).

Next, the exclusive OR of the following 4 bits of the original scramble stream data 25 ("1010" of the fifth to eighth bits) and the key bit pattern A is calculated. The calculated bit string "0111" is connected to the stored scramble stream data 26. This procedure is repeated, and the process of calculating the exclusive OR with the key bit pattern A is completed to all the bits of the original stream media data 25. Then, the scrambled stream data 26 is outputted (Step H8).

The scrambled stream data 26 is sent to the client terminal of the user through the communication line by the packet communication and is supplied to the descrambling apparatus 51'. It should be noted that the key bit pattern to be used is changed, by requesting the key bit pattern to the key bit pattern management apparatus 313 every predetermined data amount of the stream media data, for example, every number of predetermined packets or predetermined time interval if the stream media data is MPEG data. Also, an identifier to uniquely identify the key bit pattern used for the descrambling process is embedded in the scrambled data. Thus, the descrambling apparatus 51' can know that the key bit pattern is changed. When a packet is used, the identifier is embedded in the header section of the packet.

Next, an operation when the original stream media data is taken out from the scrambled stream media data by the descrambling apparatus 51' will be described, with reference to FIGS. 27A to 27C, FIGS. 28A to 28C, and a flow chart of 30.

The scrambled stream media data 26 supplied to the descrambling apparatus 51' of FIG. 23 is descrambled by the stream descrambling section 512' by using the key bit pattern managed by the key bit pattern management section 513'. The operation at this time will be described FIGS. 27A to 27C, and FIGS. 28A to 28C.

The scrambled stream data 26 shown in FIGS. 27A to 27C and FIGS. 28A to 28C are the scrambled stream media data supplied to the key bit pattern management section 513'. The key bit pattern A used to descramble (decode or decipher) the scramble stream data 26 is generated by the key bit pattern management apparatus 313 and transmitted to the key bit pattern management section 513' for the exclusive OR calculation with the scramble stream data 26. The key bit pattern A is the same as the bit pattern which is used to calculate the exclusive OR with the original stream media data 25 in the scrambling apparatus 11' and to generate the scrambled stream data 26.

Figure 30:
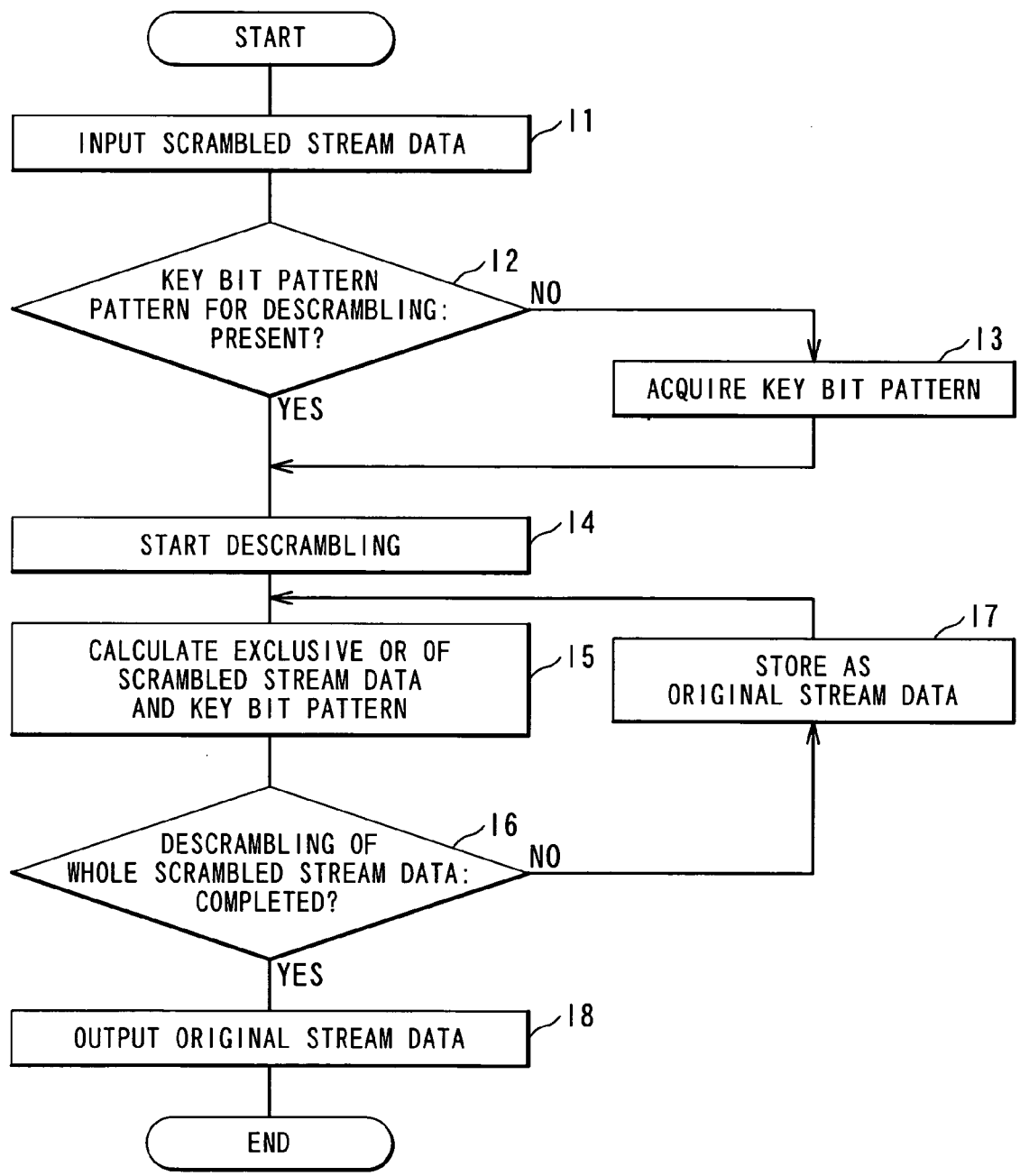
FIG. 30 is a flow chart showing a descrambling operation using the key bit pattern.

When inputting the scrambled stream data 26 (FIG. 30, step I1), the descrambling apparatus 51 check whether or not the key bit pattern used to descramble the scrambled stream data 26 is present in the key bit pattern management section 513' (Step I2). When the key bit pattern is not present, the descrambling apparatus 51' requests the delivery of the key bit pattern to the key bit pattern management apparatus 313 based on the key bit pattern identifier embedded in the scrambled stream data 26 and receives it (Step I3). That is, the descrambling apparatus 51' checks whether or not the key bit pattern A to be used is present in the key bit pattern management section 513'. The bit pattern management section 513' holds the key bit pattern A until the key bit pattern is changed. When the key bit pattern A is held or acquired, the descrambling process is carried out in accordance with the following procedure (Steps I4 to I8).

First, the exclusive OR of the 4 bits of the scrambled stream data 26 from the head ("0100" of the first to fourth bits) and the key bit pattern A is calculated (Step I5). The calculated bit string "1001" is stored as the original stream media data 25 until the descrambling process is ended to the whole scrambled stream data 26 (step I6) (Step I7).

Next, the exclusive OR of the following 4 bits of the scrambled stream data 26 ("0111" of the fifth to eighth bits) and the key bit pattern A is calculated. The calculated bit string "1010" is stored such that it is connected to the stored original stream media data 25. The procedure is repeated and the process of calculating the exclusive OR with the key bit pattern A is completed to all the bits of the scrambled stream media data 26. Then, the original stream data 25 is outputted (Step I8). It is previously promised between the scrambling apparatus 11' and the descrambling apparatus 51' that the key bit pattern is changed every predetermined data amount of the scrambled stream media data. The scrambling apparatus 11' acquires a new key bit pattern from the key bit pattern management apparatus 313 every predetermined data amount or predetermined time interval and carries out the scrambling process. Also, the descrambling apparatus 51' acquires the new key bit pattern from the key bit pattern management apparatus 313 based on the identifier embedded in the scrambled stream data every predetermined data amount and carries out the descrambling process. In this way, the synchronization between the scrambling process and the descrambling process can be established.

Next, the stream media data delivery system according to the seventh embodiment of the present invention will be described in detail with reference to the attached drawings. In the example shown in FIGS. 25A to 28C, the scrambling process and the descrambling process are carried out by using one kind of the key bit pattern for a data amount of the stream media data. However, it is possible to carry out the scrambling process and the descrambling process by using a plurality of key bit patterns acquired from a plurality of key bit pattern managing apparatus 313 at the same time, by using the plurality of key bit patterns acquired at the different timings, by using the plurality of key bit patterns generated by inverting one kind of the key bit pattern at the same time, or by combining these methods.

By using the above methods, the secrecy of the scrambling state can be improved compared with a case where one kind of key bit pattern is used. Thus, the present invention is applicable to more kinds of stream media data.

Figure 31A:
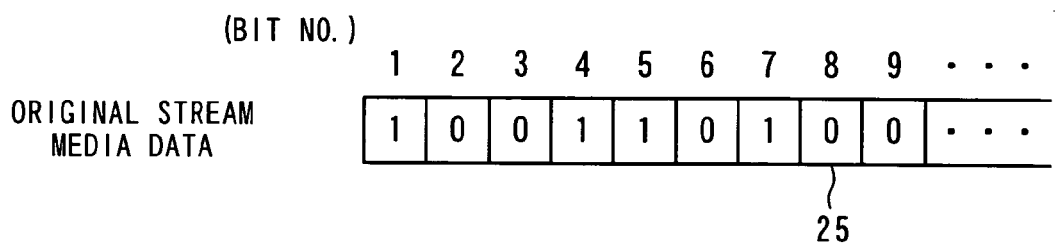
FIGS. 31A to 31D are diagrams showing a scrambling operation when two kinds of key bit patterns are used.
Figure 31B:
Figure 31C:
Figure 31D:
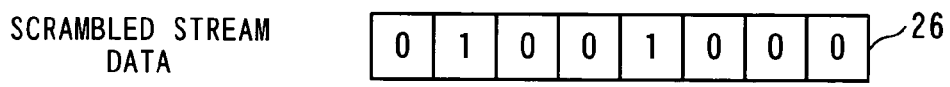
Figure 32A:
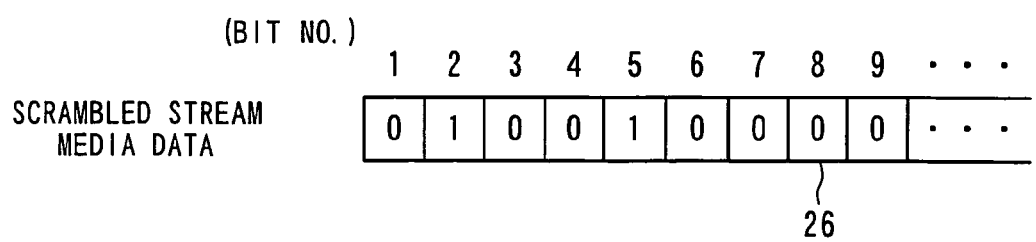
FIGS. 32A to 32D are diagrams showing a descrambling operation when the two kinds of key bit patterns are used.
Figure 32B:
Figure 32C:
Figure 32D:
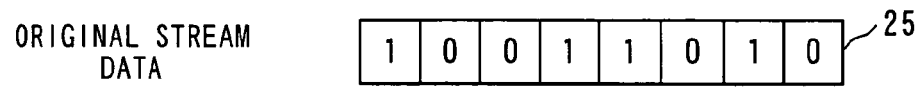

FIGS. 31A to 31D shows an examples which the scrambling process is carried out by using two kinds of key bit patterns. In this example, the key bit pattern B 55 of FIG. 31C is generated by inverting the key bit pattern A of FIG. 31B. The inverting operation of the key bit pattern is carried out in the scrambling apparatus 11' and the descrambling apparatus 51'. Thus, the scrambling apparatus 11' and the descrambling apparatus 51' share only one kind of the key bit pattern, and they can carry out the scrambling process and the descrambling process using two kinds of the key bit patterns actually.

In the example shown in FIGS. 31A to 31D, the scrambled stream data 26 is generated by calculating the exclusive OR of the key bit patterns A and B and the original stream media data 25. The calculation of the exclusive OR is carried out to the ninth bit and subsequent bits of the original stream media data 25 by applying the key bit patterns A and B in this order, and the scramble media data 26 delivered on the network is finally generated.

FIGS. 32A to 32D show an example in which the descrambling process is carried by using two kinds of key bit patterns A and B. The key bit patterns A and B are the same as the key bit patterns A and B used the scrambling process shown in FIGS. 31A to 31D. The original stream media data 25 is reproduced by calculating the exclusive OR of the key bit patterns A and B and the scrambled stream data 26. The calculation of the exclusive OR is carried out to the ninth bit and subsequent bits of the scrambled stream media data 26 by applying the key bit patterns A and B in this order, and the original stream media data 2 is fully reproduced.

As described above, according to the scramble broadcasting system of the stream media data of the present invention, the apparatuses may be realized as hardware or by loading a scrambling program and a descrambling program on the scrambling apparatus and the descrambling apparatus of the client. That is, the functions of the scrambling apparatus and the descrambling apparatus can be realized in software. The scrambling program and the descrambling program are stored in a recording media such as a hard disk, an optical disk and a semiconductor memory, and are loaded on a computer section. The computer section executes the program to control the above operation. Thus, the above functions can be realized.

It should be noted that in the above embodiment, a case is shown where the descrambling apparatus requests the generation of the key bit pattern to the key bit pattern generating apparatus based on the identifier embedded in the stream data. However, it is possible that the identifier of the key bit pattern is not embedded in the stream data and the descrambling apparatus inquires the identifier of the key bit pattern inquire to the scrambling apparatus.

According to the scramble broadcasting method of the stream media data of the present invention, high-speed scrambling and descrambling the stream media data can be carried out to simplify the scramble broadcasting.

Also, an exclusive use hardware for scrambling and descrambling is not needed and especially the small-scale apparatus such as a mobile terminal and a home gateway in home can easily carry out the broadcasting and reception of the stream media data using enciphering and deciphering. Therefore, the cost of the scrambling apparatus and descrambling apparatus can be reduced compared with a conventional price and it is possible to spread the broadcasting and reception of the stream media data widely. Thus, the broadcasting service using packet communication can be started. The process of calculating exclusive OR with the key bit pattern for the enciphering and deciphering in the present invention is loaded in many CPUs as an instruction of a machine language level. Therefore, the enciphering and deciphering can be carried out in high speed even in a software process.

It should be noted that the secrecy of the scrambling can be increased to a practical level by limiting the effective time of the key bit pattern and changing the key bit pattern appropriately. Compared with character data and so on, it is difficult to guess original stream media data. Therefore, the scrambled stream media data is difficult to be deciphered by the technique in which a key is simply applied from the head in the key space and whether or not the decipher is succeeded is checked (deciphering technique of DES) and the techniques in which a lot of enciphered data are collected and the tendency of the enciphered data is analyzed (general deciphering technique). That is, the ciphering technique using the exclusive OR calculating process with the key bit pattern gives the ciphering and deciphering the practical use of the key.

Also, in case where stream media data itself has a value related with time (for example, the delivery of news and so on), the value of the data drops, when the time from the delivery passed away. Therefore, it is not permitted to take a lot of time for the decipherment. Therefore, in case of the stream media data such as the news, the small number of bits of the key bit pattern is enough to give the key bit pattern the practical strength of the key.

Moreover, it is possible to carry out the exclusive OR calculating process simply. Therefore, even if a key size (bit pattern size) is increased to a necessary and enough strength, the enciphering and deciphering process is not influenced so much. For this reason, the enough key strength can be given by increasing the number of the bits of the key bit pattern.

As described above, the present invention is described by taking the embodiments and modifications as examples. However, the present invention is not limited to the above embodiments and the modifications and may be changed in the scope of the present invention.

What is claimed is:

1. A multicast delivery system comprising:
a delivery server which enciphers delivery data by using a current use cipher key to generate enciphered data and transmits a multicast packet containing said enciphered data and a current use key identifier, said current use key identifier identifies a pair of said current use cipher key and a current use decipher key as current use keys, said current use cipher key being separate from said current use decipher key;
a key management server which is connected with said delivery server through a network, holds as a current use key data, a set of said current use decipher key and said current use key identifier, and transmits a set of said current use decipher key and said current use key identifier as a current use decipherment key data in response to a current use key data request; and
a client terminal which is connected with said delivery server and said key management server through said network, receives said multicast packet from said delivery server, issues said current use key data request to said key management server to receive said current use decipherment key data from said key management server, holds a set of said current use decipher key and said current use key identifier, and deciphers said enciphered data contained in said multicast packet by using said current use decipher key when said current use key identifier contained in said multicast packet is coincident with said current use key identifier held in said client terminal.

2. The multicast delivery system according to claim 1, wherein said delivery server generates and holds as a current use encipherment key data, a set of said current use cipher key, said current use decipher key and said current use key identifier, and transmits a set of said current use decipher key and said current use key identifier as said current use decipherment key data to said key management server, and said key management server holds said current use decipher key and said current use key identifier as said current use decipherment key data.

3. The multicast delivery system according to claim 2, wherein said delivery server sets a current use key remaining effective time data to said current use key data, and transmits a set of said current use decipher key, said current use key identifier, and said current use key remaining effective time data as said current use decipherment key data to said key management server, said key management server holds said current use decipherment key data, and said delivery server, said key management server and said client terminal decreases said current use key remaining effective time data as time elapses.

4. The multicast delivery system according to claim 3, wherein said delivery server generates as a next use key data, a set of a next use cipher key, a next use decipher key, a next use key identifier indicative of a pair of said next use cipher key and a next use key remaining effective time data, when said current use key remaining effective time data becomes a first present value, and transmits a set of said next use decipher key, said next use key identifier, and said next use key remaining effective time data to said key management server as a next use decipherment key data, and said key management server holds said next use decipher key data.

5. The multicast delivery system according to claim 4, wherein said client terminal issues a next use key request to said key management server when said current use key remaining effective time data becomes a second present value smaller than said first preset value, and receives and holds said next use decipherment key data from said key management server.

6. The multicast delivery system according to claim 5, wherein said delivery server enciphers said delivery data by using said next use cipher key as said current use cipher key after said current use key remaining effective time data becomes 0.

7. The multicast delivery system according to claim 1, wherein said delivery server issues a current use key data generating request to said key management server, said key management server generates and holds as a current use key data, a set of said current use cipher key, said current use decipher key and said current use key identifier in response to said current use key data generating request, and transmits a set of said current use cipher key and said current use key identifier as a current use encipherment key data to said delivery server, and said delivery server holds said current use encipherment key data.

8. The multicast delivery system according to claim 7, wherein said key management server sets a current use key remaining effective time data to said current use key data, and transmits a set of said current use decipher key, said current use key identifier, and said current use key remaining effective time data as said current use encipherment key data to said delivery server, said delivery server holds said current use encipherment key data, and said delivery server, said key management server and said client terminal decreases said current use key remaining effective time data as time elapses.

9. The multicast delivery system according to claim 8, wherein said delivery server issues a next use key data generating request to said key management server, when said current use key remaining effective time data becomes a first present value, said key management server generates and holds as a next use key data, a set of a next use cipher key, a next use decipher key, a next use key identifier indicative of a pair of said next use cipher key and a next use key remaining effective time data in response to said next use key data generating request, and transmits a set of said next use encipher key, said next use key identifier, and said next use key remaining effective time data to said delivery server as a next use encipherment key data, and said delivery server holds said next use encipherment key data.

10. The multicast delivery system according to claim 9, wherein said client terminal issues a next use key request to said key management server when said current use key remaining effective time data becomes a second present value smaller than said first preset value, and receives and holds said next use decipherment key data of said next use decipher key, said next use key identifier, and said next use key remaining effective time data from said key management server.

11. The multicast delivery system according to claim 10, wherein said delivery server enciphers said delivery data by using said next use cipher key as said current use cipher key after said current use key remaining effective time data becomes 0.

12. The multicast delivery system according to claim 1, further comprising:

a plurality of said delivery servers; and a plurality of said client terminals, wherein each of said plurality of delivery servers issues a next use key data generating request to said key management server while using said current use cipher key, said key management server generates and holds as a next use key data, a set of a next use cipher key, a next use decipher key and a current use key identifier indicative of a pair of said next use cipher key and said next use decipher key in response to said next use key data generating request, and transmits a set of said next use cipher key and said next use key identifier as a next use encipherment key data to each of said plurality of delivery servers, and each of said plurality of delivery servers holds said next use encipherment key data.

13. The multicast delivery system according to claim 12, wherein each of said plurality of client terminals issues a next use decipher key request to said key management server when each of said plurality of client terminals does not hold said current use key identifier contained in said multicast packet, said key management server transmits a set of said next use decipher key and said next use key identifier to each of said plurality of client terminals as a next use decipherment key data, and each of said plurality of client terminals holds said next use decipherment key data.

14. The multicast delivery system according to claim 12, wherein each of said plurality of delivery servers issues a key data change previous notice to said plurality of clients, each of said plurality of client terminals issues a next use decipher key request to said key management server in response to said key data change previous notice, said key management server transmits a set of said next use decipher key and said next use key identifier to each of said plurality of client terminals as a next use decipherment key data, and each of said plurality of client terminals holds said next use decipherment key data.

15. The multicast delivery system according to claim 1, further comprising:

a plurality of said delivery servers; and a plurality of said client terminals, wherein said key management server comprises:

a master server; and a plurality of slave servers, wherein each of said plurality of delivery servers issues a next use key data generating request to said master server while using said current use cipher key, said master server generates and holds as a next use key data, a set of a next use cipher key, a next use decipher key and a current use key identifier indicative of a pair of said next use cipher key and said next use decipher key in response to said next use key data generating request, transmits a set of said next use cipher key and said next use key identifier as a next use encipherment key data to each of said plurality of delivery servers, and transmits a set of said next use decipher key and said next use key identifier as a next use decipherment key data to said plurality of slave servers, each of said plurality of slave servers holds said next use decipherment key data, and each of said plurality of delivery servers holds said next use encipherment key data.

16. The multicast delivery system according to claim 15, wherein each of said plurality of client terminals issues a next use decipher key request to any of said plurality of slave servers when each of said plurality of client terminals does not hold said current use key identifier contained in said multicast packet, said slave server transmits said next use decipherment key data to each of said plurality of client terminals, and each of said plurality of client terminals holds said next use decipherment key data.

17. The multicast delivery system according to claim 15, wherein each of said plurality of delivery servers issues a key data change previous notice to said plurality of clients, each of said plurality of client terminals issues a next use decipher key request to any of said plurality of slave servers in response to said key data change previous notice, each of said plurality of slave servers transmits said next use decipherment key data to corresponding client terminals of said plurality of client terminals, and each of said plurality of client terminals holds said next use decipherment key data.

18. The multicast delivery system according to claim 1, wherein said key management server detects a data amount of said multicast packets and charges a fee to said client terminal based on said detected data amount.

19. The multicast delivery system according to claim 1, wherein said client terminal issues said key data request to said key management server, and said key management server detects the number of said key data requests and charges a fee to said client terminal based on said detected number of key data requests.

* * * * *